(12) United States Patent
Karp et al.

(10) Patent No.: US 9,788,039 B2
(45) Date of Patent: Oct. 10, 2017

(54) CAMERA SYSTEM API FOR THIRD-PARTY INTEGRATIONS

(71) Applicant: Google Inc., Mountain View, CA (US)

(72) Inventors: Igor Karp, Sunnyvale, CA (US); Lev Stesin, Mountain View, CA (US)

(73) Assignee: Google Inc., Mountain View, CA (US)

(*) Notice: Subject to any disclaimer, the term of this patent is extended or adjusted under 35 U.S.C. 154(b) by 0 days.

(21) Appl. No.: 14/987,679

(22) Filed: Jan. 4, 2016

(65) Prior Publication Data

US 2016/0134932 A1 May 12, 2016

Related U.S. Application Data

(63) Continuation-in-part of application No. 14/722,003, filed on May 26, 2015.
(Continued)

(51) Int. Cl.
*G06F 3/00* (2006.01)
*G06F 9/44* (2006.01)
(Continued)

(52) U.S. Cl.
CPC ...... *H04N 21/2743* (2013.01); *G05B 13/04* (2013.01); *G05B 15/02* (2013.01); *G05D 23/1904* (2013.01); *G06F 9/54* (2013.01); *G06F 9/541* (2013.01); *G06F 9/546* (2013.01); *G08B 13/1672* (2013.01); *G08B 13/19602* (2013.01); *G08B 13/19656* (2013.01); *G08B 17/10* (2013.01); *G08B 25/08* (2013.01); *H04L 12/282* (2013.01); *H04L 12/2816* (2013.01);
(Continued)

(58) Field of Classification Search
CPC .................................................. H04N 21/2743
USPC .......................................................... 719/328
See application file for complete search history.

(56) References Cited

U.S. PATENT DOCUMENTS

| 5,903,455 A | 5/1999 | Sharpe, Jr. et al. |
| 6,349,883 B1 | 2/2002 | Simmons et al. |
| (Continued) | | |

OTHER PUBLICATIONS

"Pre-Interview Communication", U.S. Appl. No. 14/988,278, Mar. 10, 2016, 3 pages.
(Continued)

*Primary Examiner* — Timothy A Mudrick
(74) *Attorney, Agent, or Firm* — Colby Nipper

(57) ABSTRACT

In embodiments of a camera system application program interface (API) for third-party integrations, a camera device captures images as a video stream and communicates the video stream to a cloud-based service. The cloud-based service implements a service application that processes video data received as the video stream. The cloud-based service exposes the camera system API that can be invoked by a third-party application running on a client device to request the video data and camera data that is associated with the camera device. The API permits access by the third-party application to the video data and the camera data from the cloud-based service. The API is exposed for the third-party application to communicate with the cloud-based service via a network connection, and the camera device communicates with the cloud-based service via a secure connection to provide the requested camera data and communicate the video stream to the cloud-based service.

30 Claims, 22 Drawing Sheets

Related U.S. Application Data

(60) Provisional application No. 62/236,103, filed on Oct. 1, 2015, provisional application No. 62/016,052, filed on Jun. 23, 2014.

(51) Int. Cl.

| | | |
|---|---|---|
| *G06F 9/46* | (2006.01) | |
| *G06F 13/00* | (2006.01) | |
| *H04N 21/2743* | (2011.01) | |
| *H04N 21/443* | (2011.01) | |
| *G06F 9/54* | (2006.01) | |
| *H04N 5/232* | (2006.01) | |
| *H04N 21/4223* | (2011.01) | |
| *H04N 7/18* | (2006.01) | |
| *H04L 29/06* | (2006.01) | |
| *H04L 29/08* | (2006.01) | |
| *G05D 23/19* | (2006.01) | |
| *G05B 13/04* | (2006.01) | |
| *G05B 15/02* | (2006.01) | |
| *G08B 17/10* | (2006.01) | |
| *H04L 12/28* | (2006.01) | |
| *H04W 4/00* | (2009.01) | |
| *H04N 21/2187* | (2011.01) | |
| *H04N 21/231* | (2011.01) | |
| *H04N 21/258* | (2011.01) | |
| *G08B 13/16* | (2006.01) | |
| *G08B 13/196* | (2006.01) | |
| *G08B 25/08* | (2006.01) | |

(52) U.S. Cl.
CPC .......... *H04L 12/2829* (2013.01); *H04L 63/08* (2013.01); *H04L 67/10* (2013.01); *H04L 67/1097* (2013.01); *H04L 67/12* (2013.01); *H04L 67/125* (2013.01); *H04L 67/20* (2013.01); *H04L 67/22* (2013.01); *H04L 67/303* (2013.01); *H04L 67/42* (2013.01); *H04L 69/24* (2013.01); *H04N 5/23206* (2013.01); *H04N 7/186* (2013.01); *H04N 21/2187* (2013.01); *H04N 21/231* (2013.01); *H04N 21/25816* (2013.01); *H04N 21/4223* (2013.01); *H04N 21/4431* (2013.01); *H04W 4/008* (2013.01)

(56) References Cited

U.S. PATENT DOCUMENTS

| | | |
|---|---|---|
| 6,993,658 B1 | 1/2006 | Engberg et al. |
| 7,904,209 B2 | 3/2011 | Podgorny et al. |
| 8,718,826 B2 | 5/2014 | Ramachandran et al. |
| 8,843,935 B2 | 9/2014 | Hegdal et al. |
| 8,862,096 B1 | 10/2014 | Viswanathan et al. |
| 9,154,303 B1 | 10/2015 | Saylor |
| 9,191,771 B2 | 11/2015 | Viswanathan et al. |
| 9,491,571 B2 | 11/2016 | Karp et al. |
| 9,532,094 B2 | 12/2016 | Karp et al. |
| 9,668,085 B2 | 5/2017 | Pi-Sunyer |
| 2001/0034754 A1 | 10/2001 | Elwahab et al. |
| 2002/0023258 A1 | 2/2002 | Elwahab et al. |
| 2003/0041107 A1 | 2/2003 | Blattner et al. |
| 2003/0044017 A1 | 3/2003 | Briscoe |
| 2003/0208527 A1 | 11/2003 | Lglesais et al. |
| 2004/0019900 A1 | 1/2004 | Knightbridge et al. |
| 2004/0111499 A1 | 6/2004 | Dobrowski et al. |
| 2004/0137891 A1 | 7/2004 | Clark et al. |
| 2004/0138961 A1 | 7/2004 | Clark et al. |
| 2004/0139119 A1 | 7/2004 | Clark et al. |
| 2004/0139120 A1 | 7/2004 | Roundtree et al. |
| 2004/0142683 A1 | 7/2004 | Clark et al. |
| 2005/0119794 A1 | 6/2005 | Amundson et al. |
| 2005/0188402 A1 | 8/2005 | de Andrade et al. |
| 2005/0280704 A1* | 12/2005 | Clare .................. G08B 13/1672 348/143 |
| 2006/0053164 A1 | 3/2006 | Ewing et al. |
| 2006/0080408 A1 | 4/2006 | Istvan et al. |
| 2006/0271911 A1 | 11/2006 | Palapudi et al. |
| 2007/0043478 A1 | 2/2007 | Ehlers et al. |
| 2007/0293264 A1 | 12/2007 | Marsh et al. |
| 2008/0077867 A1 | 3/2008 | Hake et al. |
| 2008/0209491 A1 | 8/2008 | Hasek |
| 2008/0262822 A1 | 10/2008 | Hardwick et al. |
| 2009/0249428 A1* | 10/2009 | White .................. H04L 12/2809 725/133 |
| 2010/0131618 A1 | 5/2010 | Brewis et al. |
| 2010/0131619 A1 | 5/2010 | Brewis et al. |
| 2010/0131622 A1 | 5/2010 | Brewis et al. |
| 2010/0131652 A1 | 5/2010 | Brewis et al. |
| 2010/0217837 A1 | 8/2010 | Ansari et al. |
| 2011/0015802 A1 | 1/2011 | Imes |
| 2011/0046805 A1 | 2/2011 | Bedros et al. |
| 2011/0082574 A1* | 4/2011 | Pachet .................. A01K 15/02 700/94 |
| 2011/0119317 A1 | 5/2011 | Kazoun et al. |
| 2011/0131304 A1 | 6/2011 | Henson |
| 2011/0131384 A1 | 6/2011 | Henson |
| 2011/0202185 A1 | 8/2011 | Imes et al. |
| 2011/0238978 A1 | 9/2011 | Majumdar et al. |
| 2011/0276396 A1 | 11/2011 | Rathod |
| 2011/0289113 A1 | 11/2011 | Arling et al. |
| 2011/0290893 A1 | 12/2011 | Steinberg |
| 2011/0314163 A1 | 12/2011 | Borins et al. |
| 2012/0016524 A1 | 1/2012 | Spicer et al. |
| 2012/0172027 A1 | 7/2012 | Partheesh et al. |
| 2012/0179547 A1 | 7/2012 | Besore et al. |
| 2012/0305661 A1 | 12/2012 | Malchiondo et al. |
| 2013/0073094 A1 | 3/2013 | Knapton et al. |
| 2013/0328663 A1 | 12/2013 | Ordaz |
| 2014/0047368 A1 | 2/2014 | Yang et al. |
| 2014/0058567 A1 | 2/2014 | Matsuoka et al. |
| 2014/0082702 A1 | 3/2014 | Supalla |
| 2014/0201256 A1 | 7/2014 | Pinheiro et al. |
| 2014/0206326 A1 | 7/2014 | Hodges et al. |
| 2014/0222862 A1 | 8/2014 | Arling et al. |
| 2014/0309788 A1 | 10/2014 | Blum |
| 2014/0337879 A1 | 11/2014 | Arling et al. |
| 2014/0351870 A1* | 11/2014 | Amine .................. H04N 21/2665 725/92 |
| 2015/0098455 A1 | 4/2015 | Fritsch |
| 2015/0227118 A1 | 8/2015 | Wong |
| 2015/0236913 A1 | 8/2015 | Nakano et al. |
| 2015/0279183 A1 | 10/2015 | Kobayashi |
| 2015/0334165 A1 | 11/2015 | Arling et al. |
| 2015/0370615 A1 | 12/2015 | Pi-Sunyer |
| 2015/0370621 A1 | 12/2015 | Karp et al. |
| 2015/0372832 A1 | 12/2015 | Kortz et al. |
| 2015/0372833 A1 | 12/2015 | Karp |
| 2015/0372834 A1 | 12/2015 | Karp et al. |
| 2015/0373149 A1 | 12/2015 | Lyons |
| 2016/0142758 A1 | 5/2016 | Karp et al. |
| 2016/0261425 A1 | 9/2016 | Horton et al. |
| 2016/0297479 A1 | 10/2016 | Ritschel et al. |
| 2017/0118499 A1 | 4/2017 | Karp et al. |
| 2014/0359602 A1 | 7/2017 | Sawaya et al. |

OTHER PUBLICATIONS

"International Search Report and Written Opinion", Application No. PCT/US2015/037215, Oct. 9, 2015, 10 pages.
"Preinterview First Office Action", U.S. Appl. No. 14/722,003, Nov. 3, 2015, 4 pages.
"First Action Interview Office Action", U.S. Appl. No. 14/722,003, Feb. 24, 2016, 5 pages.
"Advisory Action", U.S. Appl. No. 14/531,805, Oct. 14, 2015, 3 pages.
"Final Office Action", U.S. Appl. No. 14/531,805, Jul. 31, 2015, 13 pages.
"Final Office Action", U.S. Appl. No. 14/531,805, Dec. 29, 2016, 17 pages.

(56) References Cited

OTHER PUBLICATIONS

"Final Office Action", U.S. Appl. No. 14/722,012, Aug. 30, 2016, 25 pages.
"Final Office Action", U.S. Appl. No. 14/722,023, Sep. 19, 2016, 15 pages.
"First Action Interview Office Action", U.S. Appl. No. 14/531,805, Apr. 6, 2015, 4 pages.
"First Action Interview Office Action", U.S. Appl. No. 14/722,034, Jul. 21, 2016, 3 pages.
"First Action Interview Office Action", U.S. Appl. No. 14/722,023, Apr. 21, 2016, 5 pages.
"Non-Final Office Action", U.S. Appl. No. 14/531,805, Jun. 23, 2016, 16 pages.
"Non-Final Office Action", U.S. Appl. No. 14/577,635, Jul. 5, 2016, 32 pages.
"Non-Final Office Action", U.S. Appl. No. 14/722,034, Jan. 12, 2017, 17 pages.
"Notice of Allowance", U.S. Appl. No. 14/722,003, Jun. 23, 2016, 7 pages.
"Notice of Allowance", U.S. Appl. No. 14/722,032, Nov. 21, 2016, 7 pages.
"Pre-interview First Office Action", U.S. Appl. No. 14/531,805, Feb. 10, 2015, 4 pages.
"Pre-interview First Office Action", U.S. Appl. No. 14/722,003, Nov. 3, 2015, 4 pages.
"Pre-interview First Office Action", U.S. Appl. No. 14/722,012, Jan. 29, 2016, 4 pages.
"Pre-interview First Office Action", U.S. Appl. No. 14/722,023, Dec. 14, 2015, 4 pages.
"Pre-interview First Office Action", U.S. Appl. No. 14/722,032, Mar. 11, 2016, 4 pages.
"Pre-interview First Office Action", U.S. Appl. No. 14/722,034, Mar. 21, 2016, 4 pages.
"First Action Interview Office Action", U.S. Appl. No. 14/988,278, Jun. 7, 2016, 3 pages.
"Notice of Allowance", U.S. Appl. No. 14/988,278, Oct. 3, 2016, 7 pages.
"International Preliminary Report on Patentability", Application No. PCT/US2015/037215, Jan. 5, 2017, 8 pages.
"Final Office Action", U.S. Appl. No. 14/577,635, Jan. 23, 2017, 44 pages.
"Final Office Action", U.S. Appl. No. 14/722,034, Apr. 18, 2017, 16 pages.
"Non-Final Office Action", U.S. Appl. No. 14/722,012, Apr. 4, 2017, 19 pages.
"Notice of Allowance", U.S. Appl. No. 14/722,023, Feb. 23, 2017, 10 pages.
"Notice of Allowance", U.S. Appl. No. 14/722,032, Mar. 28, 2017, 8 pages.
"Notice of Allowance", U.S. Appl. No. 14/722,023, dated Jul. 25, 2017, 10 pages.
"Notice of Allowance", U.S. Appl. No. 14/722,012, dated Aug. 2, 2017, 5 pages.

* cited by examiner

CAMERA SYSTEM API FOR THIRD-PARTY INTEGRATIONS

CROSS REFERENCE TO RELATED APPLICATIONS

This application claims priority under 35 U.S.C. §119(e) to U.S. Provisional Patent Application Ser. No. 62/236,103 filed Oct. 1, 2015 entitled "Camera System API for Third-Party Integrations," the disclosure of which is incorporated by reference herein in its entirety. This application is also a continuation-in-part and claims priority to U.S. patent application Ser. No. 14/722,003 filed May 26, 2015 entitled "Methods and Apparatus for Using Smart Environment Devices via Application Program Interfaces," the disclosure of which is incorporated by reference herein in its entirety. The U.S. patent application Ser. No. 14/722,003 claims priority to U.S. Provisional Patent Application Ser. No. 62/016,052 filed Jun. 23, 2014 entitled "Methods and Apparatus for Exploiting Application Programming Interfaces to Smart Home Environment Electronic Components," the disclosure of which is incorporated by reference herein in its entirety.

BACKGROUND

Using wireless mesh networking to connect devices to each other, and to cloud-based services, is increasingly popular for sensing environmental conditions, controlling equipment, and providing information and alerts to users. Any number of different electronic devices are used on a daily basis, such as in a home setting where a user may interact with smart thermostats, lighting systems, alarm systems, entertainment systems, camera devices, and a variety of other electronic devices. To control and interact with these electronic devices, a user can communicate commands via a user interface of an application program running on another device, such as a tablet or mobile phone. For example, a user can control the temperature setting of a smart thermostat using an application program running on a mobile phone. In a home setting, the application program running on the mobile phone can communicate via a local network that also connects the smart thermostat. Alternatively, the application program running on the mobile phone can communicate via a secure online service that interacts with the smart thermostat.

A manufacturer of the electronic devices that are connected for mesh networking may also develop the application programs for the user to control and interact with the devices. This can help to maintain the integrity of the system, having the application programs developed by the same manufacturer of the electronic devices. However, allowing third-party developers to design application programs that interact with and control the devices can contribute to an improved user experience, but may also open access for potential undesirable behaviors or misuse of the devices, either unintended or for malicious purposes. Accordingly, while it may be desirable to open access for control and interactions with the electronic devices by third-party developer applications, it may also be desirable to place restrictions on the access so as to reduce the risk that the third-party access may negatively impact the operation of the electronic devices and thus the user experience associated with those devices.

SUMMARY

This summary is provided to introduce simplified concepts of a camera system application program interface (API) for third-party integrations, as well as techniques for camera data access based on subscription status, and is generally related to accessing video data and controlling camera devices (e.g., smart devices) via one or more application program interfaces (APIs). The simplified concepts are further described below in the Detailed Description. This summary is not intended to identify essential features of the claimed subject matter, nor is it intended for use in determining the scope of the claimed subject matter.

A camera system API for third-party integrations, generally related to accessing video data, camera data, and controlling camera devices (e.g., smart devices) via one or more application program interfaces (APIs), is described. In embodiments, a camera device captures images as a video stream and communicates the video stream to a cloud-based service. The cloud-based service implements a service application that processes video data received as the video stream. The cloud-based service exposes the camera system API that can be invoked by a third-party application running on a client device to request the video data and camera data that is associated with the camera device. The API permits access by the third-party application to the video data and the camera data from the cloud-based service. The API is exposed for the third-party application to communicate with the cloud-based service via a network connection, and the camera device communicates with the cloud-based service via a secure connection to provide the requested camera data and communicate the video stream to the cloud-based service. In implementations, the camera data is structured as a data model of data fields, and one or more of the data fields are accessible via the API.

In aspects of the camera system API for third-party integrations, the camera data can include an operational status of the camera device, and the third-party application can receive the operational status of the camera device from the cloud-based service via the API when the cloud-based service receives the operational status from the camera device. The video data can be generated by the service application from the video stream received from the camera device. The video data can include the images of a motion event detected by the camera device and/or the images that correspond to a noise event associated with a sound detected by the camera device. The video data is accessible at the cloud-based service and the API is exposed for the third-party application that is running on the client device to receive the video data from the cloud-based service. Additionally, motion events and/or noise events can be reported by the service application as cue point events to the third-party application via the API as the video stream is received from the camera device and processed by the service application.

In additional aspects of the camera system API for third-party integrations, the API is exposed to the third-party application that is running on the client device to grant permissions to request different forms of the camera data that is associated with the camera device. The permissions are defined in a camera data scope that identifies the camera data the third-party application is permitted to access. The camera data scope can be updated to include additional permissions or fewer permissions to permit access to the different forms of the camera data that is associated with the camera device via the API. The camera data scope can be implemented as a camera read scope that includes permissions allowing the third-party application to access settings of the camera device, motion events associated with detected motions, and noise events associated with detected sounds. Alternatively, the camera data scope can be implemented as a camera write scope that includes the permissions of the camera read scope as well as an additional permission allowing the third-party application to initiate turning the camera device on and off via the API. In other aspects, the camera data scope can be implemented as a camera images read scope that includes permissions allowing the third-party application to access settings of the camera device, images of motion events associated with detected motions, and images that correspond to noise events associated with detected sounds. Alternatively, the camera data scope can be implemented as a camera images write scope that includes the permissions of the camera images read scope as well as an additional permission allowing the third-party application to initiate turning the camera device on and off via the API.

In other embodiments of a camera system API for third-party integrations, a third-party application is running on a client device, and the third-party application can communicate with the cloud-based service via the API. The third-party application may be associated with a garage door company and the camera device can capture the images of a motion event and/or a sound event when a garage door opens. The images that correspond to the motion event and/or the sound event of the garage door opening can then be communicated to the third-party application via the API for display on the client device. Similarly, the third-party application may be associated with a door lock company and the camera device can capture the images of a motion event and/or a sound event when a door lock unlocks. The images that correspond to the motion event and/or the sound event of the door lock unlocking can then be communicated to the third-party application via the API for display on the client device. Similarly, the third-party application may be associated with a doorbell company and the camera device can capture the images of a motion event and/or a sound event when a doorbell rings. The images that correspond to the motion event and/or the sound event of the doorbell ringing can then be communicated to the third-party application via the API for display on the client device.

Similarly, the third-party application may be associated with baby monitoring and the camera device can be utilized for the baby monitoring and to capture the images of a motion event and/or a sound event of a detected motion associated with the baby monitoring. The images that correspond to the motion event and/or the sound event of the detected motion can then be communicated to the third-party application via the API for display on the client device. Similarly, the third-party application may be associated with animal activity monitoring (e.g., pet monitoring) and the camera device can be utilized for the animal activity monitoring and to capture the images of a motion event and/or a sound event of a detected motion associated with the animal activity monitoring. The images that correspond to the motion event and/or the sound event of the detected motion can then be communicated to the third-party application via the API for display on the client device.

In other embodiments of a camera system API for third-party integrations, the client device may be a television device that is designed to communicate with the cloud-based service via the API. The camera device can capture the images of a motion event and/or a sound event of a detected motion, and the images that correspond to the motion event and/or the sound event are communicated to the television device via the API for display. Alternatively, the client device may be a lighting fixture that is designed to communicate with the cloud-based service via the API. The camera device can capture the images of a motion event and/or a sound event of a detected motion, and a service application can initiate turning on a light of the lighting fixture responsive to the motion being detected. Additionally, the service application can initiate turning off the light of the lighting fixture responsive to a lack of motion being detected. Alternatively, the client device may be a wearable device that is designed to communicate with the cloud-based service via the API. The camera device can capture the images of a motion event and/or a sound event of a detected motion, and the service application can initiate a notification of the detected motion to the wearable device.

Camera data access based on subscription status, generally related to accessing live video data, recorded video data, and camera data via one or more application program interfaces (APIs), is described. In embodiments, a camera device owned by a user captures images as a video stream and communicates the video stream to a cloud-based service. The cloud-based service receives the video from the camera device, and records and maintains the video as recorded video data. The cloud-based service implements a service application to manage subscription levels that each delineate a level of access to the recorded video data associated with the camera device. The service application can then allow a client device application all access, some access, or no access to the recorded video data based on a subscription level corresponding to the camera device. The subscription levels can include a first subscription level that provides access to the live video captured by the camera device, and at least a second subscription level that provides access to both the live video and the recorded video data.

BRIEF DESCRIPTION OF THE DRAWINGS

Embodiments of a camera system application program interface (API) for third-party integration, and embodiments of camera data access based on subscription status, are described with reference to the following drawings. The same numbers are used throughout the drawings to reference like features and components.

DETAILED DESCRIPTION

Figure 1:
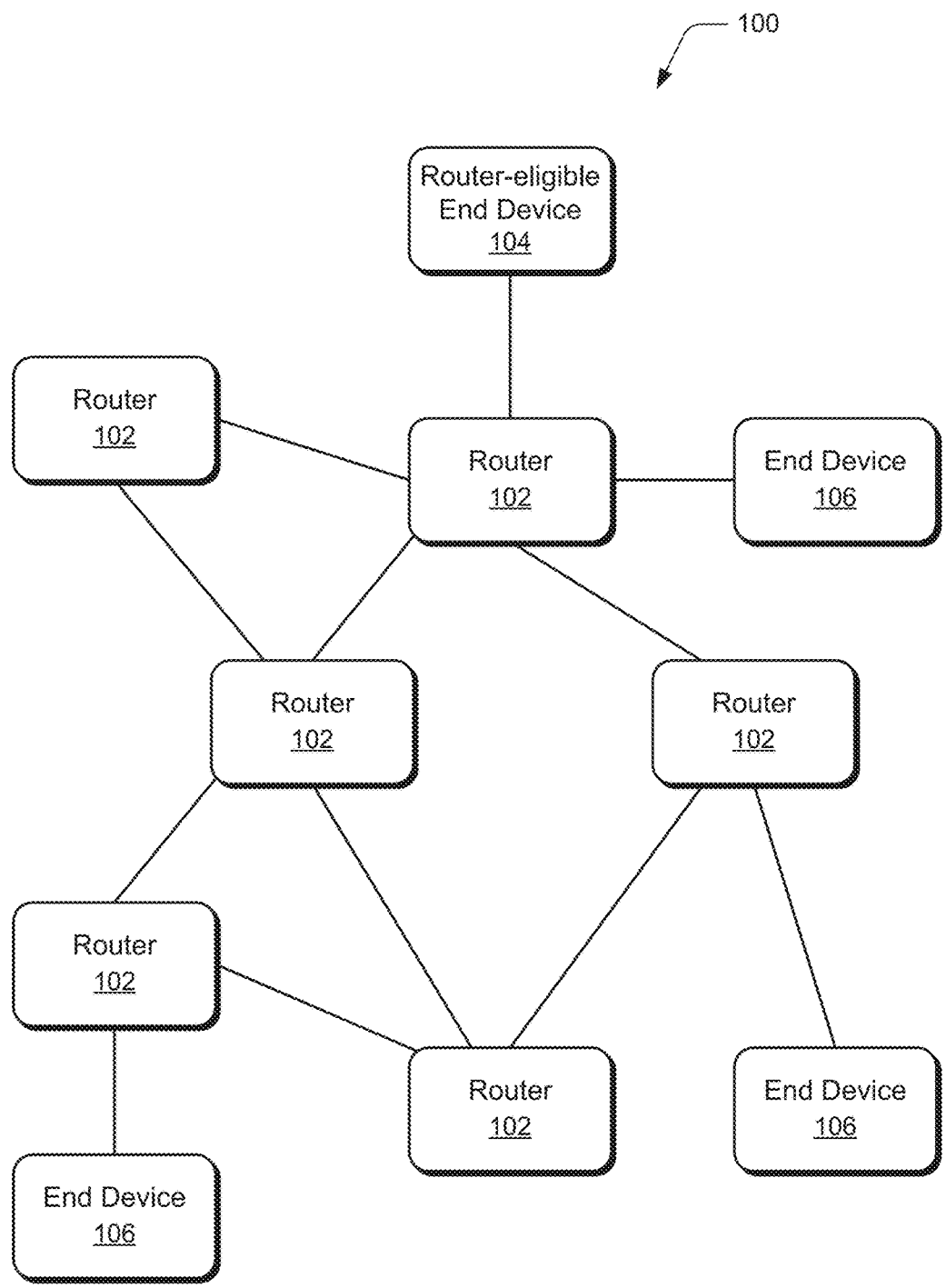
FIG. 1 illustrates an example mesh network system in which various embodiments of a camera system API for third-party integrations, as well as camera data access based on subscription status, can be implemented.

Wireless mesh networks are communication networks having wireless nodes connected in a mesh topology that provides reliable and redundant communication paths for traffic within a mesh network. Wireless mesh networks use multiple radio links, or hops, to forward traffic between devices within the mesh network. This provides coverage for areas larger than the area covered by a single radio link. Wireless mesh networking can be utilized to connect devices to each other, and to cloud-based services, for sensing environmental conditions, controlling equipment, and providing information and alerts to users. For example, any number of different electronic devices may be implemented in a home setting where a user can interact with smart thermostats, lighting systems, alarm systems, entertainment systems, camera devices, and a variety of other electronic devices. To control and interact with these electronic devices, a user can communicate commands via a user interface of an application program running on another device, such as a tablet or mobile phone.

In embodiments of a camera system application program interface (API) for third-party integration, a cloud-based service exposes the API that can be invoked by a third-party application running on a client device to request video data and camera data associated with a camera device that is implemented in a mesh network. The camera device captures images as a video stream and communicates the video stream to the cloud-based service where a service application processes the video stream to generate video data that can be communicated to the third-party application via the API.

In embodiments of camera data access based on subscription status, a camera device owned by a user captures and communicates video to a cloud-based service that records and maintains the video as recorded video data. The cloud-based service implements a service application to manage subscription levels that each delineate a level of access to the recorded video data associated with the camera device. The service application can then allow a client device application all access, some access, or no access to the recorded video data based on a subscription level corresponding to the camera device. The subscription levels can include a first subscription level that provides access to the live video captured by the camera device, and at least a second subscription level that provides access to both the live video and the recorded video data. Other levels or tiers of subscription status can be implemented to allow, partially allow, or prevent third-party applications having access to the live video stream, recorded video data, notifications, and/or camera data that corresponds to a camera device of the user.

Generally, this disclosure relates to various electronic devices that can be implemented in a mesh network, such as a camera device to capture motion events and/or sound events that are associated with the motion events. Other electronic devices that can be implemented in a mesh network include a smart thermostat and a hazard detector (e.g., smoke detector, carbon monoxide detector, etc.), that is implemented in a building (e.g., home or office) such that the electronic device may detect the presence of a human being in the building, as well as distinguish between the presence of the human being and a pet. Generally, the electronic devices utilize a sensor, such as a passive infrared (PIR) sensor, to detect the presence of a human being. However, each PIR sensor may be inherently sensitive to different levels of noise. By accounting for the different sensitivity levels of each PIR sensor, the electronic device may improve its detection of human beings and better distinguish between the presence of human beings and pets.

An electronic device that is implemented in a mesh network may include a low-power processor that stores the sensor measurements acquired by the PIR sensor during a time period when the electronic device does not expect a human in the building or portion of the building being monitored by electronic device is not expected to have a human being present. In one embodiment, after storing the sensor measurements over some period of time, the low-power processor may send the stored sensor measurements to a high-power processor of the electronic device. The high-power processor may then calculate a threshold or adjust the previous threshold for determining a presence of a human based on the stored sensor measurements that correspond to the time period when a human being is likely not present in the building. The high-power processor may then send the newly calculated or the adjusted threshold to the low-power processor. The low-power processor may then use the newly calculated or the adjusted threshold to detect the presence of a human. Since the new threshold is calculated based on the respective sensor measurements for the respective PIR sensor of a respective electronic device, the new threshold may compensate for the inherent sensitivity characteristics of the respective PIR sensor. As a result, the electronic device may detect the presence of a human being more effectively and efficiently.

While features and concepts of the described systems and methods for a camera system API for third-party integrations can be implemented in any number of different environments, systems, devices, and/or various configurations, embodiments of a camera system API for third-party integrations are described in the context of the following example devices, systems, and configurations.

Mesh Network Environment

FIG. 1 illustrates an example system of a mesh network 100 in which various embodiments of a camera system API for third-party integrations can be implemented. The mesh network 100 is a wireless mesh network that includes routers 102, a router-eligible end device 104, and end devices 106 (e.g., camera devices, thermostats, and hazard detectors). The routers 102, the router-eligible end device 104, and the end devices 106, each include a mesh network interface for communication over the mesh network. The routers 102 receive and transmit packet data over the mesh network interface, and the routers 102 also route traffic across the mesh network 100.

The router-eligible end devices 104 are located at leaf nodes of the mesh network topology and are not actively routing traffic to other nodes in the mesh network 100. The router-eligible device 104 is capable of becoming a router 102 when the router-eligible device 104 is connected to additional mesh network devices. The end devices 106 are devices that can communicate using the mesh network 100, but lack the capability, beyond simply forwarding packets to its parent router 102, to route traffic in the mesh network 100. For example, a battery-powered sensor is one type of end device 106.

Some end devices 106 may power down (i.e., sleep) some operations or hardware for a portion of the time the end device 106 is operational. For example, the end device 106 may power down radios or network interfaces, to conserve power between operations that require a connection to the mesh network 100. For example, a battery-powered temperature sensor may only be awake periodically to transmit a report of temperature, and then the temperature sensor sleeps until the next time the temperature sensor reports. When the end devices 106 sleep, the end devices 106 are not actively connected to the mesh network 100 to response to address queries or to receive data packets over the mesh network 100.

Figure 2:
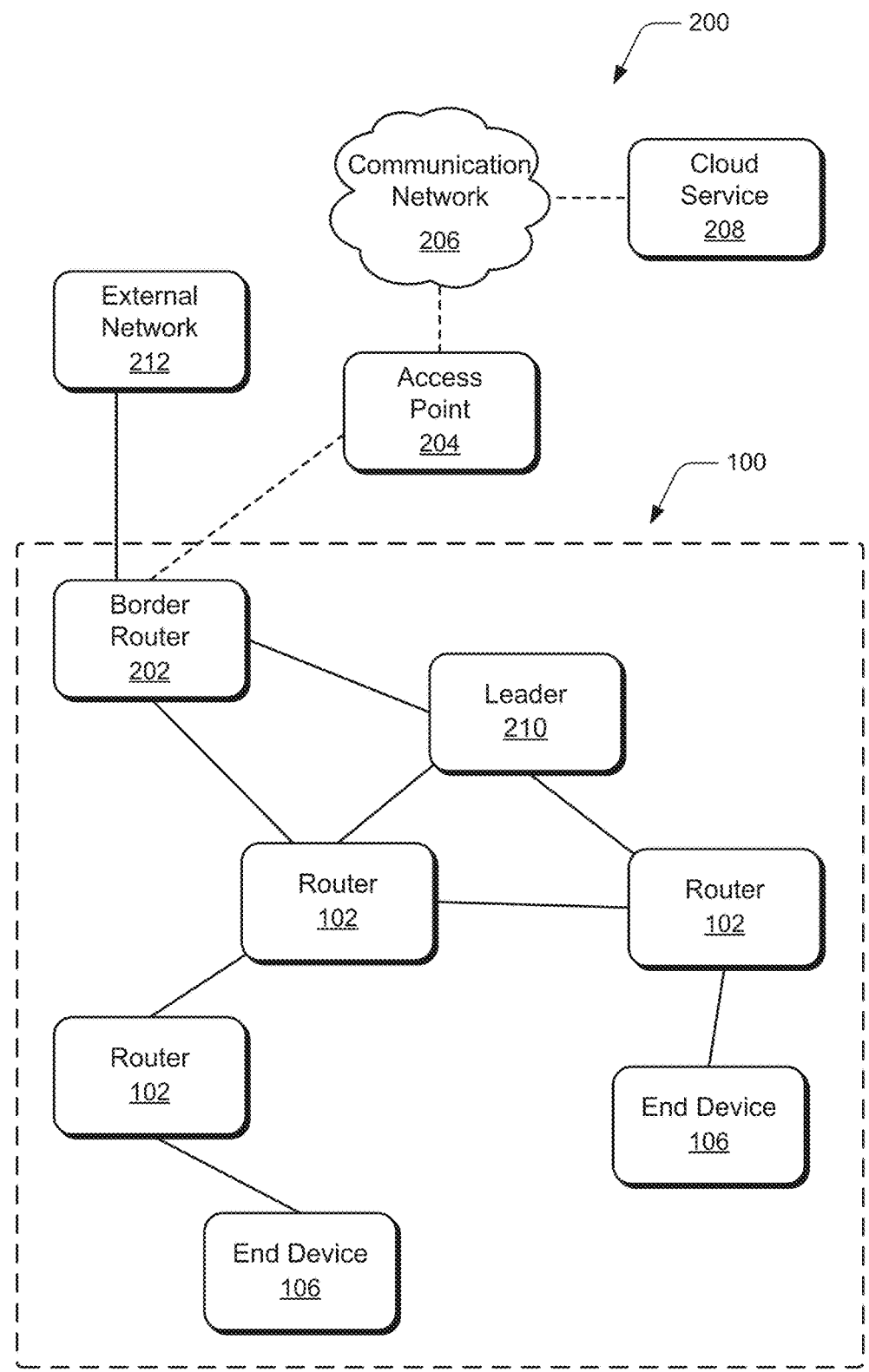
FIG. 2 illustrates an example environment of a mesh network system in which various embodiments of a camera system API for third-party integrations, as well as camera data access based on subscription status, can be implemented.

FIG. 2 illustrates an example environment 200 in which various embodiments of a camera system API for third-party integrations techniques can be implemented. The environment 200 includes the mesh network 100, in which some routers 102 are performing specific roles in the mesh network 100.

A border router 202 (also known as a gateway and/or an edge router) is one of the routers 102. The border router 202 includes a second interface for communication with an external network, outside the mesh network 100. The border router 202 connects to an access point 204 over the external network. For example, the access point 204 may be an Ethernet router, a Wi-Fi access point, a cellular base station, or any other suitable device for bridging different types of networks. Although a single border router 202 is shown in FIG. 2, for the sake of clarity, the mesh network 100 may have any number of border routers 202, which may connect to any number of external networks. In another implementation, an end device 106 may operate as a border router 202. In this case the end device operating as the border router 202 is routing traffic between the mesh network 100 and an external network, but not routing traffic between other mesh network devices.

The access point 204 connects to a communication network 206, such as the Internet. A cloud service 208, which is connected via the communication network 206, provides services related to and/or using the devices within the mesh network 100. By way of example, and not limitation, the cloud service 208 provides applications that include connecting end user devices, such as smart phones, tablets, and the like, to devices in the mesh network 100, processing and presenting data acquired in the mesh network 100 to end users, linking devices in one or more mesh networks 100 to user accounts of the cloud service 208, provisioning and updating devices in the mesh network 100, and so forth.

One of the routers 102 can perform the role of a leader 210 for the mesh network 100. The leader 210 manages router identifier assignment, is the central arbiter of network configuration information, and propagates network data, which includes the network configuration information, for the mesh network 100. Alternatively or in addition, the mesh network 100 may be connected to an external network 212 via the border router 202. Although only one external network is shown in this example, any border router 202 may connect to any number of the external networks, and any number of physical or virtual networks may be connected to the mesh network 100 using any suitable networking technology.

Camera System API for Third-Party Integrations

Figure 3:
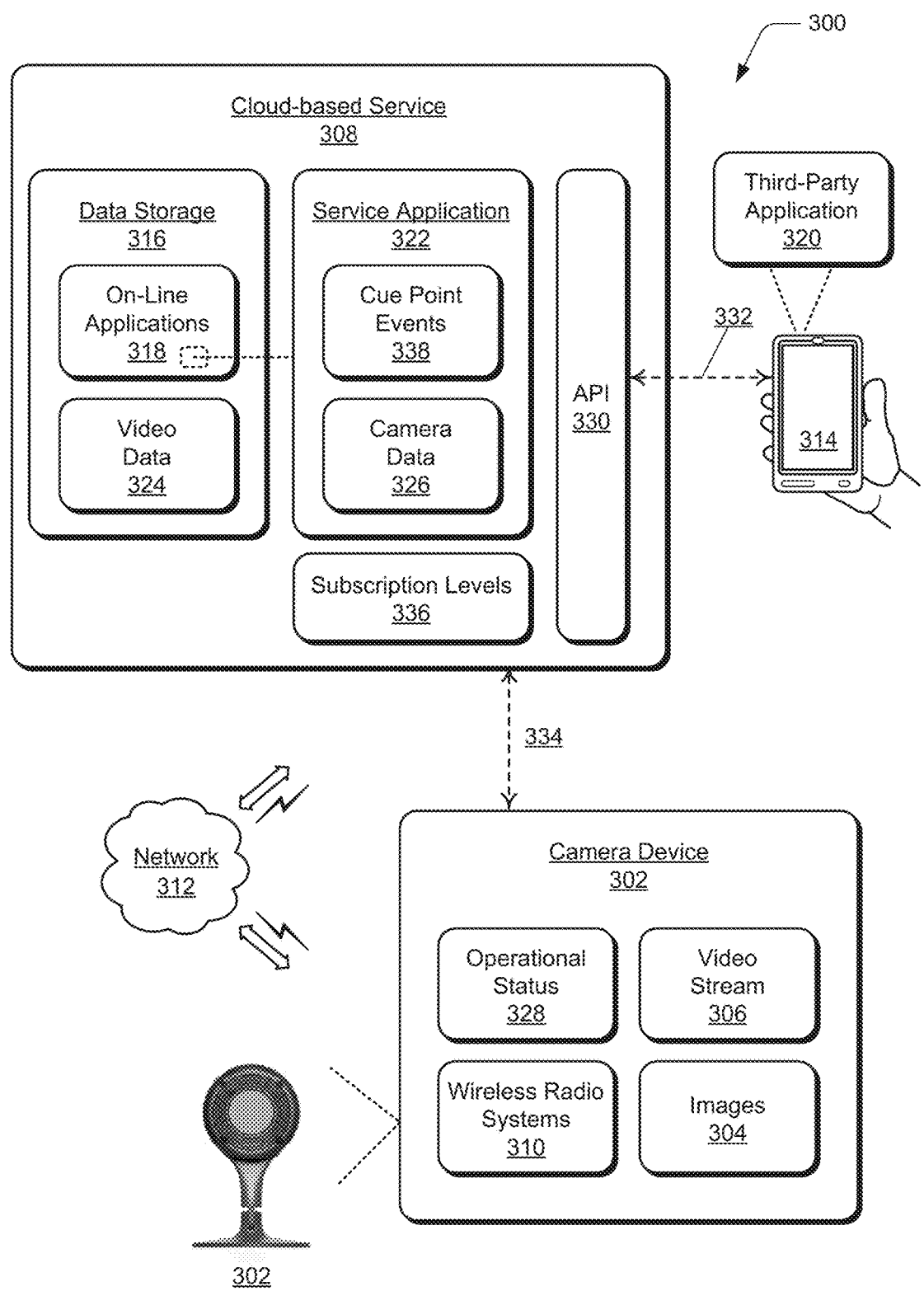
FIG. 3 illustrates an example system in which embodiments of a camera system API for third-party integrations techniques, as well as camera data access based on subscription status techniques, can be implemented.

FIG. 3 illustrates an example system 300 in which various embodiments of a camera system API for third-party integrations techniques, as well as techniques for camera data access based on subscription status, can be implemented. The example system 300 includes a camera device 302, such as may be implemented as a smart device in a mesh network as described with reference to FIGS. 1 and 2. The camera device 302 is implemented to capture images 304 that are communicated as a video stream 306 to a cloud-based service 308. The camera device 302 can be implemented with various components, such as a processor (or processing system) and memory, as well as with any number and combination of differing components as further described with reference to the example mesh network device shown in FIG. 23. For example, the camera device can include different wireless radio systems 310 such as for Wi-Fi, Bluetooth™, Mobile Broadband, and/or point-to-point IEEE 802.15.4. Each of the different radio systems can include a radio device, antenna, and chipset that is implemented for a particular wireless communications technology with other devices, networks, and services.

The cloud-based service 308 of the example system 300 is accessible via a network 312 by client devices, such as a client device 314 (e.g., illustrated as a mobile phone or tablet device) or other types of computing devices. The cloud-based service 308 is also accessible via the network 312 by mesh network devices, such as the camera device 302. Any of the devices, servers, and/or services described herein can communicate via the network 312, such as for data communication between the client device 314 and the cloud-based service 308, and for data communication between the camera device 302 and the cloud-based service 308. The network can be implemented to include a wired and/or a wireless network. The network can also be implemented using any type of network topology and/or communication protocol, and can be represented or otherwise implemented as a combination of two or more networks, to include IP-based networks and/or the Internet. The network may also include mobile operator networks that are managed by a mobile network operator and/or other network operators, such as a communication service provider, mobile phone provider, and/or Internet service provider.

The cloud-based service 308 includes data storage 316 that may be implemented as any suitable memory, memory device, or electronic data storage for network-based data storage. The data storage can maintain on-line applications 318 (e.g., as network-based applications), that are accessible by a third-party application 320 running on the client device 314. The cloud-based service 308 can also be implemented with server devices that are representative of one or multiple hardware server devices of the cloud-based service. Further, the cloud-based service 308 can be implemented with various components, such as a processing system and memory, as well as with any number and combination of differing components as further described with reference to the example device shown in FIG. 26 to implement the services, applications, servers, and other features described herein.

In this example, the cloud-based service 308 implements a service application 322 as a software application or module, such as computer-executable software instructions that are executable with a processor (or processing system) to implement embodiments of a camera system API for third-party integrations as described herein. The service application 322 can be stored on computer-readable storage memory (e.g., in a device memory or data storage 316), such as any suitable memory device or electronic data storage. The cloud-based service 308 receives the video stream 306 that is communicated from the camera device 302, and the service application 322 can process the video stream to generate video data 324 that is maintained by the data storage 316. The cloud-based service 308 can also receive camera data 326 from the camera device, such as an operational status 328 of the camera device 302 to indicate whether the camera device is turned on to record the video stream, or whether the camera device is turned off.

In embodiments, the cloud-based service 308 exposes the camera system API 330 that can be invoked by the third-party application 320 running on the client device 314 to request the video data 324 and the camera data 326 that is associated with the camera device 302. The camera system API 330 provides a set of static values that describe the configuration, system, location, and/or environment of the camera device 302, and the API 330 permits access by the third-party application 320 to the video data 324 and the camera data 326 from the cloud-based service. The API 330 is exposed for the third-party application 320 to communicate with the cloud-based service 308 via a network connection 332, and the camera device 302 communicates with the cloud-based service 308 via a secure connection 334 to provide the requested camera data and communicate the video stream 306 to the cloud-based service.

In implementations, the camera data 326 is structured as a data model of data fields, and one or more of the data fields are accessible via the API 330. In embodiments, the camera system API 330 is applicable within a WWN (Works with Nest®®) architecture that is shown and described with reference to FIGS. 10-21. The architecture describes an API 90, cloud services 145, and a data model of which the camera system API 330, the cloud-based service 308, and the camera data 326, which is structured as the camera data model of the data fields, as shown and described with reference to FIG. 3, are examples that may be implemented in the architecture with the techniques described for the camera system API for third-party integrations and camera data access based on subscription status.

An example of the data fields in the camera data model of the camera data 326 that pertains to the camera device 302 includes (but is not limited to) the data fields in the following listing:

device_Id
 type: string
 description: Camera unique identifier
 semantics: encrypted id part of quartz bucket key in CZ
software_version
 type: string
 description: Software version
 semantics: software_version field in CZ
structure_id
 type: string
 description: Unique structure identifier
 semantics: encrypted structure_id field in CZ
where_id
 type: string
 description: Where unique identifier
 semantics: encrypted where_id field in CZ
name
 type: string
 description: Display name of the device
 semantics: same as other devices
name_long
 type: string
 description: Long display name of the device
 semantics: same as other devices or use description (description in CZ=title on DC side)
is_online
 type: boolean
 description: Device connection status with the Nest service
 semantics: deduced from CZ streaming_state field; true if streaming state is equal to one of "online-disabled", "online-enabled", "streaming-enabled"
is_streaming
 type: boolean
 description: Device streaming status
 semantics: deduced from CZ streaming_state field; true if streaming state is equal to "streaming-enabled"
 write semantics: change streaming_enabled_by_wwn.state and streaming_enabled_by_wwn.last_updated CZ fields and emit message to the Nest-Dropcam queue for Chompy.
is_audio_input_enabled
 type: boolean description: Device microphone input streaming configuration
semantics: new audio enabled field in CZ, defaults to true
last_is_online_change
type: string
description: Last time is_online value changed (i.e. when it was online last time if it is offline now or when it was offline last time if it is online now)
semantics: translate to ISO8601 datetime maximum of last connect time and last disconnect time CZ fields
web_url
type: string
description: Device Web URL
semantics:
    <web_url_prefix>cameras/<device_id>?auth=<access_token>
app_url
type: string
description: Device Nest Application URL
semantics: <app_url_prefix>cameras/<device_id>?auth=<access_token>
is_video_history_enabled
type: boolean
description: Whether the device is enrolled in CVR
semantics: deduced from new CZ field cvr_enrolled; true if cvr_enrolled!="none"
last_event
type: object
description: Last interesting cuepoint, before the first cuepoint is written this field is absent
last_event.has_sound
type: boolean
description: Cuepoint status of audio detection
semantics: deduced from CZ last_cuepoint.types field; true if last_cuepoint.types.split(';').contains("audio")
last_event.has_motion
type: boolean
description: Cuepoint status of motion detection
semantics: deduced from CZ last_cuepoint.types_field; true if last_cuepoint.types.split(';').contains("motion")
last_event.start_time
type: string
description: Beginning time of cuepoint in ISO8601 format
semantics: translate to ISO8601 datetime last_cuepoint.start_time CZ field
last_event.end_time
type: string
description: End time of cuepoint in ISO8601 format
semantics: translate to ISO8601 datetime last_cuepoint.end_time CZ field; null until the event is complete
last_event.urls_expire_time
type: boolean
description: Time the event URLs will expire
semantics: if last_cuepoint.urls_expire_time is present translate to ISO8601 datetime last_cuepoint.urls_expire_time CZ field else use last_cuepoint.start_time and add duration derived from last_cuepoint.cvr_enrolled CZ field: do not generate if last_cuepoint.urls_expire_time<=now
last_event.web_url
type: string
description: Cuepoint Web URL
semantics: <web_url_prefix>cameras/<device_id>/cuepoints/<encrypted last_cuepoint.id>?auth=<access_token>; do not generate if last_cuepoint.urls_expire_time<=now
last_event.app_url
type: string
description: Cuepoint Nest Application URL
semantics: <app_url_prefix>cameras/<device_id>/cuepoints/<encrypted last_cuepoint.id>?auth=<access_token>; do not generate if last_cuepoint.urls_expire_time<=now
last_event.image_url
type: string
description: Cuepoint image URL
semantics: <last_cuepoint.image_url_prefix>/<device_id>/<encrypted last_cuepoint.image_url_suffix>?auth=<access_token>; do not generate if last_cuepoint.urls_expire_time<=now
last_event.animated_image_url
type: string
description: Cuepoint animated image URL
semantics: <last_cuepoint.animated_image_url_prefix>/<device_id>/<encrypted last_cuepoint.animated_image_url_suffix>?auth=<access_token>; do not generate if last_cuepoint.urls_expire_time<=now The data fields of the camera data model include the device_id data field identifies the camera device 302, given precautions to obfuscate any user identifier. The software_version data field identifies the most recent version of software that the camera device 302 is running. The structure_id data field identifies the physical structure (e.g., an apartment, house, building, etc.) where the mesh network devices, including the camera device 302, are clustered together. The where_id data field identifies the location of the camera device 302 in the structure, such as in a particular room or location. The name data field can be used to indicate a user readable name of the camera device 302, such as "office camera" and the like. The is_online data field indicates a status as to whether the device is connected to the server, and the is_streaming data field indicates whether the camera device 302 is actually streaming the video data as the video stream 306. The data field for is_audio_input_enabled indicates whether a microphone of the camera device is turned on.

The data fields of the camera data model also include the last_is_online_change data field to indicate the last online state change of the camera device 302 from on-to-off, or off-to-on. The more the camera device changes state from on-to-off, or from off-to-on, can be indicative of network connectivity or camera operational issues. The data field for is_video_history_enabled is a Boolean yes/no to indicate whether a customer of the camera device 302 has a subscription for cloud video recording (CVR) and whether the CVR is enabled. The web_url and app_url data fields allow the third-party application 320 to link to the service applications, such as proprietary applications associated with the camera device 302. For example, a third-party security monitoring application can link directly to a specific camera page of the camera device 302 to display the images 304 that may be associated with a cue point event (e.g., a motion event and/or a sound event that corresponds to the motion event). The "last_event" data fields indicate event history and correspond to a last cue event, such as a motion event and/or a sound event that corresponds to the motion event that is detected by the camera device.

An example of the camera system API 330 that is implemented at the cloud-based service 308 is included below, and can be invoked by the third-party application 320 running on the client device 314 to request the video data 324 and the camera data 326 that is associated with the camera device 302. An implementation example of the camera system API:

```
{
"devices":{
"cameras":{
    "device_id": "awJo6rH...",
    "software_version": '4.0",
    "structure_id": "VqFabWH21nwVyd4RWgJgnb292wa7hG...",
    "where_id": "d6reb_OZTM...",
    "name": "Hallway (upstairs)",
    "name_long": "Hallway camera (upstairs)",
    "is_online": true,
    "is_streaming": true,
    "is_audio_input_enabled": true,
    "last_is_online_change": "2015-12-29T18:42:00.000Z",
    "is_video_history_enabled": true,
    "web_url":
    "https://home.nest.com/cameras/device_id?auth=access_token",
    "last_event": {
}}}
```

The camera system API 330 allows developers to create their own third-party applications to control devices that integrate with the camera device 302, and with the camera system API 330, can access video data and camera data to interface with their device. For example, the third-party application 320 may be associated with a door lock company and the camera device 302 can capture the images of a motion event and/or a sound event when a door lock unlocks. The images 304 of video that correspond to the motion event and/or the sound event of the door lock unlocking can then be communicated to the third-party application 320 via the API 330 for display on the client device 314. For example, an animation of the motion event can be viewed in a user interface of the third-party application 320 on the client device 314.

In embodiments of the camera system API for third-party integrations, the camera device 302 that is owned by a user captures the images 304 as video and communicates the video to the cloud-based service 308. The camera can be located for surveillance by the user of the camera device. The cloud-based service receives the video from the camera device, and records and maintains the video as recorded video data (e.g., the video data 324 maintained by the cloud-based service). The service application 322 is also implemented to manage subscription levels 336 that each delineate a level of access to the recorded video data 324 associated with the camera device 302. A subscription level corresponding to the camera device is funded by the user who owns the camera device. The service application can then allow a client device application, such as the third-party application 320, all access, some access, or no access to the recorded video data based on a subscription level corresponding to the camera device. The subscription levels 336 can include a first subscription level that provides access to the live video captured by the camera device (e.g. the video stream 306 that is communicated to the cloud-based service 308), and at least a second subscription level that provides access to both the live video and the recorded video data.

In embodiments, the camera device can be associated with multiple-tiered services, subscription tiers, and/or subscription levels. As a subscription-based device, a user can purchase the camera device 302, which comes with a basic level of functionality, such as for live video streaming where the user can access and watch the current, real-time video, as well as receive real-time notifications for detected motion and/or audio events. The user owner of the camera device 302 may also subscribe (e.g., purchase monthly) to additional subscription levels of functionality, such as camera control and for access to the cloud recorded video data 324 over a past number of days or hours, as well as access to a more comprehensive set of functionality. These subscription levels and functionality are managed by the cloud-based service to allow or prevent user access to the video data and camera data, to protect the user's video information from third-party developers, and to allow the use of the camera device that interfaces with other third-party products. Essentially, the API limits developer ability to provide camera information (e.g., camera data and video data) to a user who is not entitled to receive the information, such as having subscribed to a subscription level of access.

The "is_video_history_enabled" data field of the camera data model of the camera data 326 is implemented as a Boolean value "on" or 'off' to indicate whether a particular camera device is enrolled (e.g., has an associated subscription) for cloud video recording (CVR), such as on a per month subscription basis:
  is_video_history_enabled
  type: boolean
  description: Whether the device is enrolled in CVR
  semantics: deduced from new CZ field cvr_enrolled: true
    if cvr_enrolled!="none"

The "is_video_history_enabled" data field can also be implemented on a per user, per device subscription basis. For example, a user may purchase more than one camera device 302, and each device has a corresponding subscription level that allows a client device application all access, some access, or no access to the recorded video data associated with one of the particular camera devices of the user. Another enrolled subscription feature is the "last_cuepoint.cvr_enrolled" in the data field "last_event.urls_expire_time" of the camera data model, which indicates the time that the event URLs will expire, and the different information that can be provided depending on whether the user of the camera device 302 is enrolled in the CVR program on a subscription basis:
  last_event.urls_expire_time
  type: boolean
  description: Time the even URLs will expire
  semantics: if last_cuepoint.urls_expire_time is present
    translate to ISO8601 datetime last_cuepoint.urls_expire_time CZ field else use last_cuepoint.start_time and add duration derived from last_cuepoint.cvr_enrolled CZ field; do not generate if last_cuepoint.uris_expire_time<=now As noted above, the camera data 326 can include an operational status 328 of the camera device 302, and the third-party application 320 can receive the operational status 328 of the camera device from the cloud-based service 308 via the API 330 when the cloud-based service receives the operational status 328 from the camera device. Further, the video data 324 can be generated by the service application 322 from the video stream 306 that is received from the camera device. The video data 324 can include the images of a motion event detected by the camera device and/or the images that correspond to a noise event associated with a sound detected by the camera device. In implementations, a motion may be determined based on a displacement of an entity from one image 304 to one or more subsequent images of the video stream and/or the motion may be determined based on detected audio that is indicative of the motion of the entity. The video data 324 is accessible at the cloud-based service 308 and the API 330 is exposed for the third-party application 320 that is running on the client device 314 to receive the video data 324 from the cloud-based service.

Additionally, motion events and/or noise events can be reported by the service application 322 as cue point events 338 to the third-party application 320 via the API 330 as the video stream 306 is received from the camera device 302 and processed by the service application. Collectively, detected motion events and detected noise events are the cue point events 338 that are determined from the images of the video stream 306 received from the camera device 302. Generally, a cue point event 338 is detected as a change of viewpoint in the field of view of the camera device, or as a sound event that may indicate a detected motion. The cue point events can be reported for security to a user of the third-party application 320 with approximately the same frequency (e.g., in real-time with very little time lag) at which the camera device generates the images 304 that are communicated to the cloud-based service 308 as the video stream 306. Although the service application 322 is described as processing the video stream 306 to generate the video data 324 and the cue point events 338 at the cloud-based service 308, the service application may be implemented by the camera device 302 and/or by another computing device that is communicatively linked in a mesh network with the camera device.

Figure 4:
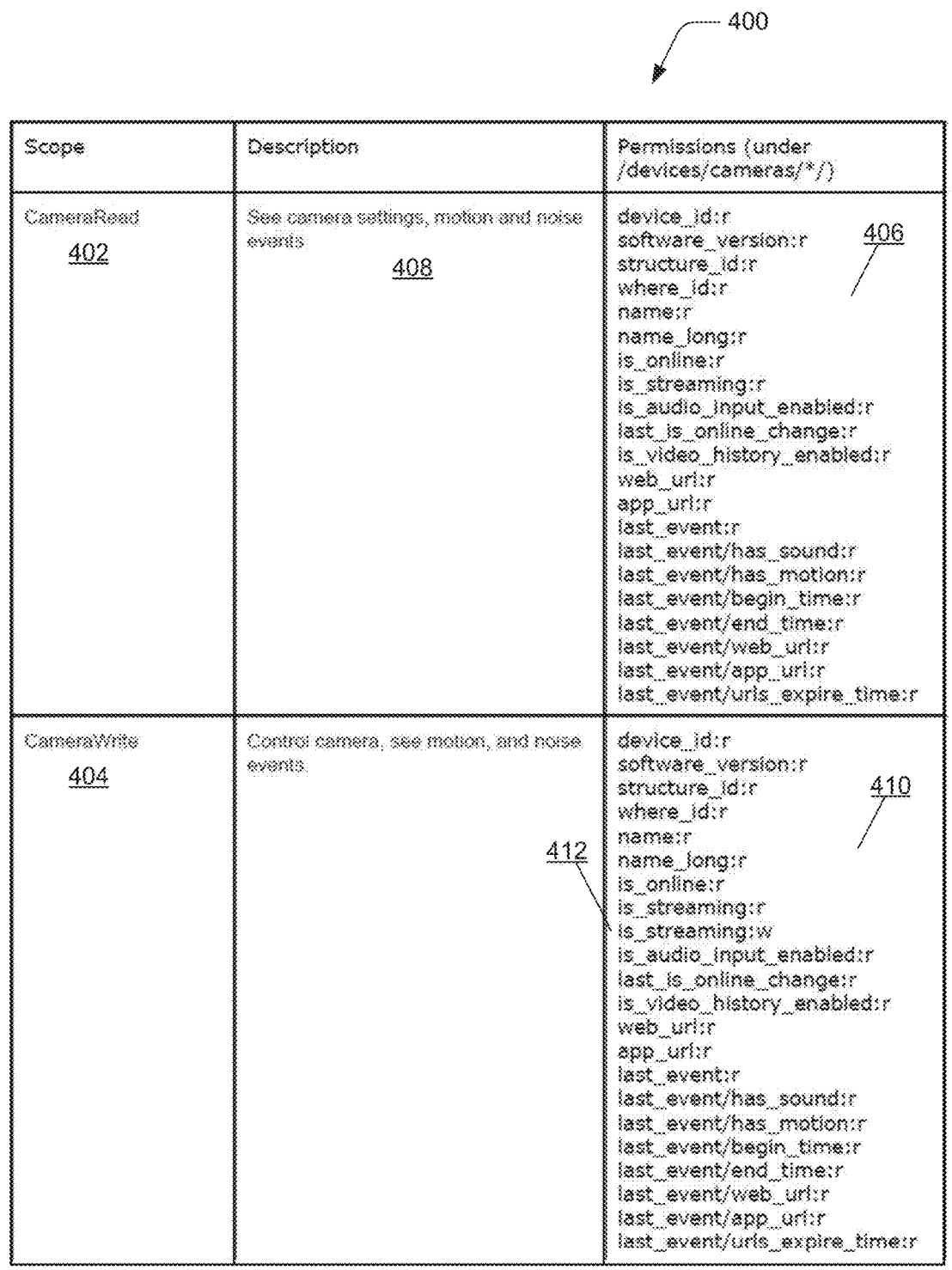
FIGS. 4 and 5 illustrate examples of camera data scopes in implementations of the camera system API for third-party integrations and data access based on subscription status as described herein.
Figure 5:
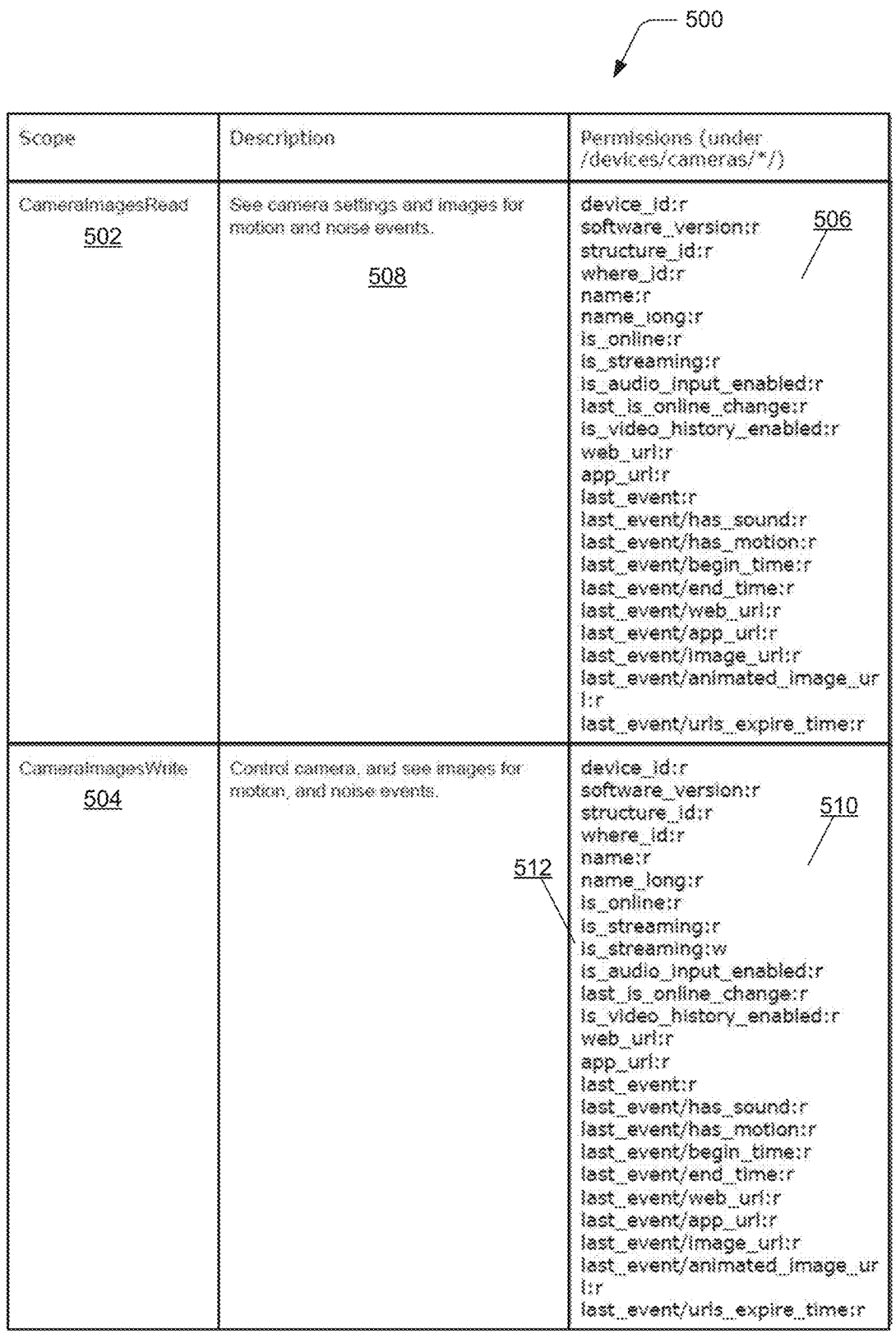

In additional aspects of the camera system API for third-party integrations, the API 330 is exposed to the third-party application 320 that is running on the client device 314 to grant permissions to request different forms of the camera data 326 that is associated with the camera device 302. The permissions are defined in a camera data scope that identifies the camera data the third-party application 320 is permitted to access. Examples of different camera data scopes that identify the camera data the third-party application 320 running on the client device 314 is permitted to access are shown in FIGS. 4 and 5, and are further described below. The camera data scope provides overarching permissions that a user, owner of the camera device 302 can grant to a third party (e.g., the third-party application 320 that is running on the client device 314), and access to the permissions in the camera data scope are enabled by the API 330. The camera data scope can be updated to include additional permissions or fewer permissions to permit access to the different forms of the camera data 326 (e.g., as the data fields) that is associated with the camera device 302. In implementations, the camera data scope can also include data fields and permissions associated with image enhancements, facial recognition, camera field of view zones, and other features related to capturing images with a camera device.

FIG. 4 illustrates examples 400 of the camera data scope, such as a camera read scope 402 or a camera write scope 404. The camera read scope 402 allows the third-party application 320 to read camera settings of the camera device 302, and includes the permissions 406 allowing the third-party application 320 to access settings of the camera device, motion events associated with detected motions, and noise events associated with detected sounds, as described at 408. Alternatively, the camera data scope can be implemented as the camera write scope 404 that includes the permissions 410 of the camera read scope 402 as well as an additional permission 412 allowing the third-party application 320 to initiate turning the camera device 302 on and off via the API 330. The additional permission 412 of "is_streaming:w" allows that the camera device 302 can be turned on through the API 330 based on the "w" extension for read/write.

FIG. 5 illustrates other examples 500 of the camera data scope, such as a camera images read scope 502 or a camera images write scope 504. The camera images read scope 502 includes permissions 506 allowing the third-party application 320 to access settings of the camera device, images of motion events associated with detected motions, and images that correspond to noise events associated with detected sounds, as described at 508. Alternatively, the camera data scope can be implemented as the camera images write scope 504 that includes the permissions 510 of the camera images read scope 502 as well as an additional permission 512 allowing the third-party application 320 to initiate turning the camera device 302 on and off via the API 330. The additional permission 512 of "is_streaming:w" allows that the camera device 302 can be turned on through the API 330 based on the "w" extension for read/write.

In implementations of a camera system API for third-party integrations, a third-party application 320 is running on a client device 314, and the third-party application can communicate with the cloud-based service 308 via the API 330. The third-party application 320 may be associated with a garage door company and the camera device can capture the images of a motion event and/or a sound event when a garage door opens. The images 304 that correspond to the motion event and/or the sound event of the garage door opening can then be communicated to the third-party application via the API 330 for display on the client device 314. Similarly, the third-party application 320 may be associated with a door lock company and the camera device can capture the images of a motion event and/or a sound event when a door lock unlocks. The images 304 that correspond to the motion event and/or the sound event of the door lock unlocking can then be communicated to the third-party application 320 via the API 330 for display on the client device 314. For example, an animation of the motion event can be viewed in a user interface of the third-party application 320 on the client device 314.

Similarly, the third-party application 320 may be associated with a doorbell company and the camera device 302 can capture the images of a motion event and/or a sound event when a doorbell rings. The images 304 that correspond to the motion event and/or the sound event of the doorbell ringing can then be communicated to the third-party application 320 via the API 330 for display on the client device. For example, a user can turn the camera device 302 on or off via the third-party application 320 from the client device 314, and when the camera device 302 senses motion, such as when no persons are present in a home or building, the third-party application 320 can initiate recording the images to capture potential motion events.

Similarly, the third-party application 320 may be associated with baby monitoring and the camera device 302 can be utilized for the baby monitoring and to capture the images of a motion event and/or a sound event of a detected motion associated with the baby monitoring. For example, the third-party application 320 can interface with the camera device 302 to display images at the client device 314 for the parents of a baby when the baby is sleeping or stirring about in a nursery. The images 304 that correspond to the motion event and/or the sound event of the detected motion (e.g., of the baby) can then be communicated to the third-party application 320 via the API 330 for display on the client device 314. Similarly, the third-party application 320 may be associated with animal activity monitoring (e.g., pet monitoring) and the camera device 302 can be utilized for the animal activity monitoring and to capture the images of a motion event and/or a sound event of a detected motion associated with the animal activity monitoring (e.g., pet monitoring and pet activities). The images 304 that correspond to the motion event and/or the sound event of the detected motion can then be communicated to the third-party application 320 via the API 330 for display on the client device 314.

In other embodiments of a camera system API for third-party integrations, the client device 314 may be a television device that is designed to communicate with the cloud-based service 308 via the API 330. For example, the client device 314 may be a television receiver, an integrated receiver and display device, or a mobile device that can receive and display television content, such as a mobile phone or tablet device. The camera device 302 can capture the images of a motion event and/or a sound event of a detected motion, and the images 304 that correspond to the motion event and/or the sound event are communicated to the television device via the API 330 for display. Alternatively, the client device 314 may be a wearable device that is designed to communicate with the cloud-based service 308 via the API 330. The camera device can capture the images of a motion event and/or a sound event of a detected motion, and the service application 322 can then initiate a notification of the detected motion to the wearable device.

Alternatively, the client device 314 may be a lighting fixture that is designed to communicate with the cloud-based service 308 via the API 330. The camera device 302 can capture the images of a motion event and/or a sound event of a detected motion, and the service application 322 can initiate turning on a light of the lighting fixture responsive to the motion being detected. For example, the camera device 302 can detect a motion or sound and a light or lights are turned on to appear as if a person is present in a home or building. Additionally, the service application 322 can initiate turning off the light of the lighting fixture responsive to a lack of motion being detected, such as to conserve energy.

Figure 6:
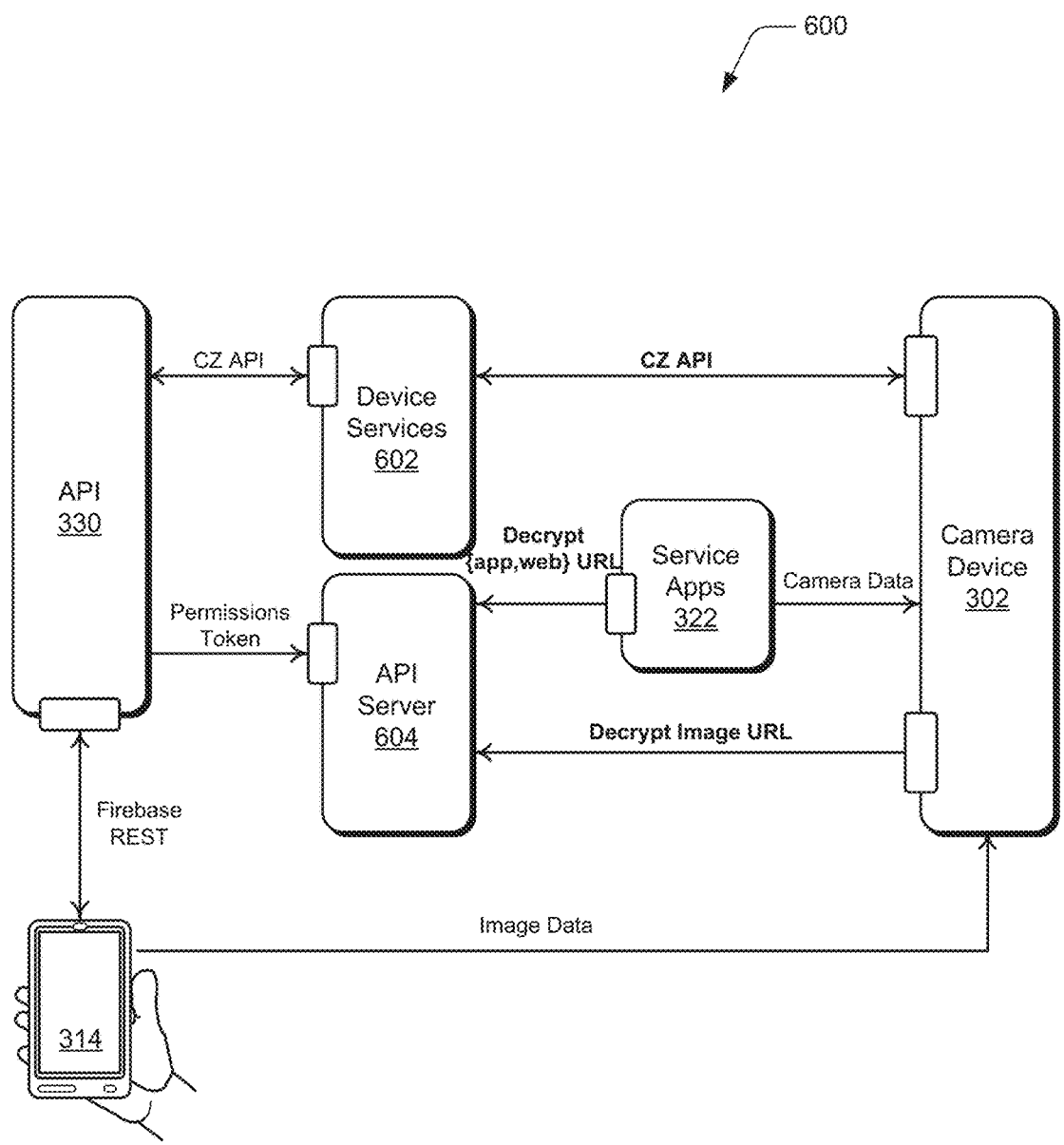
FIG. 6 further illustrates the example system in which embodiments of the camera system API for third-party integrations techniques, as well as camera data access based on subscription status techniques, can be implemented.

FIG. 6 illustrates an example system 600 that further details the system shown and described with reference to FIG. 3 in which various embodiments of the camera system API for third-party integrations techniques can be implemented. The example system 600 includes the API 330 and the camera device 302, such as may be implemented as a smart device in a mesh network. The example system 600 also includes features and components of the cloud-based service 308, such as device services 602, which encompass backend devices and applications used to manage device data, and the device services 602 can be implemented for data storage. The example system also includes an API server 604 implemented to facilitate various APIs (e.g., to include API 330) that are utilized both internally to the cloud-based service and externally (e.g., exposed to a third-party application running on a client device). The API server 604 and the API 330 support the Firebase, REST Streaming, and REST protocols to access and communicate shared camera device data, as well as other mesh network devices data. These protocols, features, and components are further described herein, such as with reference to FIGS. 9-26.

In implementations, the camera system API 330 is exposed in the data model along with other mesh network devices (e.g., under/devices/cameras/<device_id>), where the data model for the camera device is structured as a flat layout. The devices services 602 is extended to accommodate the camera device data, and particularly to support the cue point event data. The devices services 602 is also extended to accommodate the updates to streaming_enabled_by_wwn CZ quartz bucket field. The Web_URL, app_URL, and image_URL exposed by the API 330 for the camera device 302, as described above, are designed to preserve the privacy and security guaranties of uniquely identifiable API elements, particularly for those that are processed by other systems. The API Server 604 can expose an API apps that the camera device can use to obtain original device identifiers, as well as decrypt the camera device id and other data associated with the camera device.

To generate a device_id, the following procedure is employed for encrypted URL generation. A new instance of EncryptedDeviceId protocol message is created, and the camera_bucket_id is encrypted using client id and salt and assigned to encrypted_device_id. The current time is encrypted using client id and salt and assigned to encrypted_generated_at. The client_id is then encrypted using salt and assigned to encrypted_client_id.

```
message EncryptedDeviceId {
    optional bytes encrypted_device_id;
    optional bytes encrypted_generated_at;
    optional bytes encrypted_client_id;
}
```

The resulting instance is serialized and base64 safe web encoded, and can then be used as a device_id segment of the URL. For example, last_cuepoint.{id,image_url_suffix, animated_image_url_suffix} is encrypted using salt and client_id and used as suffix segment of the URL.

The definitions of quartz bucket is extended to provide information exposed in the API 330, and the fields are as listed following for camera API support in the device services 602.

```
{
    string{, 256} serial_number?;
    string{, 128} model?;
    string{, 256} mac_address?;
    string{, 512} description?;
    array [string{, 512}] {, 256} capabilities?;
    string structure_id
    /[a-f0-9]{8}-[a-f0-9]{4}-[a-f0-9]{4}-[a-f0-9]{4}-[a-f0-9]{12}|ˆ$/?;
    string where_id
    /[a-f0-9]{8}-[a-f0-9]{4}-[a-f0-9]{4}-[a-f0-9]{4}-[a-f0-9]{12}|ˆ$/?;
    string{, 512} nexus_api_http_server_url / http[s]?:.+/?; string{, 512}
    direct_nexustalk_host?;
    string{, 512} live_stream_host?;
    string{, 512} download_host?;
    string{, 512} recorded_stream_host?;
    string streaming_state ["offline-disabled", "offline-enabled",
    "online-disabled",
    "online-enabled", "streaming-enabled"]?;
    string{, 256} software_version?;
    string{, 64} ip_address?;
    union { integer {1230768000000,}; integer {0,0} }
    last_connect_time?; union {
    integer {1230768000000,}; integer {0,0} } last_disconnect_time?;
    boolean
    preview_streaming_enabled?;
    boolean audio_input_enabled?;
    string cvr_enrolled ["none", "10-days", "30-days"]?;
    object {
    boolean state?;
    integer {1230768000000,} last_changed?;
    } streaming_enabled_by_wwn?; object {
    string{, 20} id?;
    union { integer {1230768000000,}; integer {0,0} } start_time?;
    union { integer
    {1230768000000,}; integer {0,0} } end_time?;
    string types?; // semi-colon separated list of cue point attributes string
    image_url_prefix?; // scheme, domain, port and path before
    device_id; not encrypted by MH
    string image_url_suffix?; // path after device_id and query;
```

```
    encrypted by MH
    string animated_image_url_prefix?; // scheme, domain, port and
    path before device_id; not encrypted by MH
    string animated_image_url_suffix?; // path after device_id and
    query; encrypted by MH
    integer {1230768000000,} urls_expire_time?;
    } last_cuepoint?;
}
```

When the streaming_enabled_by_wwn field is changed in the device services 602 by the API 330, a message as below is published to a queue that receives the message, and it will call into the Website API to update the streaming.enabled property (e.g., as the applications do when toggling the on/off switch), and a reason code is set indicating that the change came from WWN.

```
        message StreamingEnabledByWwnChanged {
            required int64 timestamp_utc_ms = 1;
            required string user_id = 2; required
            string device_id = 3; required bool
            is_enabled = 4;
        }
```

Camera API Support in the API Server

The API 330 preserves the privacy by obfuscating the user identifying identity strings (such as structure_ids, device_ids, and where_ids) in such a way that two Nest API clients (e.g., mesh network devices) receive different values for the same entity. Prior to exposing the camera API, the only service accepting these encrypted values is the API 330 itself. With the addition of the camera API, the exposed URLs are accepted by the service apps 322 and by the camera device 302. To decrypt the URLs, the service apps 322 or the camera device 302 can make an HTTP POST request to the API server 604 "/api/0.1/decrypt_url" with the body as follows:

```
{
    "device_id": <encrypted device_id>,
    "suffix": <encrypted_suffix>,
    "access_token": <value of the auth URL parameter>
    "field_path": <what field is being decrypted>
}
field_path is one of "web_url", "app_url", "last_event/web_url",
"last_event/app_url", "last_event/image_url",
"last_event/animated_image_url"
The call requires either staff or user authentication, and the response
contains:
{
    "generated_at": <decrypted generation time>,
    "device_id": <decrypted device_id>,
    "suffix": <decrypted suffix>
}
```

The camera device 302 can then pass encrypted last_cuepoint.animated_image_url_suffix as suffix, and will use staff user authentication. The service apps 322 will pass encrypted last_cuepoint.id as suffix and will use user authentication.

For encrypted URL decryption, URL is base64safeweb decoded and parsed into EncryptedDeviceId instance. The encrypted_client_id is decrypted using salt, encrypted_device_id is decrypted using salt, and the client_id encrypted_generated_at is decrypted using salt and client_id. Suffix is decrypted using salt and client_id. Access token is exchanged for the list of permissions, and if the cuepoint.image_url access is not granted by client permissions, an error is returned. URL generation time recency is not enforced, but rather it is up to the camera to use a combination of URL generation time, event begin and end times, and other parameters including ones passed via URL suffix to enforce security requirements. For example checking that generated_at can be used to enforce recency of URL. In this case, the generated_at should be verified to be not older than x[5?] minutes (and not newer than y[1?] minutes).

The motion and sound detection is performed at the cloud-based service, as well as originating the cue event points, and the last_cuepoint field is maintained in the device services 602 (e.g., in the CZ camera bucket). For every motion or sound event, it will do two updates to this field: once at the beginning, with all data for the cuepoint except last_cuepoint.end_time, and once when the event concludes to update last_cuepoint.end_time. These writes can be communicated directly to the API Server /api/0.1/wwn_quartz_filter/cz/v5/put. This endpoint filters writes to the users who have granted access to the camera data to at least one WWN client. For cameras that do not have a CVR subscription, the last_cuepoint.image_url_prefix, last_cuepoint.image_url_suffix, last_cuepoint.animated_image_url_prefix, and last_cuepoint.animated_image_url_suffix fields will be left unpopulated, and the last_cuepoint.id field will be set to 0.

The API Server request will have X-nl-on-behalf-of header with value user.<user_id>. This will allow router direct the request to the right pod. Other fields in the camera bucket, most notably, streaming_state, will be maintained by Oculus, Website, and Chompy at the relevant points in the system where those values change. Unlike cuepoints, these fields will be written via unfiltered API Server at /api/0.1/cz/v5/put endpoint. Due to the high rate of such events (e.g., approximately two thousand Q-points) the API server 604 will initially maintain the cache of users who enabled WWN clients access to the event data and let through only those requests that are related to these users.

The list of WWN users can be maintained as a cache of users that is a synchronized map from user_id to a list of token_session_ids. The semantic of the cache is implemented: absence of the user_id key, the cache is cold, retrieve the list of OAuth2 access tokens along with their permissions from AAA and preserve the list of token_session_ids that have permissions to camera data; the value is empty, the cache is hot, and no clients were authorized to access camera data; or the value is non-empty, the cache is hot, and there are clients that were authorized to access camera data.

To maintain the cache freshness, APIServer instances will subscribe to Kafka topic ${NEST_ENV}"-oauth-token-changes" and first makes sure the cache is hot and update cache upon receiving OAuth2TokenOperation message: "create" checks whether permissions associated with the new token_session_id authorize access to camera data and if yes, add token_session_id to the value list; "update" checks whether permissions associated with the new token_session_id authorize access to camera data and if yes, add token_session id to the value list else removes it from the value list: and "delete" removes token_session_id from the value list.

For camera API support in AAA, generate OAuth2TokenChange events where AAA will report OAuth2 Token permission changes on a new Kafka topic: ${NEST_ENV} "-oauth-token-changes". It will publish the following Protocol Buffers message (below) and the following AAAOauth2Service methods will change to publish this message: createAccessToken, upgradeUserClient, deleteAccessToken, and deleteClient.

```
message OAuth2TokenOperation {
    optional string token_session_id = 1;
    optional unit64 timestamp = 2;
    one of operation {
        OAuth2TokenPermissions create = 3;
        OAuth2TokenPermissions update = 4;
        google.protobuf.Empty delete = 5;
    }
}
message OAuth2TokenPermissions {
    repeated string permission = 1;
}
```

Example method 700 is described with reference to FIG. 7 in accordance with one or more embodiments of a camera system API for third-party integrations. Additionally, example method 800 is described with reference to FIG. 8 in accordance with one or more embodiments of camera data access based on subscription status. Generally, any of the components, modules, methods, and operations described herein can be implemented using software, firmware, hardware (e.g., fixed logic circuitry), manual processing, or any combination thereof. Some operations of the example methods may be described in the general context of executable instructions stored on computer-readable storage memory that is local and/or remote to a computer processing system, and implementations can include software applications, programs, functions, and the like. Alternatively or in addition, any of the functionality described herein can be performed, at least in part, by one or more hardware logic components, such as, and without limitation, Field-programmable Gate Arrays (FPGAs), Application-specific Integrated Circuits (ASICs), Application-specific Standard Products (ASSPs), System-on-a-chip systems (SoCs), Complex Programmable Logic Devices (CPLDs), and the like.

Figure 7:
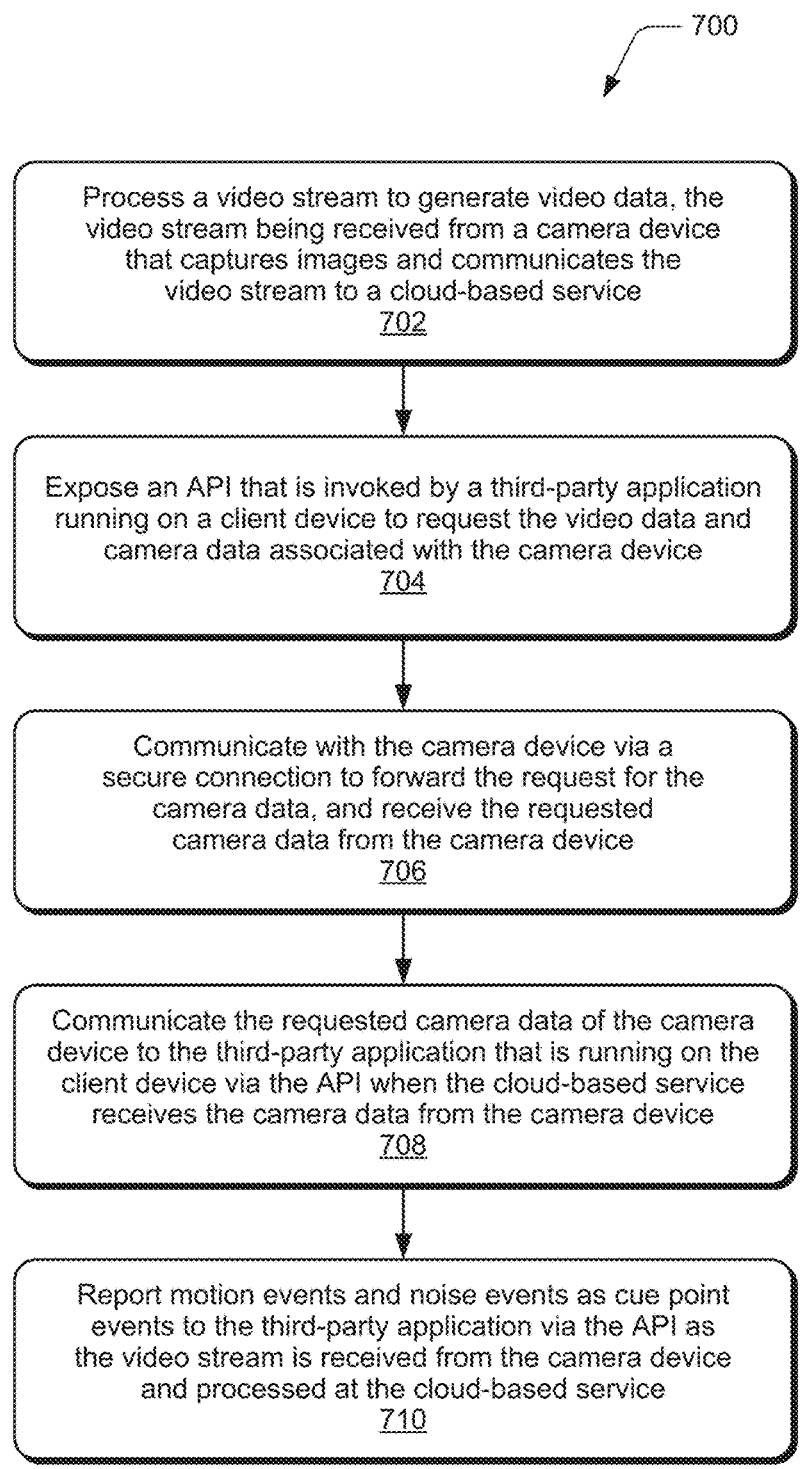
FIG. 7 illustrates an example method of a camera system API for third-party integrations in accordance with embodiments of the techniques described herein.

FIG. 7 illustrates example method(s) 700 of a camera system API for third-party integrations as generally related to camera devices implemented in a mesh network and a method (or methods) to permit access to video data and camera data associated with a camera device via an application program interface (API) at a cloud-based service. The order in which the method blocks are described are not intended to be construed as a limitation, and any number of the described method blocks can be combined in any order to implement a method, or an alternate method.

At block 702, a video stream is processed to generate video data, the video stream being received from a camera device that captures images and communicates the video stream to a cloud-based service. For example, the cloud-based service 308 receives the video stream 306 from the camera device 302 that captures the images 304 and communicates the video stream to the cloud-based service where the service application 322 processes the video stream to generate the video data 324. In implementations, the video data 324 is generated from the video stream 306 and can include the images 304 of a motion event associated with a motion detected by the camera device 302 and/or the images that correspond to a noise event associated with a sound detected by the camera device.

At block 704, an application program interface (API) is exposed and the API is invoked by a third-party application running on a client device to request the video data and camera data associated with the camera device. For example, the camera system API 330 is exposed at the cloud-based service 308 and the API is invoked by the third-party application 320 running on the client device 314 to request the video data 324 and/or the camera data 326 that is associated with the camera device. The API 330 permits access by the third-party application 320 to the video data 324 and the camera data 326 from the cloud-based service 308, and the API 330 is exposed for the third-party application 320 to communicate with the cloud-based service 308 via a network connection 332 to request the video data and the camera data.

At block 706, the camera device communicates via a secure connection to forward the request for the camera data, and receive the requested camera data from the camera device. For example, the cloud-based service 308 communicates with the camera device 302 via the secure connection 334 to forward the request for the camera data 326 (e.g., from the third-party application), and the cloud-based service 308 receives the requested camera data from the camera device. In implementations, the camera data 326 is an operational status 328 of the camera device 302. Further, the camera data 326 can be structured as a data model of data fields, and one or more of the data fields are accessible via the exposed API.

At block 708, the requested camera data of the camera device is communicated to the third-party application that is running on the client device via the API when the cloud-based service receives the camera data from the camera device. For example, the cloud-based service 308 communicates the requested camera data 326 of the camera device 302 to the third-party application 320 that is running on the client device 302 via the API 330 when the cloud-based service receives the camera data from the camera device.

At block 710, motion events and noise events are reported as cue point events to the third-party application via the API as the video stream is received from the camera device and processed at the cloud-based service. For example, the cloud-based service 308 reports motion events and noise events as the cue point events 338 to the third-party application 320 via the API 330 as the video stream 306 is received from the camera device 302 and processed at the cloud-based service.

Camera Data Access Based on Subscription Status

Figure 8:
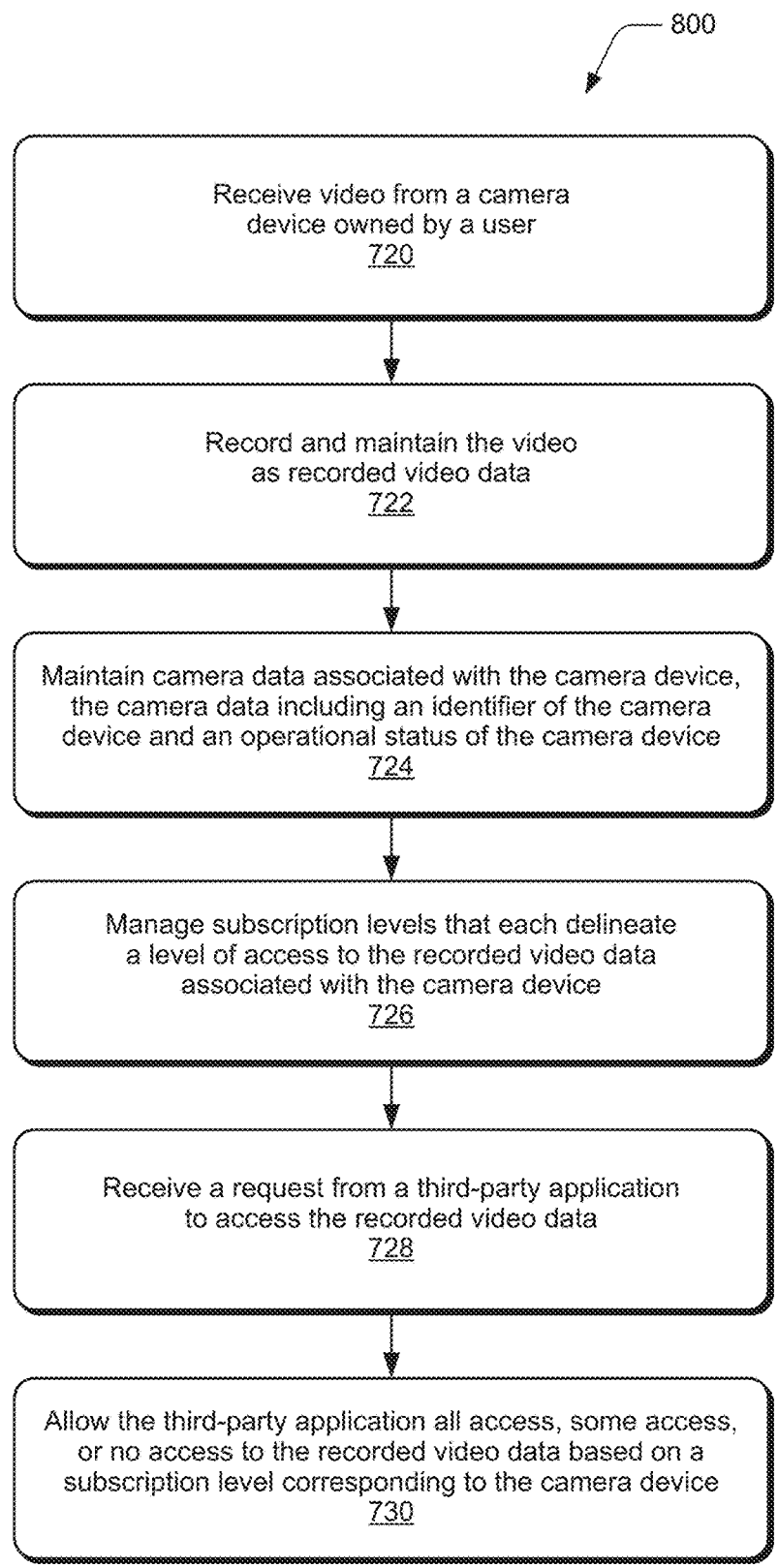
FIG. 8 illustrates an example method of a camera data access based on subscription status techniques in accordance with embodiments of the techniques described herein.

FIG. 8 illustrates example method(s) 800 of camera data access based on subscription status as generally related to camera devices implemented in a mesh network and a method (or methods) to permit access to live video, recorded video, and/or camera data associated with a camera device via an application program interface (API) at a cloud-based service. The order in which the method blocks are described are not intended to be construed as a limitation, and any number of the described method blocks can be combined in any order to implement a method, or an alternate method.

At block 720, video is received from a camera device owned by a user. For example, the cloud-based service 308 receives video from the computing device 302 as the video stream 306 while the camera device captures the images 304 and communicates the video to the cloud-based service. At block 722, the video is recorded and maintained as recorded video data. For example, the service application 322 at the cloud-based service 308 records the video received from the camera device 302, and the recorded video data 324 is maintained by the data storage 316 at the cloud-based service.

At block 724, camera data associated with the camera device is maintained, where the camera data includes an identifier of the camera device and an operational status of the camera device. For example, the service application 322 at the cloud-based service 308 maintains the camera data 326 that is associated with the camera device 302, and the camera data 326 includes an identifier of the camera device as well as the operational status 328 of the camera device 302, such as to indicate whether the camera device is turned on to record video, or whether the camera device is turned off.

At block 726, subscription levels are managed that each delineate a level of access to the recorded video data associated with the camera device. For example, the service application 322 at the cloud-based service 308 manages the subscription levels 336 that each delineate a level of access to the recorded video data 324 and/or the camera data 326 associated with the camera device 302. The subscription levels can include a first subscription level providing access to the video as captured live by the camera device, and at least a second subscription level providing access to both the video as captured live by the camera device and the recorded video data.

At block 728, a request is received from a third-party application to access the recorded video data. For example, the service application 322 at the cloud-based service 308 receives a request to access the recorded video data 324 from the third-party application 320 on a client computing device (e.g., the client device 314) of the user. The request can be received from a client device application to access the live video and/or the recorded video data associated with the camera device via the application program interface (API) 330 that is invoked by the client device application to initiate the request. The service application 322 at the cloud-based service 308 can then allow the client device application access to the requested video and/or the recorded video data via the API based on the subscription level corresponding to the camera device.

At block 730, the third-party application is allowed all access, some access, or no access to the recorded video data based on a subscription level corresponding to the camera device. For example, the third-party application 320 is an example of a client device application executing on the client device 314 of the user, and the service application 322 at the cloud-based service 308 can allow the third-party application all access or some access to the requested recorded video data 324 based on the subscription level 336 corresponding to the camera device 302, or the service application 322 can prevent the third-party application access to the requested recorded video data based on the subscription level corresponding to the camera device. Similarly, the service application 322 can allow the third-party application (e.g., a client device application) all access, some access, or no access to the camera data 326 based on the subscription level corresponding to the camera device.

Smart Devices Environment and APIs

Although programs, applications, and/or application services may be used to communicate requests or commands to smart home devices 10, in some embodiments these may not be sent directly to the smart home devices 10. The following figures illustrate smart device communication and/or control via an application accessing an API.

Figure 9:
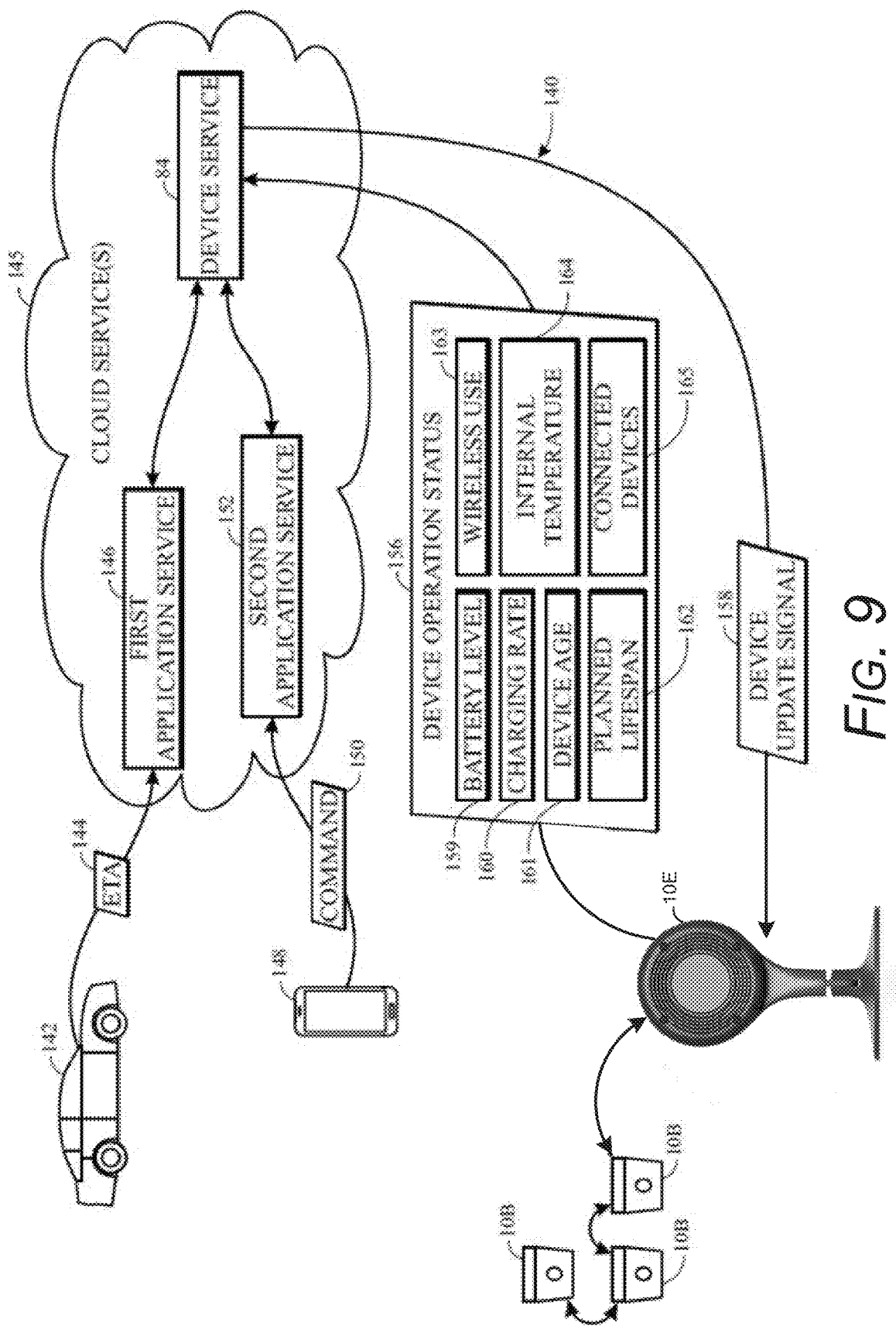
FIG. 9 is a block diagram of a system that provides access to smart home devices, in accordance with embodiments.

For example, FIG. 9 illustrates a system 140 where an API (e.g., camera system API 330) may be used to access and/or control one or more smart devices. In the illustrated example, a person may desire to access a number of smart home devices 10, such as a first smart home device (e.g., camera device 10E) and second smart home devices (e.g., thermostat 10A and smoke and/or CO detector 10B). In the example of FIG. 9, the first smart home device 10E is an example of the camera device 302 that is shown and described with reference to FIG. 3. The second smart home devices 10B are examples of a smart thermostat, such as the Nest, Learning Thermostat by Nest Labs, Inc. (a company of Google Inc.), and smart hazard detectors, such as the Nest® Protect by Nest Labs. Inc. Two application programs are shown accessing the smart home devices 10E and/or 10B through the device service 84. Although FIG. 9 illustrates accessing the smart home devices 10E and/or 10B using two separate application programs, it should be appreciated that any suitable number of application programs may be used to access the smart home devices 10E and/or 10B.

In the example of FIG. 9, a first application 142 sends a first device request message 144 targeted to a smart home device 10 (e.g., the smart home device, a camera 10E) into cloud service(s) 145 and, more specifically, to a first application service 146. A second application 148 may be used to issue a second device request message 150 targeted to a smart home device 10 (e.g., the smart home device, a camera 10E) to a second application service 152 also among the cloud service(s) 145. In the example shown, the first application 142 is a navigation application that sends estimated-time-of-arrival (ETA) information in the device request messages 144. By sending a number of ETA messages as the device request messages 144, the first application 142 may be used to cause the smart home devices 10E and/or 10B to be prepared when a person arrives home. Thus, as an example, the first application 142 may send occasional device request messages 144 indicating the ETA to the first application service 146, which may forward this information to the device service 84 (e.g., via an API, as discussed above). The device service 84 may hold the device request messages 144 from the first application 142 until an appropriate time. In the illustrated example, the second application 148 may be a third party home-automation application that may be running on a portable electronic device, such as a personal mobile device (e.g., the client device 314 as described with reference to FIG. 3). The second application 148 may generate device request messages 150, such as commands to control or request information from the smart home devices 10E and/or 10B. The second application service 152 may interface with the device service 84 by way of an API, as mentioned above, such as the camera system API 330.

Although the first application service 146, the second application service 152, and the device service 84 are illustrated in FIG. 9 as cloud service(s) 145, it may appreciated that some or all of these services may run on electronic devices that are not remote cloud-computer systems accessible by way of the Internet. Indeed, in some examples, the device service 84 may not be on a network that is remote from the smart home devices 10E and/or 10B, but rather may be running on an electronic device in the same local area network as the smart home devices 10E and/or 10B. For example, the device service 84 may, additionally or alternatively, run on a local server computer and/or a local wireless router on the same local area network as the smart home devices 10E and/or 10B. Moreover, some applications may communicate directly with the device service 84 (e.g., via the API) without first communicating with an application service such as the first application service 146 or the second application service 152

Regardless of the number of applications that may issue device request messages (e.g., 144 or 150) to the device service 84, the device service 84 may not merely forward these messages to the smart home devices 10E and/or 10B that the device request messages are targeted too. Rather, the device service 84 may serve as the point of contact that application programs may use to access the smart home devices 10E and/or 10B. The device service 84 then may communicate information and/or commands provided by the applications to the smart home devices 10E and/or 10B, enabling coordination between the applications and the devices 10E and/or 10B.

In some embodiments, to enable additional functionalities in the applications (e.g., first application 142 and/or second application 148), the smart home devices 10E and/or 10B may occasionally transmit device operation status parameters 156 or other data based on the device operation status parameters 156 through the device service 84 and the proper application service (e.g., first application service 146 and/or second application service 152) to the proper applications (e.g. first application 142 and/or second application 148).

The device operation status parameters 156 may represent any suitable characteristics of the operation status of the smart home devices 10E and/or 10B that may affect the proper functioning of the smart home devices 10E and/or 10B. Thus, the device operation status parameters 156 may include, for example: a battery level 159 indicative of an amount of charge remaining in a battery of the smart home device; a charging rate 160 indicative of a current rate that the battery of the smart home device is charging: a current device age 161 indicative of a period of use since initial install, a period of use since manufacture, a period of use since original sale, etc.: a planned lifespan 162 indicative of an expected useful operational duration of the smart home device; an amount of recent wireless use 163 (selected within a timespan recent enough to substantially affect an internal temperature of the smart home device 10): a direct measurement of an internal device temperature 164; and/or device operation status parameters for connected devices 165.

The operational status parameters for connected devices 165 may represent any suitable operational parameters that may describe the smart home devices 10 (e.g., smart home device, a camera device 10E) through which the device service 84 may use to connect to a target smart home device 10 (e.g., one of the smart home devices 10B). For example, regarding the operational status parameters for connected devices 165, if the target smart home device 10 is the last smart home device 10B through three smart home devices 10 in three communication "hops", the device operation status parameters 156 associated with these three intervening smart home devices 10 may be included.

The various specific device operation status parameters 156 shown in FIG. 9 are provided by way of example. As such, the device operation status parameters 156 shown in FIG. 9 should not be understood to be exhaustive, but merely representative of possible operational parameters that may be considered for API-accessing applications. For example, additional device operation status parameters may include current state of the device (e.g., sleeping, awake, Wi-Fi active/inactive, executing a demand-response algorithm, executing a time-to-temperature algorithm, etc.).

The smart thermostat 10A, detector 10B, and/or camera device 10E may include a basic set of identifying information, such as: a user-defined device name, physical location in the structure, locale, software version and containing structure. The data model exposes camera functions, such as whether the camera device is turned on or off, recording video, recording audio, and other features. The data model also exposes thermostat capabilities, such as whether the HVAC system can heat or cool, or has a fan. Further, the thermostat 10A may include three states related to presence: home, away or auto-away. In some embodiments, the API 90 (e.g., of which the camera system API 330 is an example) may not expose the thermostat state, but may depend on this state when using thermostat mode to set target temperature. Thermostat 10A mode may have three "on" states (heat, cool, heat-cool) and one "off" state. The most common may be "on" (home). In this mode the thermostat 10A will try to keep the structure at a target temperature. A thermostat 10A can also be in away mode, which is entered when no motion is sensed in the house or when the user explicitly sets the structure to away. In this mode, it will activate the HVAC system if the temperature moves outside the defined "away" temperature range. The thermostat 10A may also be set to "off". In this mode it will only activate the HVAC system if the temperature moves outside a defined safety temperature range.

In some embodiments of the camera system API for third-party integrations, as well as for camera data access based on subscription status, access to live video, recorded video, and/or camera data and settings may be accessed and/or modified using the API 90. For example, the applications may use the device operation status parameters 156 or data to affect subsequent interactions (e.g., via messages 144 or 150) that are transmitted to the smart home devices 10A, 10B, and/or 10E. The device operation status parameters 156 may correspond only to a target smart home device 10 (e.g., the smart home device, a camera device 10E), or may correspond to other smart home devices 10 that are in the vicinity of the target smart home device 10 (e.g., the smart home device 10E and the smart home devices 10B). In one example, when the target smart home device 10 for the device request messages 144 and/or 150 are the smart home device 10E, the device operation status parameters 156 may correspond substantially only to the smart home device 10E.

In another example, when the target smart home device 10 is one of the smart home devices 10B, which is accessible by way of the smart home device 10E, the device operation status parameters 156 may contain operational parameter information about both the smart home device 10E and the smart home device 10B. The second application 148 may include voice actions. For example, a user input to the second application 148 may be an audible cue to activate video and/or audio recording of the camera device 10E. The second application 148 may convert this into messages that ultimately become commands to the smart home device 10E.

Architecture

Figure 10:
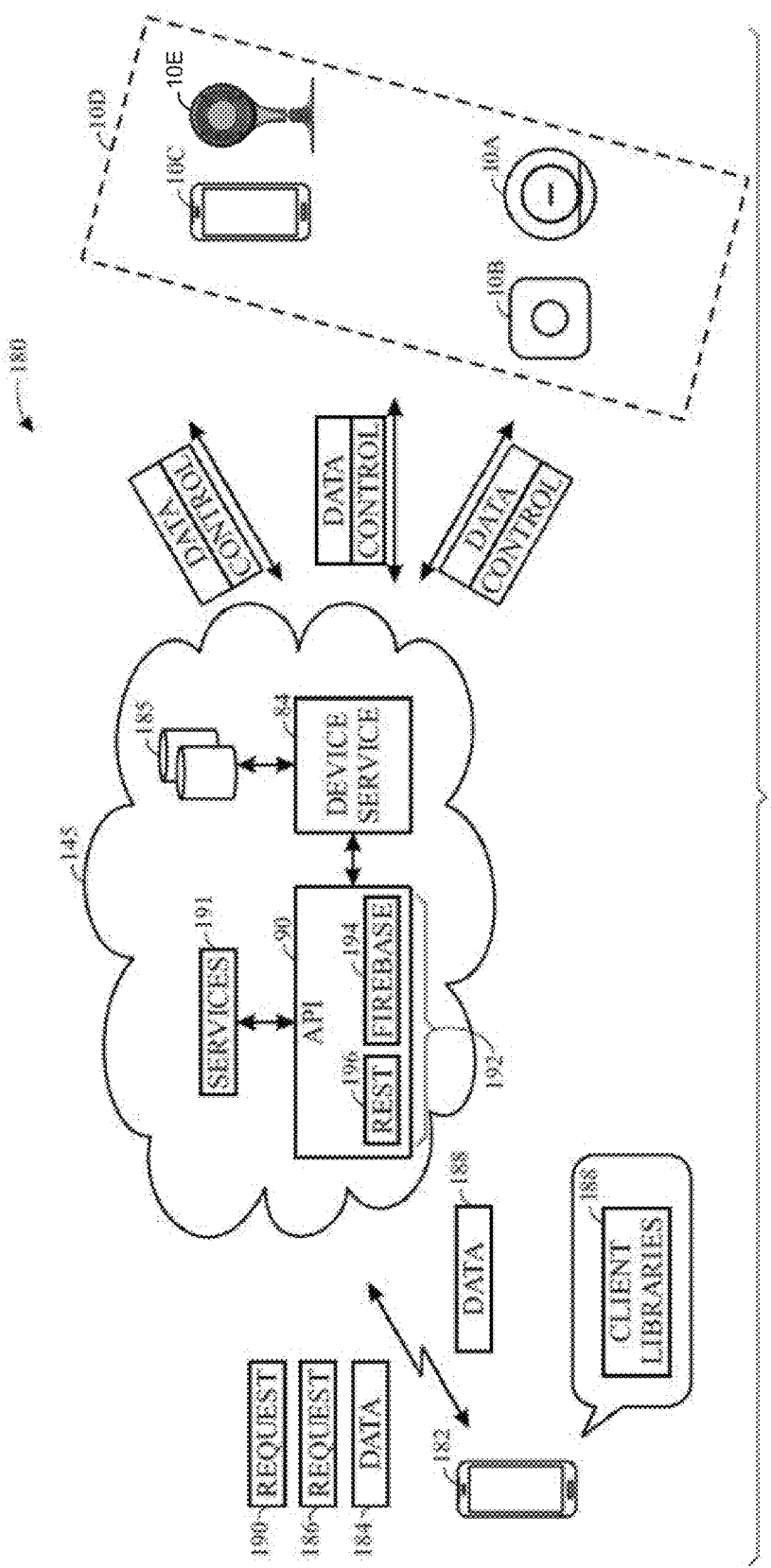
FIG. 10 illustrates a system that uses an API to access device services to request data from, control, and/or store data that may be useful to the smart devices, in accordance with embodiments.

FIG. 10 illustrates a system 180 that uses an API 90 to access one or more device services 84 to request data from, control, and/or store data that may be useful to the smart devices (e.g., thermostat 10A, smoke and/or CO detector 10B, other devices 10C, and/or a camera device 10E). An example of the camera device 10E (e.g., a smart device) is the camera device 302 shown and described with reference to FIG. 3. As discussed above, the system 180 may be useful to enable one or more clients 182 (e.g., third-party client and/or a principle client of the device service 84) to: provide data 184 for use in the device services 84 (e.g., to a data store (e.g., data warehouse 185), to storage of one or more of the smart devices, and/or to a data model of the device service 84), provide a request 186 to control one or more of the smart devices via the device service 84, and/or to receive data 188 from one or more of the smart devices via the device service 84 (e.g., via providing a subscription and/or particular data query request 190), upon authorization from an authorization server (e.g., an additional service provided by services 191).

As used herein, the term "client," "application programming interface (API) client," and "client application" may be used interchangeably and may refer to an integration point for the API 90 and/or device service 84. In embodiments, the camera system API 330 is an example implementation of the API 90 in the system 180, and the cloud services 145 includes, or is representative of, the cloud-based service 308 that is shown and described with reference to FIG. 3. Further, it should be noted, as used herein, the terms "client device," "third party device," and "API client device" may be used interchangeably and refer to an electronic device interfacing with the integration point (e.g., client or API client). For example, the client device 314 that executes the third-party application 320 as shown and described with reference to FIG. 3 is an example of the client 182 that communicates with the cloud services 145.

In embodiments where a smart thermostat 10A is present, the API 90 and/or device services 84 may be used to: view a current temperature, view and/or set a target temperature, set a fan timer, view and/or set temperature modes (e.g., "heating" and/or "cooling"), view humidity data, and/or view online status and/or last connection information. In embodiments where a smoke and/or CO detector 10B is present, the API 90 and/or device services 84 may be used to view CO and/or smoke status, view battery health of the detector 10B, view last manual test status and/or a timestamp for the last manual test, and/or view online status and/or last connection information. In embodiments where the camera device 10E is present, the API 90 and/or device services 84 may be utilized for third-party integrations and camera data access based on subscription status. Further, in embodiments where a structure 10D (e.g., a smart home environment containing smart devices) is associated with the device service 84, the API 90 and/or device services 84 may be used to: view a list of devices in the structure 10D, view energy event status (e.g., whether the structure 10D is under a preferable energy utilization period as defined by an energy utility program (e.g., Rush Hour Rewards by Nest®)), view and/or set an away state of the structure 10D, view a postal or zip code of the structure 10D, and/or set an estimated time of arrival to the structure 10. Mans' other data points may be accessed and/or written to the devices via the API 90 and/or device services 84.

To perform these functions, the client 182 may connect to the API 90. In one embodiment, the API 90 may include one or more hosts 192 that may receive and/or process the data 184 and/or the requests 186 and/or 190 in near real-time and/or real-time. The hosts 192 may include a Firebase host and/or one or more Representation State Transfer (REST) hosts 196 (e.g., periodic REST and/or REST streaming transactions).

Firebase organizes data as one large JSON document. Using this scheme, the device service 84 can listen for updates (e.g., insertions, deletions, modifications) on the trees of data that the client 182 has access to and/or is subscribed to, in order to synchronize these updates between the client devices 182 and/or the devices (e.g., 10A-10C and 10E) and/or structures 10D.

Each data element is addressable by a Uniform Resource Locator (URL). Each data element location can store strings, numbers, Boolean values and/or parent/child objects or arrays. Using the API 90, a user's client can sync data from locations at multiple levels in the hierarchy. For example, an entire structure, including all devices, a single device in a structure, a group of data values (e.g., current and ambient temperatures), and/or a single data value (e.g., battery health state). As mentioned above, these data locations may be accessed by creating a client 182 application, using the client libraries 198 and/or using streaming and/or traditional REST communications.

A variety of access controls mechanisms are possible. As will be discussed in more detail below, in some embodiments, a custom login feature may be used to enable the device service 84 provider to utilize customized authentication payloads to authorize access to the APIs 90 and/or device services 84.

To provide data 184 and/or requests 186 and/or 190 to the host 192 in a manner that the API 90 may understand, an application of the client 182 may be constructed to provide this data 184 and/or requests 186 and/or 190. Upon authentication of access rights (which will be discussed in more detail below), the application may utilize REST and/or client libraries (e.g., Firebase client libraries 198) to subscribe to data values via the API 90. When a subscribed data value changes, the new data values are updated in real time and stored as a standard JSON document. The client 182 may then update and/or trigger an action based upon the subscribed data. Further, when the client 182 wishes to write data to the shared JSON document, the client 182 may provide the request via REST and/or Firebase. Accordingly, as mentioned above, the client 182 may generate and provide the data 184 and/or requests 186 and/or 190 as well as receive data 188.

The requests 186 and/or 190 and/or the data 184 are passed from the API 90 to the device service 84. The device service 84 maintains a data model of all relevant structures 10D as well as the relevant smart devices (e.g., thermostats 10A, detectors 10B, and/or devices 10C) associated with each of the structures 10D. The data model is generated and updated in a subscription-based approach. For example, as new structures 10D and/or smart devices (e.g., thermostats 10A, detectors 10B, devices 10C, and/or camera devices 10E) are activated, a subscription may be registered between the smart devices (e.g., 10A-10C and 10E) and/or the structure 10D and the device service 84. Rather than require continual polling for new and/or updated data, which may result in excessive heating and/or battery consumption of the smart devices, the subscription enables new and/or updated data provided to the device service 84 (e.g., via the API 90) to be provided in near-real time, upon changes to the data model maintained by the device service 84.

Figure 11:
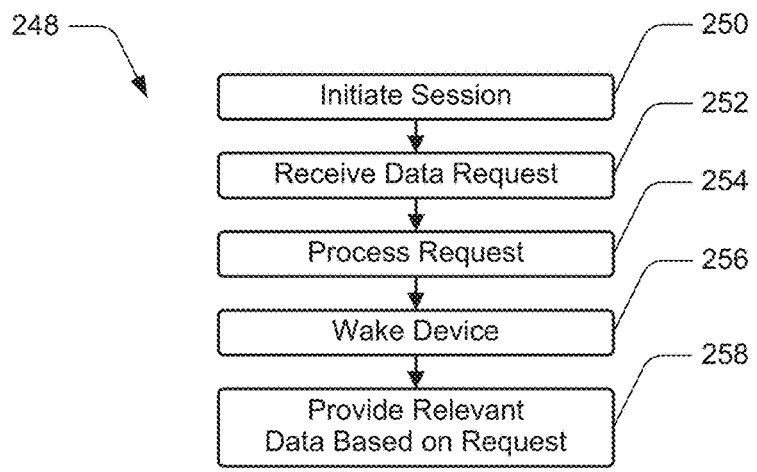
FIG. 11 illustrates a process for providing data requests via the subscription-based device service, in accordance with embodiments.

FIG. 11 illustrates an embodiment of a process 248 for providing data requests via the subscription-based device service 84. First, a session between the data service 84 and one or more subscribing devices (e.g., thermostats 10A, detectors 10B, devices 10C, and/or camera devices 10E) and/or structures 10D is created (block 250). The session may be established for a predetermined period (e.g. 1 hour, 1 day, 1 week, etc.) and may be closed at any time by either the subscribing device and/or the device service 84.

Next, when an interaction with the system 180 occurs, a data request is received by the device service 84 (block 252). In one embodiment, the data request may include a request to retrieve particular smart device information and/or a request to set particular smart device information. The request may be provided, in some embodiments, via the API 90, based upon communications from a client 182.

Upon receiving the request, the device service may process the request (block 254). For example, the device service 84 may update its maintained data model based upon the request. In some embodiments, the JavaScript Object Notation (JSON) data format may be used to maintain the device service 84's data model. One or more translation modules may translate non-JSON formatted data (e.g., tag-lengthfield (TLV) formatted data) into the JSON data format. Further details and examples of subscription services and translation into a JSON data format and processing received data are described in U.S. Ser. No. 61/627,996, filed Oct. 21, 2011, entitled "User friendly, network connected learning thermostat and related systems and methods" and in U.S. Ser. No. 14/508,884, filed Oct. 7, 2014, entitled "Systems and Methods for Updating Data Across Multiple Network Architectures," which are both incorporated by reference herein in their entirety for all purposes.

Next, the device service 84 may wake any subscribers of the request (e.g., smart devices 10A-10C and 10E, and/or structures 10D associated with the request) (block 256). In one embodiment, the devices (e.g., thermostats 10A, detectors 10B, devices 10C, and/or camera devices 10E) and/or structures 10D may be equipped with wake-on-LAN (WOL) functionality that enables a device to sleep until particular data packets are received at the WOL equipped device. Upon receiving these particular packets, the devices may wake, and receive data that is provided based upon the received request (block 258). In some embodiments, packet filtering may be implemented on the devices, such that only particular data packets will wake the devices, helping to ensure that the devices are only awoken when relevant data is received at the device 10A-10C and 10E and/or the structure 10D. Further, buffering may be used to ensure that erroneous data is not used to wake the devices and/or structure. For example, if the client 182 sends a request to write a new target temperature to a thermostat 10A that is one degree above the current target temperature, but then immediately sends another request that cancels the prior request (e.g., reduces the target temperature down one degree), the requests may be cancelled out without waking the thermostat 10A (assuming both requests are received by the device service 84 in a buffer window prior to the thermostat 10A wake). In some embodiments, the buffer window may be two to three seconds.

Figure 12:
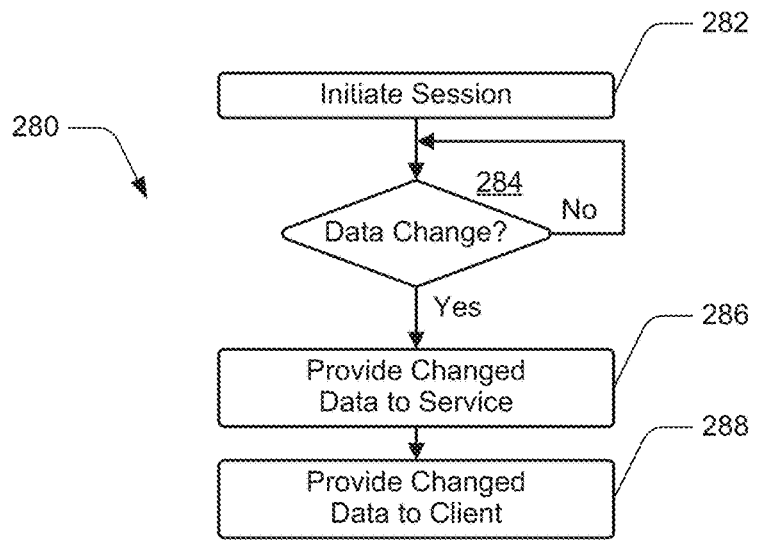
FIG. 12 illustrates a process for providing data from smart devices and/or structures to a client, in accordance with embodiments.

As mentioned above, data 188 may also be provided to the client 182 from the smart devices (e.g., thermostat 10A, detector 10B, device 10C, and/or camera device 10E) and/or structures 10D. For example, the client 182 may display and/or trigger actions based upon received data from the smart devices and/or structures 10D. FIG. 12 illustrates a process 280 for providing data from smart devices and/or structures to a client 182. As with the process 248 of FIG. 11, an http session is established between the device service 84 and smart devices (e.g., thermostats 10A, detectors 10B, devices 10C, and/or camera devices 10E) and/or structures 10D (block 280). Upon detecting a change of relevant data in the smart devices and/or structures 10D (decision block 284), the changed data is provided to the device service 84 (block 286). The device service 84 then updates the data model and provides the updates to the client 182 (block 288). The client 182 is then able to display the updated data and/or trigger other actions based upon the updated data.

In one example, a client may be created to interact with a thermostat 10A (e.g., using the client libraries 198). The client may be set up to monitor two values: current temperature and target temperature. To obtain changes to these two values, the client establishes a subscription to the thermostat object in a structure 10D. Then, when the temperature of the thermostat 10A is adjusted, the target temperature changes and the device service 84 updates the data model (e.g., JSON device and/or structure representation), which may be synchronized with the client 182 in near-real time. The client 182 may listen for changes and display a new target temperature and/or update the current temperature as it changes at the thermostat 10A.

Authorization and Permissions

The API 90 and device service 84 may provide information to clients that may be used to build a better home experience. However, that information is ultimately owned by the user of the smart devices (e.g., thermostats 10A, detectors 10B, devices 10C, and/or camera devices 10E) and can only be shared with clients when the user explicitly allows it. Certain permissions may enable a client to access resources in a shared data model. As such, an authorization process may be used to enable the user to grant permissions to clients requesting to view and/or modify data associated with the user's smart devices (e.g., thermostats 10A, detectors 10B, devices 10C, and/or camera devices 10E) in the data model using the authorization server 191. The authorization process may use an open protocol framework (e.g., OAuth 2.0) to allow secure authorization of third-party applications to obtain limited access to an HTTP service.

The authorization server 191 may provide functionality for managing the authorization code and access token granting processes, which will be described in more detail below. There may be an authorization process for web-based and PIN-based authorization. If a redirect universal resource identifier (URI) was entered when the client was registered, then a web-based authorization code may be in the redirected URI as a code query parameter. If a redirect URI was not entered when the client was registered, then a PIN-based authorization code may be displayed in a web page. PIN based authorization is generally used for devices with no web user interface, and that have an alphanumeric keypad interface.

The permissions may vary based on who the client is, the type of data being requested, the type of access being requested, and so forth. Indeed, in some embodiments, there may be various scopes, or groups of predefined permissions to certain data elements, that are assigned to the clients. Access to resources may be tied to a session (an issued access token). The end user may be asked to approve granting a series of scopes as part of the session initiation process. If the user approves the scopes, the permissions associated with the scopes at the time of issue are tied to the session for the lifetime of the session, as discussed in detail below. Also, in some embodiments, such as described with reference to the camera system API for third-party integrations and camera data access based on subscription status, the disclosed techniques provide functionality to enable the client to insert their own data into the data model using the device service 84 (e.g., via the API 90), retrieve their own data from data model using the device service 84 (e.g., via the API 90), or to allow the client to authorize another third party to modify or view the client's data in the data model using the device service 84 (e.g., via the API 90).

Figure 13:
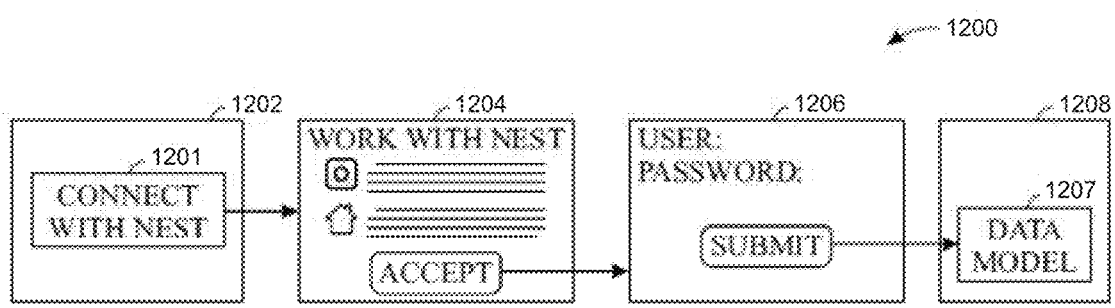
FIG. 13 illustrates a flow diagram of a process for a user to authorize a client to access user data in the data model via the device service, in accordance with embodiments.

FIG. 13 illustrates a flow diagram of a process 1200 for a user to authorize a client to access user data in the data model via the device service 84, in accordance with an embodiment. To interact with the user's smart devices (e.g., thermostats 10A, detectors 10B, devices 10C, and/or camera devices 10E) by manipulating data or viewing data in the data model, the user must first agree to let the client access user device data. The authorization process may begin with a link 1201 to connect to the device service 84 on a client site/app 1202 that the user may select. In response, a resource access permission page 1204 and a login page 1206 may be displayed that asks the user to grant access to the client and/or sign in if not already signed into an authorization server.

The resource access permission page 1204, which is described in detail below, may display the permission and one or more justifications for the permission entered when the client was registered in the data model 1207. If the user accepts the permission requested for the client, an authorization code may be returned from the authorization server to the user, which passes the authorization code to the client, and the client exchanges the authorization code and a client secret for an access token. The client may then make API calls to the device service 84 including the access token to retrieve and/or input data into the data model. In embodiments, the data model 1207 can be implemented as the camera data 326, which is structured as the camera data model of the data fields, as shown and described with reference to FIG. 3, to include the camera data scopes as described with reference to FIGS. 4 and 5.

For example, the client may request to see the current temperature and/or the target temperature using an API call and the access token which provides thermostat read permissions. As a result, the current temperature and/or the target temperature may be returned by the device service 84 and displayed on the client site/app 1208. In a camera device example, the client executing the third-party application 320 may request access to display the recorded video data 324, access the live video stream, and/or access camera event notifications using an API call of the camera system API 330. As should be appreciated, any data for which the client is granted permissions may be accessed in the data model 1207 and used as desired on the client site/app 1208. The user may revoke access at any time, which will inhibit the client from making any further requests for the user's smart devices' (e.g., thermostats 10A, detectors 10B, devices 10C, and/or camera devices 10E) data.

Figure 14:
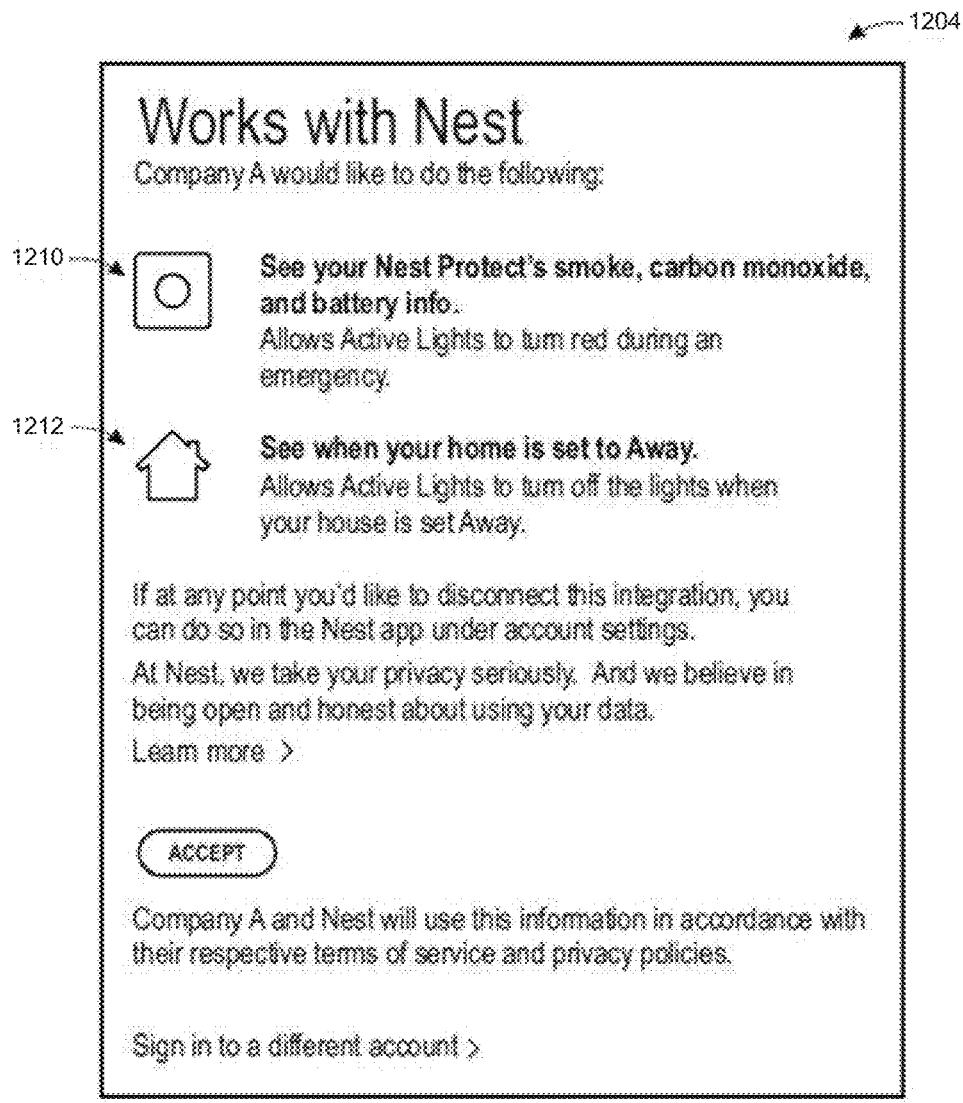
FIG. 14 illustrates the resource access permission page of FIG. 13, in accordance with an embodiment.

FIG. 14 illustrates an example of the resource access permission page 1204 of FIG. 13, in accordance with an embodiment. As discussed above, this page 1204 asks the user to grant access to the client (e.g., a third-party application executing on a client device of the user). In particular, the resource access permission page 1204 displays the permissions and justifications for the permissions when the client was registered in the data model. The justification explains what the client will do with the requested data and how it will benefit the user. Justifications should include the client name, the action(s) the client can take, and the triggering event. For example, a sample template to write justifications include the following:

"Allows [client name] to [take action] [because/when . . . ]"

In some embodiments, the justifications may have a minimum word length (any suitable number, such as 5, 10, 15, 20, etc.), and contain less than or equal to a maximum number of characters (any suitable number, such as 140, 150, 160, etc.). The user may see the justification in the resource access permission page 1204 and in a permissions view within a smart device (e.g., thermostats 10A, detectors 10B, devices 10C, and/or camera devices 10E) site/app.

For example, in the illustrated embodiment, the resource access permission page 1204 indicates that Company A would like to see data about the detector 10B related to smoke, carbon monoxide, and battery info, and by doing so will allow certain lights to turn red during an emergency (1210). Additionally, the page 1204 indicates that Company A would like to see when the user's home is set to away, which allows certain lights to turn off when the house is set to away (1212). The page 1204 also notifies the user that the integration may be disconnected at any time to terminate the client from using the data. In the context of a camera device 10D, which is also shown and described as the camera device 302 with reference to FIG. 3, the resource access permission page 1204 may display an indication that a third-party company would like to access the live video stream 306 that is received at the bus configuration service 308, the recorded video data 324, and/or the camera data 326.

Figure 15:
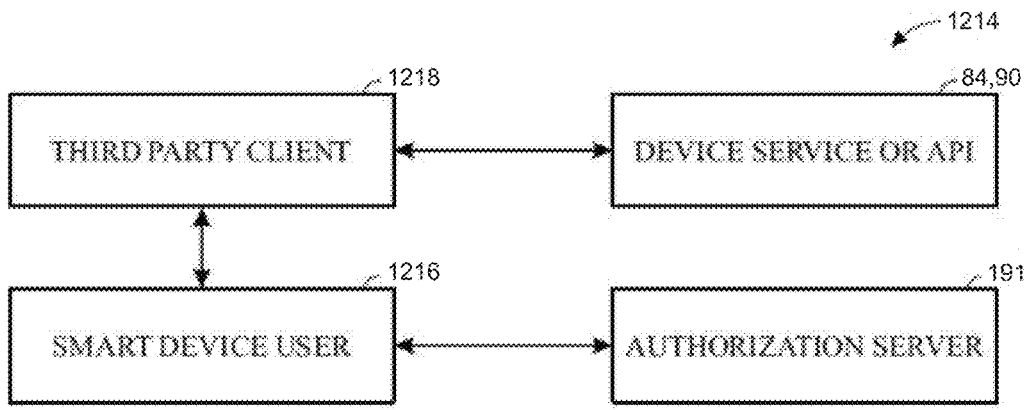
FIG. 15 illustrates a block diagram of a system for authorizing clients to use a user's smart device data via the Web, in accordance with embodiments.
Figure 16:
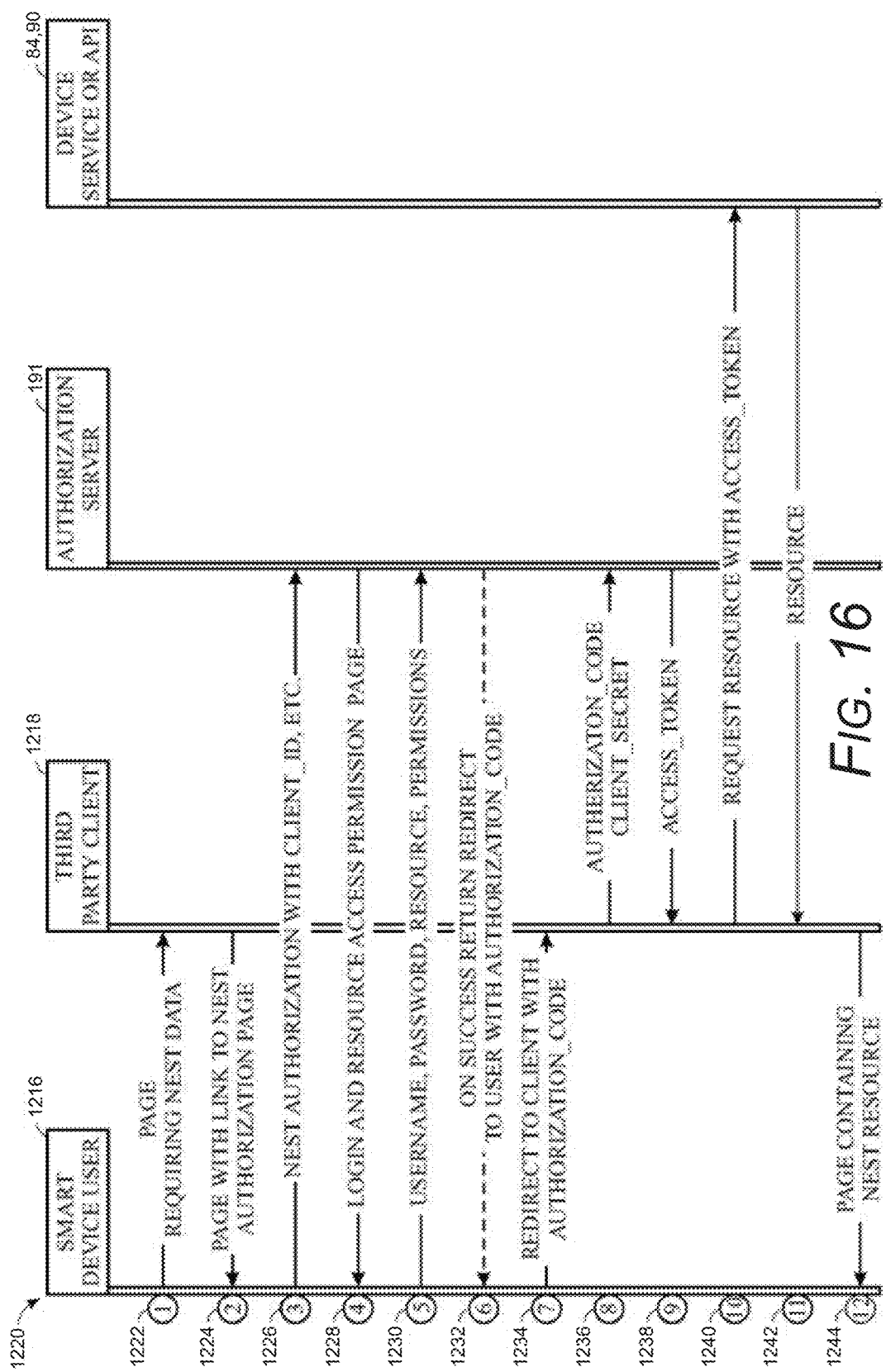
FIG. 16 illustrates a sequence diagram for authorizing clients to use a user's smart device data using the system of FIG. 15 via the Web, in accordance with an embodiment.

FIG. 15 illustrates a block diagram of a system 1214 for authorizing clients to interact with a user's smart device (e.g., thermostats 10A, detectors 10B, devices 10C, and/or camera devices 10E) data and/or operation via the web (e.g., server-to-server resource requests), in accordance with an embodiment. FIG. 16 illustrates a sequence diagram 1220 for authorizing clients to use a user's smart device data using the system 1214 of FIG. 15 via the Web. As illustrated, the sequence diagram 1220 depicts twelve events occurring in a sequential order. For clarity, both FIGS. 15 and 16 will be described together.

The system 1214 may include a smart device user 1216, a third party client 1218, an authorization server 191, and the device service 84 and/or API 90. It should be noted that, in some embodiments, the device service 84 and/or the API 90 may receive the requests for resources from the client 1218 and validate the access token provided by the client 1218. It should also be noted that, in some embodiments, the authorization server 191 may provide functionality including querying client information and a list of scopes that the user granted to the client. As described in detail below, the scopes may group together one or more permissions for a specific functionality (e.g. viewing thermostat data, setting HVAC, viewing live or recorded video, etc.). The authorization server 191 may also authenticate the user 1216 and fetch the user ID, validate the user's consent to grant the client's requested scopes, handle redirects, and receive requests for the authorization code and the access token. In some embodiments, the authorization server 191 may handle the requests via HTTP REST GET calls with query parameter format.

Additionally, the authorization server 191 may include one or more servers that provide varying functionalities. For example, an authorization server that is not exposed to the public may provide functionality for managing the authorization codes, access tokens, client secret, scopes, subscriptions, and permissions, whereas a publicly exposed authorization server may provide functionality for higher level functions of the authorization code and access token granting process, such as querying client information and list of scopes requested for a client, authenticate user and fetch user ID, validate user's consent to grant client's requested scopes, handle redirects, and receive requests to provide access tokens for authorization codes.

The user 1216, which may be a customer/owner of resources requested, may be using a Web browser in the illustrated embodiment. Event (1) 1222 of the sequence diagram 1220 includes the user 1216 sending a request to the client 1218 Web page/app that incorporates data from the data model. In response, event (2) 1224 shows a page being returned to the user with a Web page containing a link to the authorization page. The link to the authorization page may include the following information: response type ("code"), client ID (ID is provided to the client 1218 when registered), state (a value passed from the client 1218 to authorization server 191 and may be used to protect against cross-site request forgery attacks). Event (3) 1226 may include the user 1216 clicking the authorization link, thereby sending a GET request to the authorization server 191. The authorization server 191 responds with the resource access permission page 1204 and the interstitial login page 1206 if the user 1216 is not already logged in, as depicted in event (4) 1228.

Then, as indicated by event (5) 1230, the user 1216 submits a username, password, and resource permissions to the authorization server 191. If the login is successful, the authorization server 191 responds with a redirect to redirect uniform resource identifier (URI) to the user 1216, as indicated by event (6) 1232. The redirect URI may contain the following parameters: code (an authorization code used to obtain an access token), a state (the same value passed to the authorization server 191 earlier, which the client 1218 should validate has not changed upon receipt). The authorization code may be a short string of alphanumeric characters with different length requirements based on whether the authorization is Web-based (e.g., 14, 16, 18 characters) or PIN (6, 8, 10 characters). Also, the authorization code may be subject to expiring if not used within a certain period of time based on whether the authorization is web-based (e.g., 5, 10, 15 minutes) or PIN (e.g., 24, 48, 72 hours). Further, the authorization server 191 may create an authorization entry in the authorization tree for the user and the client that is granted permission in the assigned scopes. In some embodiments, once the permission is granted, data synchronization between the API 90 and the data service 84 may begin.

In event (7) 1234, the user's web browser redirects to the client 1218 with the authorization code. Upon receiving the request from the user 1216 containing the authorization code, the client 1218 may send a POST request to the authorization server 191 containing the following parameters in event (8) 1236: grant type ("authorization code"), code (the authorization code returned by the authorization server 191), client ID (the ID issued when the client was registered), and a client secret (a secret issued to the client 1218 when registered).

As indicated by event (9) 1238, the authorization server 191 responds with an access token. The response may be an object in the JavaScript Object Notation (JSON) data format: \"access_token":"some-random-string", "expires_at": "time-expires ISO8601 format"). In some embodiments, the access token may not expire for an extended period of time (e.g., 10, 15, 20 years). Also, the access tokens may be long unique strings.

Then, as indicated by event (10) 1240, the client 1218 requests the needed resource from the device service 84 using the API 90. The API 90 request may include the following parameter added: access token (the access token returned in the call to the authorization server 191). That is, in some embodiments, the API client or API client device may send one or more requests including the access token to retrieve, access, view, subscribe, or modify data elements of a data model representative of one or more smart environments. The access token may be associated with at least the API client or API client device and one or more scopes granted to the API client or API client device. As previously discussed, the one or more scopes may provide one or more access rights to one or more of the data elements of the data model defined by a hierarchical position of the data elements in the data model represented by a respective path to the data elements. It should be noted that the sending of the request including the access token may be implemented as computer instructions stored one or more tangible non-transitory computer-readable medias and executed by the API client or the API client device.

Sending the one or more requests with the access token enables downstream services (e.g., device service 84) to the API client 1218 or API client device to use the access token to identify the one or more scopes granted to the API client or API client device. The device service 84 may process the request in accordance with the granted scopes to the associated access token and API client 1218 or API client device. The device service 84 responds with the requested resource in event (11) 1242 and the client 1218 includes the resource into a page included in a response to the user 1216, as indicated by event (12) 1244. It should be appreciated that the client 1218 may continue to make requests from the device service 84 to access or modify data in the data model based on the permissions that were granted for as long as the access token is valid. In some embodiments, the device service 84 responds with a data object including data objects from the data model (e.g., a metadata data object, a devices data object, a structures data object) based on the request and scopes associated with the access token. Further, in some embodiments the client 1218 may perform a function in addition to displaying the returned data in a page, such as controlling a setting on the API client device based on the data, executing a control action on the API client device based on the data, and the like.

Figure 17:
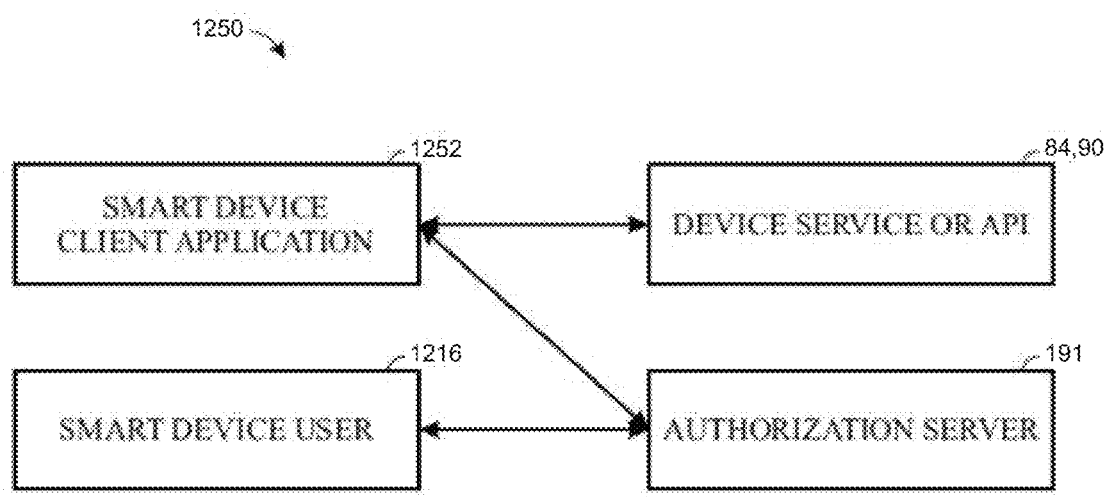
FIG. 17 illustrates a block diagram of a system for authorizing clients to use a user's smart device data via a PIN when the devices do not have a Web UI, in accordance with embodiments.
Figure 18:
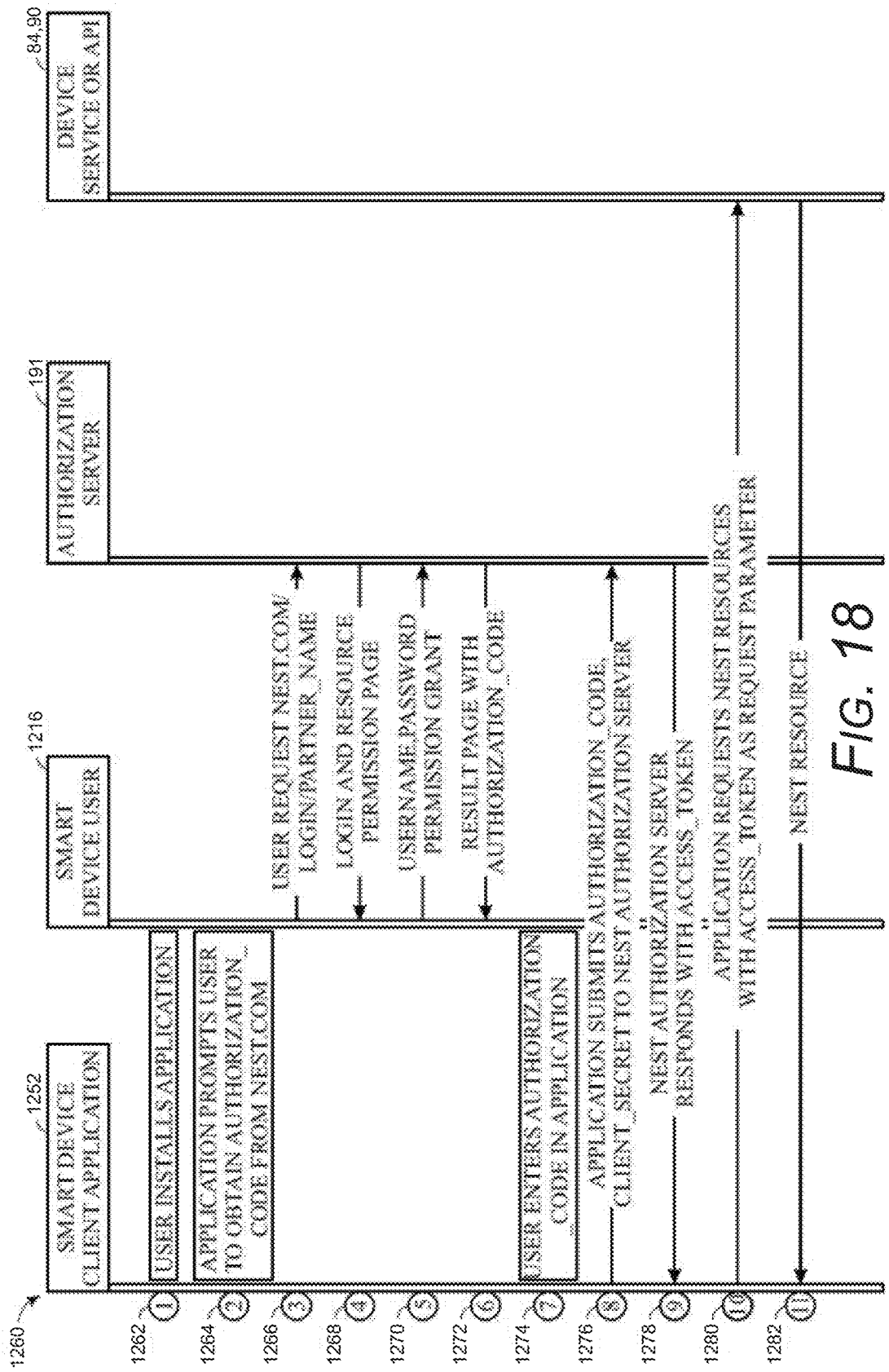
FIG. 18 illustrates a sequence diagram for authorizing clients to use a user's smart device data using the system of FIG. 17 via the PIN, in accordance with an embodiment.

FIG. 17 illustrates a block diagram of a system 1250 for authorizing clients to use a user's smart device (e.g., thermostats 10A, detectors 10B, devices 10C, and/or camera devices 10E) data via a PIN when the devices do not have a web UI, in accordance with an embodiment. FIG. 18 illustrates a sequence diagram 1260 for authorizing clients to use a user's smart device data using the system 1250 of FIG. 17 via the PIN. For clarity, both FIGS. 17 and 18 will be described at the same time.

The system 1250 may include a smart device client application 1252, the smart device user 1216, the authorization server 191, and the device service 84 and/or API 90. It should be noted that, in some embodiments, the device service 84 and/or the API 90 may receive the requests for resources from the client application 1252 and validate the access token provided by the client application 1252. Additionally, the authorization server 191 may include one or more servers that provide varying functionalities. For example, an authorization server that is not exposed to the public may provide functionality for managing the authorization codes, access tokens, client secret, scopes, subscriptions, and permissions, whereas a publicly exposed authorization server may provide functionality for higher level functions of the authorization code and access token granting process, such as querying client information and list of scopes requested for a client, authenticate user and fetch user ID, validate user's consent to grant client's requested scopes, handle redirects, and receive requests to provide access tokens for authorizations codes.

The sequence of events may begin with the user 1216 installing the client application 1252 that requires access to resources in the data model, as indicated by event (1) 1262 in the sequence diagram 1260. In event (2) 1264, the client application 1252 instructs the user to use a link to the authorization server 191 including the client's name. The user 1216 may use a Web browser to enter the link and request the page to the authorization server 191 including the client's name at event (3) 1266. The authorization server 191 responds with the resource access permission page 1204 and the interstitial login page 1206 if the user 1216 is not already logged in, as depicted in event (4) 1268. The user 1216 then submits approval or denial of the resource access permissions for the client and/or enters a username and password if login is required to the authorization server 191 at event (5) 1270. In event (6) 1272, the authorization server 191 responds with a result page that contains a user readable authorization code (personal identification number (PIN)).

The user may copy the PIN from the Web browser and manually enter the PIN into the client application 1252 at event (7) 1274. After the user enters the PIN, the client application 1252 submits the PIN and a client secret (provided when the client was registered) to the authorization server 191, as depicted in event (8) 1276. Upon receipt of the PIN, the authorization server 191 responds to the client application 1252 with an access token at event (9) 1278. The client application 1252 can now make resource requests from the data model via the device service 84 providing the access token as a request parameter to the API 90 and/or the device service 84 at event (10) 1280. The device service 84 and/or the API 90 may analyze the access token and return the requested resources from the data model based on the permissions granted to the client application 1252 event (11) 1282.

In some embodiments, the client 1218 or the client application 1252 may have their access revoked by the user at any time. For example, the user may access a "settings" screen and revoke the permissions granted to the client. The authorization server 191 may generate and send an access token revocation message that deletes the access token assigned to the client 1218 or the client application 1252. The deletion may be detected and, if the client 1218 or the client application 1252 that had their access deleted was the last authorized client, then data synchronization between the API 90 and the data service 84 may be stopped. Further, any sessions that were authenticated with the deleted access token may be disconnected.

In some embodiments, multi-user integration (MUI) may enable the client 1218 or client application 1252 to open a single connection (HTTPS) and read data from multiple users. Each connection may be responsible for the portion of the users using a particular host. Using the single connection may improve efficiency between server-to-server integrations by reducing the overall number of connections. In one example, REST streaming may be used by clients making a call to a multiuser endpoint with a list of access tokens. In some embodiments, the response may include all data for each access token, including all structures and all devices, and metadata. The client may examine the response data to map the access tokens to the corresponding users and/or filter the data values for the information the client desires. To enable the client to map the access tokens, a metadata section may be included in each response that includes the access token associated with the data and the user.

If the client desires to modify the list of access tokens, the connection may be closed, the list updated, and the multi-user call may be made by the client again to reestablish the connection. In some embodiments, when data for users associated with additional access tokens is desired, the client may close the connection and add the add the additional access tokens to the list to send in another request to the multiuser endpoint. As long as the list does not exceed a threshold number of access tokens, the connection will be established and data will be returned for all of the access tokens in the list. That is, in some embodiments, the connection may not be established if more than a threshold number of access tokens are provided. It should be noted, that single-client integrations (e.g., mobile apps) may typically open a new connection for each access token and may not use MUI. To make a MUI call, the client 1218 or client application 1252 may use a specific endpoint (e.g., https://developer-api.nest.com/multiplex) to make a REST streaming call, or the like, and include a list of access tokens in the request. For example, the request URL may be entered as follows:

https://developer-api.nest.com/
multiplex?auth=LIST_OF_ACCESS_TOKENS

The list_of_access_tokens URL parameter may be of type list and be a comma-separated list with a configured maximum number of access tokens. The authorization server 191 may validate the list against the access tokens associated with the client 1218 or the client application 1252. In some embodiments, as mentioned above, the response may include all data values in an all objects so the client 1218 or the client application 1252 may filter the fields of interest and map the access tokens to the corresponding users (e.g., by identifying the access tokens provided in a metadata section of the response and mapping them to the users). Additionally or alternatively, there may be more than one response and each response may be particular for a single access token that was sent in the list of access tokens with the request. The metadata section including the access token provides a mechanism to identify which access token with which the data and/or user is associated.

In one embodiment of multi-user integration, a method for authorizing access for an application programming interface (API) client or API client device to data of one or more data models of one or more smart devices may include retrieving a number of access tokens from an authorization server. The method may also include providing, via a single connection, the plurality of access tokens in a request made by the API client or the API client device to the API. The plurality of access tokens are used to verify access rights of the API client or the API client device to read data for a plurality of users associated with the one or more data models of the one or more smart devices. The method may be implemented as computer instructions on a tangible, non-transitory computer-readable media and executed by the API client or API client device.

As mentioned above, there may be one or more scopes that include specific permissions associated with certain functionality that may be granted to application programming interface (API) clients and/or client applications. A scope may refer to a collection of permissions. Scopes are a unit of permission defining the ability to access or modify the user's data. Scopes may be identified by a unique name (e.g., 64 characters) and an ID number, as discussed below. Scopes enable identifying elements in the data model by permissions to which the client 1218 has access. The elements may be located in the data model based on unique paths that the client 1218 is granted access (e.g., read, write, read and write) via the scope granted. That is, there may be a one to one correspondence between a path in the data model and the element to which the client 1218 has access. Thus, a scope may include providing various access rights to a bundle of paths to elements in the data model.

The scopes that are assigned and granted to the client 1218 or the client application 1252 may be tied to the session (access token) for the life of the session. In some embodiments, the API 90 may validate that the access token is signed by a client secret issued by the authorization server 191. After validation, the API 90 may allow access to the resources in the data model according to the granted scopes associated with the access token using the device service 84. In some embodiments, rules may be set up that allow access to the resources if certain conditions are met. The table below shows one such rule.

```
"users" : {
    "$user" : {
        ".read": "auth.for_user == $user",
    }
}
```

Sample Rule

The above rule indicates that the authenticated user can read the users/<user> element if the "for_user" field of the access token is <user>. Using this technique, rights information may be stored and used to limit third party access to the elements for which the third party has granted permissions. Moreover, updates (insertions, deletions, modification) on the rights tree may be detected and any needed changes may be made to synchronize various servers included in the system. An authorization tree may contain an object for each user who has granted any client 1218 or client application 1252 access. Within the user object there may be sub-objects for every client that has been granted access. Each client object contains information on rights granted to that client. The below table includes an example of an authorization tree.

```
{
    auth:
    {
        55156: //user ID
        {
            1234: //client ID
            {
                scopes: ["thermostat read"],
                granted_at ...
                etc...
            }
            5678: //client ID
            {
                scopes: ["thermostat read/write", "smoke + CO read"],
                granted_at ...
            }
        }
    }
}
```

Authorization Tree

As displayed in the table, the user with ID 55156 granted scopes to two clients, client ID "1234" and client ID "5678". The scope granted to client ID "1234" includes only the thermostat read scope and the client ID "5678" includes both the "thermostat read/write" scope and the "smoke+CO read" scope. The various scopes and permissions bundled into each scope are discussed in detail below.

The permissions are designed and organized into scopes based on the types of data each client 1218 might need. For example, for clients 1218 that only check in and get status updates, a developer may only select a "read" permission for data elements, and, as a result, only choose a scope including read permissions to the associated element paths. However, if the client 1218 is designed to set device values or status, the developer may choose a "read/write" permission for those elements and choose a scope including read/write permissions to the associated element paths. The scopes including the permissions that are selected for a particular client should match the client's features. As the client's features expand, the client 1218 may need new permissions. In some embodiments, a new client version may be created with a scope that includes the newly required permissions and that client version may be offered to the users 1216. It should be understood that if the client 1218 is authorized the assigned scope, then the client may receive all of the permissions defined for that scope. Also, if multiple scopes are authorized for a client 1218, then the client may receive a superset of all permissions combined contained in those scopes. Below is a table of some general scopes and the permissions that each scope includes, according to an embodiment.

| Scope: | Thermostat read |
| --- | --- |
| | Grants read permission to most of the Thermostat and Structure data values |
| Scope: | Thermostat read/write |
| | Grants read permission to all of the Thermostat data values |
| | Grants write permission to these Thermostat data values: fan_timer_active, all target_temperature_x fields and hvac_mode Grants read permission to most of the Structure data values |
| Scope: | Smoke + CO read |
| | Grants read permission to all the Smoke + CO Alarm data values and most of the Structure data values |
| Scope: | Away read |
| | Grants read permission to most of the Structure data values |
| Scope: | Away read/write |
| | Grants read permission to most of the Structure data values |
| | Grants read/write permission for away |
| Scope: | ETA write |
| | Grants read permission to most of the Structure data values |
| | Grants write permission to eta |
| Scope: | Postal code read |
| | Grants read permission for postal_code |
| Scope: | Product data read/write |
| | Grants read permissions for all of the Company data values |
| | Grants read/write permissions to software version and all of the resource use |
| data values | |

Scopes and Permissions

To illustrate, if a developer is registering a client 1218 that listens to (e.g., reads) the ambient temperature, target temperature and the away state of the home, then the developer would choose the "thermostat read" scope, which provides only read access to those data elements. Conversely, a client 1218 that needs to actively modify target temperature, heat/cool mode or fan timer should be assigned the "thermostat read/write" scope, which would provide write access to those data elements, and retain read access to the other thermostat and structure data elements. Another client 1218 might track smoke and CO state, so the "smoke+CO alarm read" scope may be chosen to provide read permissions to those data elements. Still another client 1218 could focus solely on the home, and take action when the user 1216 arrives home, or after the user leaves the home. In such a case, the "away read/write and ETA write" scope may be chosen.

The below tables illustrate the various scopes for element paths in the data model for smart devices, such as thermostats 10A and detectors 10B, and a structure in more detail. The names of the scopes are across the top row of the table, the second row includes the scope ID, the third row includes a version number of the scope, and the leftmost column includes the field/data element paths. In some embodiments, a permission field in the data model may store all the permissions included for the selected scope(s). When the user 1216 approves the requested scope for the client 1218, an authorization session may be created and the string including all permissions for the client 1218 may be copied into a row where authorization session information resides including the access token. The approved scopes for the client may be stored as part of a login string in the data model where the access token is stored. The access token is reused each time the client requests data from the data service 84. It should be noted, that in some embodiments, every scope has at least read permissions to an access_token and client_version element included in a "Metadata" object of the data model.

| Name | Thermostat read | Thermostat read |
|---|---|---|
| Fields        ID | 10 | 19 |
|               Version | 1 | 2 |
| /devices/thermostats/device_id/device_id | READ | READ |
| /devices/thermostats/device_id/local | READ | READ |
| /devices/thermostats/device_id/software_version | READ | READ |
| /devices/thermostats/device_id/structure_id | READ | READ |
| /devices/thermostats/device_id/name | READ | READ |
| /devices/thermostats/device_id/name_long | READ | READ |
| /devices/thermostats/device_id/last_connection | READ | READ |
| /devices/thermostats/device_id/is_online | READ | READ |
| /devices/thermostats/device_id/can_cool | READ | READ |
| /devices/thermostats/device_id/can_heat | READ | READ |
| /devices/thermostats/device_id/is_using_emergency_heat | | |
| /devices/thermostats/device_id/has_fan | READ | READ |
| /devices/thermostats/device_id/fan_timer_active | READ | READ |
| /devices/thermostats/device_id/fan_timer_timeout | READ | READ |
| /devices/thermostats/device_id/has_leaf | READ | READ |
| /devices/thermostats/device_id/temperature_scale | READ | READ |
| /devices/thermostats/device_id/target_temperature_f | READ | READ |
| /devices/thermostats/device_id/target_temperature_c | READ | READ |
| /devices/thermostats/device_id/target_temperature_high_f | READ | READ |
| /devices/thermostats/device_id/target_temperature_high_c | READ | READ |
| /devices/thermostats/device_id/target_temperature_low_f | READ | READ |
| /devices/thermostats/device_id/target_temperature_low_c | READ | READ |
| /devices/thermostats/device_id/away_temperature_high_f | READ | READ |
| /devices/thermostats/device_id/away_temperature_high_c | READ | READ |
| /devices/thermostats/device_id/away_temperature_low_f | READ | READ |
| /devices/thermostats/device_id/away_temperature_low_c | READ | READ |
| /devices/thermostats/device_id/hvac_mode | READ | READ |
| /devices/thermostats/device_id/ambient_temperature_f | READ | READ |
| /devices/thermostats/device_id/ambient_temperature_c | READ | READ |
| /devices/thermostats/device_id/humidity | | READ |
| /structures/structure_id/structure_id | READ | READ |
| /structures/structure_id/thermostats | READ | READ |
| /structures/structure_id/smoke_co_alarms | READ | READ |
| /structures/structure_id/away | READ | READ |
| /structures/structure_id/name | READ | READ |
| /structures/structure_id/country_code | READ | READ |
| /structures/structure_id/postal_code | | |
| /structures/structure_id/peak_period_start_time | READ | READ |
| /structures/structure_id/peak_period_end_time | READ | READ |
| /structures/structure_id/time_zone | READ | READ |
| /structures/structure_id/eta | | |
| /structures/structure_id/data_upload | | |

Thermostat Read Scope

As described above and shown in the Thermostat Read Scope table, the thermostat read scope grants read permission to most of the thermostat and structure data values in the data model. Version 1 of the thermostat read scope does not provide read access to the humidity data values because the element may have been added to the data model after version 1 was created. As depicted, version 2 of the thermostat read scope grants read permission to the humidity data path in addition to all of the other elements included in version 1.

| Name | Thermostat read/write | Thermostat read/write |
|---|---|---|
| Fields        ID | 11 | 20 |
|               Version | 1 | 2 |
| /devices/thermostats/device_id/device_id | READ | READ |
| /devices/thermostats/device_id/local | READ | READ |
| /devices/thermostats/device_id/software_version | READ | READ |
| /devices/thermostats/device_id/structure_id | READ | READ |
| /devices/thermostats/device_id/name | READ | READ |
| /devices/thermostats/device_id/name_long | READ | READ |
| /devices/thermostats/device_id/last_connection | READ | READ |
| /devices/thermostats/device_id/is_online | READ | READ |
| /devices/thermostats/device_id/can_cool | READ | READ |
| /devices/thermostats/device_id/can_heat | READ | READ |
| /devices/thermostats/device_id/is_using_emergency_heat | READ | READ |
| /devices/thermostats/device_id/has_fan | READ | READ |
| /devices/thermostats/device_id/fan_timer_active | READ WRITE | READ WRITE |
| /devices/thermostats/device_id/fan_timer_timeout | READ | READ |
| /devices/thermostats/device_id/has_leaf | READ | READ |
| /devices/thermostats/device_id/temperature_scale | READ | READ |

| Name | Thermostat read/write | Thermostat read/write |
|---|---|---|
| /devices/thermostats/device_id/target_temperature_f | READ WRITE | READ WRITE |
| /devices/thermostats/device_id/target_temperature_c | READ WRITE | READ WRITE |
| /devices/thermostats/device_id/target_temperature_high_f | READ WRITE | READ WRITE |
| /devices/thermostats/device_id/target_temperature_high_c | READ WRITE | READ WRITE |
| /devices/thermostats/device_id/target_temperature_low_f | READ WRITE | READ WRITE |
| /devices/thermostats/device_id/target_temperature_low_c | READ WRITE | READ WRITE |
| /devices/thermostats/device_id/away_temperature_high_f | READ | READ |
| /devices/thermostats/device_id/away_temperature_high_c | READ | READ |
| /devices/thermostats/device_id/away_temperature_low_f | READ | READ |
| /devices/thermostats/device_id/away_temperature_low_c | READ | READ |
| /devices/thermostats/device_id/hvac_mode | READ WRITE | READ WRITE |
| /devices/thermostats/device_id/ambient_temperature_f | READ | READ |
| /devices/thermostats/device_id/ambient_temperature_c | READ | READ |
| /devices/thermostats/device_id/humidity | | READ |
| /structures/structure_id/structure_id | READ | READ |
| /structures/structure_id/thermostats | READ | READ |
| /structures/structure_id/smoke_co_alarms | READ | READ |
| /structures/structure_id/away | READ | READ |
| /structures/structure_id/name | READ | READ |
| /structures/structure_id/country_code | READ | READ |
| /structures/structure_id/postal_code | | |
| /structures/structure_id/peak_period_start_time | READ | READ |
| /structures/structure_id/peak_period_end_time | READ | READ |
| /structures/structure_id/time_zone | READ | READ |
| /structures/structure_id/eta | | |
| /structures/structure_id/data_upload | | |

Thermostat Read/Write Scope

As described above and shown in the Thermostat Read/Write Scope table, the thermostat read/write scope grants read permission to all of the thermostat data values, grants write permission to fan_timer_active, all target_temperature_x fields and hvac_mode data elements, and grants read permission to most of the structure data values. It should be noted that, in some embodiments, certain authorization rules may ensure that when data is written (e.g., modified) by a third party, the modified data includes a field (e.g., "touched_b") that is set equal to a reserved value indicating that a third party made a change and/or a modified at date/time that is set to date/time the data was modified. In this way, third party activity with resources in the data model may be logged and monitored.

| Name | | Smoke + CO read | Smoke + CO read |
|---|---|---|---|
| Fields | ID | 12 | 21 |
| | Version | 1 | 2 |
| /devices/smoke_co_alarms/device_id/device_id | | READ | READ |
| /devices/smoke_co_alarms/device_id/locale | | READ | READ |
| /devices/smoke_co_alarms/device_id/software_version | | READ | READ |
| /devices/smoke_co_alarms/device_id_structure_id | | READ | READ |
| /devices/smoke_co_alarms/device_id/name | | READ | READ |
| /devices/smoke_co_alarms/device_id/name_long | | READ | READ |
| /devices/smoke_co_alarms/device_id/last_connection | | READ | READ |
| /devices/smoke_co_alarms/device_id/is_online | | READ | READ |
| /devices/smoke_co_alarms/device_id/battery_health | | READ | READ |
| /devices/smoke_co_alarms/device_id/co_alarm_state | | READ | READ |
| /devices/smoke_co_alarms/device_id/smoke_alarm_state | | READ | READ |
| /devices/smoke_co_alarms/device_id/ui_color_state | | READ | READ |
| /devices/smoke_co_alarms/device_id/is_manual_test_active | | | READ |
| /devices/smoke_co_alarms/device_id/last_manual_test_time | | READ | |
| /structures/structure_id/structure_id | | READ | READ |
| /structures/structure_id/thermostats | | READ | READ |
| /structures/structure_id/smoke_co_alarms | | READ | READ |
| /structures/structure_id/away | | READ | READ |
| /structures/structure_id/name | | READ | READ |
| /structures/structure_id/country_code | | READ | READ |
| /structures/structure_id/postal_code | | | |
| /structures/structure_id/peak_period_start_time | | | |
| /structures/structure_id/peak_period_end_time | | | |

| Name | Smoke + CO read | Smoke + CO read |
|---|---|---|
| /structures/structure_id/time_zone | READ | READ |
| /structures/structure_id/eta | | |
| /structures/structure_id/data_upload | | |

Smoke+CO Read Scope

The smoke+CO read scope grants read permission to all the smoke+CO alarm data values and most of the structure data values, as show in the table above. The smoke+CO read scope version 2 includes the same permissions for all of the data values included in version 1 but adds additional read permission to the is_manual_test_active data element and the last_manual test_time data element. The name data value may be displayed in user interface labels, while the name_long may be used in long form text. Device_id may be a string that uniquely represents this device. When a device is connected to multiple clients, each developer may see a different device_id for that device. In embodiments where the same developer has installed multiple clients for the device, the developer may see the same device_id. The locale data value may include the language and country code assigned to the device. Software_version may include a string that represents the firmware currently installed on the device. Structure_id may include a string that uniquely represents this structure (the structure that the device is paired with). Last_connection may include the timestamp of the last successful connection to the data service 84. Is_online may include the online status that is determined by using the last_connection time and an expected reconnection window that is device specific. Battery_health may include a string that states whether the battery is OK or whether it needs to be replaced.

Co_alarm_state may include values that increase in severity. For example, when the CO levels are rising, the co_alarm_state may show "warning" and when the user should exit the home, the co_alarm_state may show "emergency." Smoke_alarm_state may include values that increase in severity. For example, when the smoke levels are rising, the smoke_alarm_state may show "warning" and when the user should exit the home, the smoke_alarm_state may show "emergency." The is_manual_test_active data value is normally "false" but may be "true" when a smoke or CO test is started. Last_manual_test_time may include the timestamp of the last successful manual smoke or CO test. The ui_color_state data value may be derived from is_online, battery_health, co_alarm_state, and smoke_alarm_state. The ui_color_state may mirror the color that is displayed on an app and/or the device.

| Name | | Away read |
|---|---|---|
| Fields | ID | 14 |
| | Version | 1 |
| /structures/structure_id/structure_id | | READ |
| /structures/structure_id/thermostats | | READ |
| /structures/structure_id/smoke_co_alarms | | READ |
| /structures/structure_id/away | | READ |
| /structures/structure_id/name | | READ |
| /structures/structure_id/country_code | | READ |
| /structures/structure_id/postal_code | | |
| /structures/structure_id/peak_period_start_time | | |
| /structures/structure_id/peak_period_end_time | | |
| /structures/structure_id/time_zone | | READ |
| /structures/structure_id/eta | | |
| /structures/structure_id/data_upload | | |

Away Read Scope

As described above and shown in the Away Read Scope table, the away read scope grants read permission to most of the structure data values. For example, version 1 of the away read scope grants read permission to /structures/structure_id/structure_id, /structures/structure_id/thermostats, /structures/structure_id/smoke_co_alarms, /structures/structure_id/away, /structures/structure_id/name, /structures/structure_id/county_code, and /structures/structure_id/time_zone. Version 1 of the away read scope does not provide read or write permission to the following data elements: /structures/structure_id/postal_code, /structures/structure_id/peak_period_start_time, /structures/structure_id/peak_period_end_time, /structures/structure_id/eta, or /structures/structure_id/data_upload. It should be noted that the away field may indicate whether the structure is occupied and may include three states: home (someone is in the house, either because the smart device determines that someone is in the house based on motion sensor data or the user has explicitly set the structure to home via an application, the client, or ETA), away (the user has explicitly set the structure to away), auto-away (the smart device has determined that no one is in the structure).

| Name | | Away read/write |
|---|---|---|
| Fields | ID | 15 |
| | Version | 1 |
| /structures/structure_id/structure_id | | READ |
| /structures/structure_id/thermostats | | READ |
| /structures/structure_id/smoke_co_alarms | | READ |
| /structures/structure_id/away | | READ WRITE |
| /structures/structure_id/name | | READ |
| /structures/structure_id/country_code | | READ |
| /structures/structure_id/postal_code | | |
| /structures/structure_id/peak_period_start_time | | |
| /structures/structure_id/peak_period_end_time | | |
| /structures/structure_id/time_zone | | READ |
| /structures/structure_id/eta | | |
| /structures/structure_id/data_upload | | |

Away Read/Write Scope

As described above and shown in the Away Read/Write Scope table, the away read/write scope grants read permission to most of the structure data values (e.g., the same data values that read permissions are granted in the away read scope) and grants read/write permission for the away data value.

| Name | | ETA write |
|---|---|---|
| Fields | ID | 17 |
| | Version | 1 |
| | /structures/structure_id/structure_id | READ |
| | /structures/structure_id/thermostats | READ |
| | /structures/structure_id/smoke_co_alarms | READ |
| | /structures/structure_id/away | |
| | /structures/structure_id/name | READ |
| | /structures/structure_id/country_code | READ |
| | /structures/structure_id/postal_code | |
| | /structures/structure_id/peak_period_start_time | |
| | /structures/structure_id/peak_period_end_time | |
| | /structures/structure_id/time_zone | READ |
| | /structures/structure_id/eta | WRITE |
| | /structures/structure_id/data_upload | |

ETA Write Scope

As described above and shown in the ETA Write Scope table, the ETA write scope grants read permission to most of the structure data values and grants write permission to the eta data value. For example, version 1 of the ETA write scope grants read permission to /structures/structure/structure_id, /structures/structure_id/thermostats, /structures/structure_id/smoke_co_alarms, /structures/structure_id/name, /structures/structure_id/country_code, and /structures/structure_id/time_zone. Version 1 of the away read scope does not provide read or write permission to the following data elements: /structures/structure_id/away, /structures/structure_id/postal_code, /structures/structure_id/peak_period_start_time, structures/structure_id/peak_period_end_time, /structures/structure_id/eta, or /structures/structure_id/data_upload. It should be noted that ETA is an object, set on a structure and only write access is allowed. The ETA field should be used to provide information on when the smart thermostat 46 should prepare the temperature of a house for people arriving.

| Name | | Postal code read |
|---|---|---|
| Fields | ID | 22 |
| | Version | 1 |
| | /structures/structure_id/postal_code | READ |

Postal Code Read Scope

As described above and shown in the Postal Code Read Scope table, the postal code read scope grants read permission to the postal code data value.

| Name | Product data read/write |
|---|---|
| Fields ID | 23 |
| Version | 1 |
| /devices/$company/$product_type/product_id/identification/device_id | READ |
| /devices/$company/$product_type/product_id/identification/serial_number | READ |
| /devices/$company/$product_type/product_id/location/structure_id | READ |
| /devices/$company/$product_type/product_id/software/version | READ/WRITE |
| /devices/$company/$product_type/product_id/resource_use/electricity/value | READ/WRITE |
| /devices/$company/$product_type/product_id/resource_use/electricity/measurement_reset_time | READ/WRITE |
| /devices/$company/$product_type/product_id/resource_use/electricity/measurement_time | READ/WRITE |
| /devices/$company/$product_type/product_id/resource_use/gas/value | READ/WRITE |
| /devices/$company/$product_type/product_id/resource_use/gas/measurement_reset_time | READ/WRITE |
| /devices/$company/$product_type/product_id/resource_use/gas/measurement_time | READ/WRITE |
| /devices/$company/$product_type/product_id/resource_use/water/value | READ/WRITE |
| /devices/$company/$product_type/product_id/resource_use/water/measurement_reset_time | READ/WRITE |
| /devices/$company/$product_type/product_id/resource_use/water/measurement_time | READ/WRITE |
| /structures/structure_id/devices/$company/$product_type | READ |

Product Data Read/Write Scope

As described above and shown in the Product Data Read/Write Scope table, the product data read/write scope grants read permission to some of the company and structures data values and grants read/write permission to most of the company data values. For example, version 1 of the product data read/write scope grants read permission to /devices/$company/$product_type/product_id/identification/device_id, /devices/$company/$product_type/product_id/identification/serial_number, /devices/$company/$product_type/product_id/location/structure_id, and /structures/structure_id/devices/$company/$product_type. Further, the product data read/write scope provides read/write permissions to /devices/$company/$product_type/product_id/software/version, /devices/Scompany/$product_type/product_id/resource_use/electricity/value.

/devices/$company/$product_type/product_id/resource_use/electricity/measurement_reset_time, /devices/$company/$product_type/product_id/resource_use/electricity/measurement_time, /devices/$company/$product_type/product_id/resource_use/gas/value, /devices/$company/$product_type/product_id/resource_use/gas/measurement_reset_time, /devices/$company/$product_type/product_id/resource_use/gas/measurement_time, /devices/$company/$product_type/product_id/resource_use/water/value, and /devices/$company/$product_type/product_id/resource_use/water/measurement_reset_time.

To assign scopes to clients 1218 and/or client applications 1252, a developer may first need to register the client 1218 and: client application 1252 in the data model. Developers may need a developer account to be eligible to create clients. Developer accounts may be created by users and the users may only be allowed one developer account. When initially created, the developer account may have low provisioning limits. Provisioning limits define how many clients a developer may have associated with it, and how many unique users a client may have. Each client may have its own user limit. User limits may be defined as soft and hard. Soft limits may be exposed to the developer and hard limits may be enforced programmatically. In some embodiments, a client active flag may (e.g., Boolean) may be set that indicates if the client is active. If the client active flag is false, no new sessions may be authorized and no access tokens can be validated. Also, a developer active flag (e.g., Boolean) may indicate if the developer is active. If the developer active flag is false, no new clients may be created, but existing clients may continue to work, including initiating new sessions.

The authorization server 191 may collect various statistics during operation. For example, the authorization server 191 may collect statistics related to authorizations, created access tokens requests, successful created access tokens requests, failed created access tokens requests, access token validation requests, successful access token validation requests, failed access token validation requests, access tokens by user requests, deleted access tokens requests, successful deleted access tokens requests, failed deleted access tokens requests, created client secrets requests, retrieved client secret requests, successful retrieved client secret requests, failed retrieved client secret requests, deleted client secret requests, successful deleted client secret requests, failed deleted client secret requests, and/or reserved client sessions.

When creating a client, the developer may select the scopes that the client may need based on their intended use of the data and functionality. It should be noted that the term client may refer to a developer created integration point which defines the set of scopes an end user will be asked to grant the developer. It should also be noted that the term vendor may refer to an organization that produces third party devices (e.g., an electronic device produced by a manufacturer that does not host the data model) in a service or data streams. The data model may include two tables to store vendor data (vendors table) and associations with developers (vendor developer association table). The vendors table may contain the following fields at a minimum: unique ID (a UUID), data path name, and created at timestamp. The UUID is assigned when the vendor record is created. The UUID value may not be changed after creation. The data path name may include a unique string, with no spaces, that may be used to identify the vendor's section of the data model. The data path name is not intended to be exposed to end users. The value of the data path name may not be changed after it is created. The created at timestamp may include the timestamp of when the vendor was created.

The vendor developer association table may map the vendors to the developers that created the vendors in the data model. The vendor developer association table may include at least three columns: vendor ID, developer ID, and created at timestamp. The vendor ID may include the ID of the vendor, which may be a foreign key to the vendors table. The developer ID may include the ID of the developer, which may be a foreign key to the developers table. The created at timestamp may include the timestamp of when the vendor developer association was created. In some embodiments, there may be a one to one relationship between a developer and a vendor. That is, there may be a programmatic restriction that only allows one developer to have one vendor.

APIs may be used to manage the vendors and the vendor developer associations. For example, functionality provided by the APIs may include creating a vendor, associating a vendor with a developer (associating a vendor with a developer may add the developer's user to the vendor user group), and disassociating a vendor from a developer (disassociating a vendor from a developer may inhibit new clients being created with the vendor data scopes but may not remove vendor data scopes and permissions from existing clients and authorization sessions).

In some embodiments, an assignable permission may be used by the scopes. An assignable permission may include an attribute placeholder in certain element data paths that will be replaced with the vendor data path names when clients 1218 are created by the developer. For example, a general definition of an assignable permission may include /$vendor/* and /structures/*/$vendor/clients/*. The assignable permission after being assigned to a client for a vendor named "Company A" may include /companya/* and /structures/*/companya/clients/*. If a scope is assignable, a replacement may be run on all placeholders when the scope is added to the client 1218. In some embodiments, scopes with assignable attributes may be restricted to developers who are in the vendor user group.

The assignable permissions and associated vendors may enable a developer to have a vendor associated with it and the string to access the data element. The assignable permission allows a vendor to provide its specific data into the data model and to read that data as desired using their vendor specific data path. As such, the data model may include a section with vendor's device id and data specific to the client to be entered into the model. The assignable permission offers selective visibility into the data model based on vendor. Each device added gets a new device id and permissions levels to allow access to certain data. Each vendor may only be allowed to see data specific to each respective vendor. To enable a client to enter and read data related to their devices into the data model, a vendor record may be created in the vendors table and a record may be created that associates the vendor to the developer in the vendor developer association table. The vendor can then register specific devices (the vendor has a device of a device type to associate with a structure, so a record is created for that device in a user's structure in the data model) and use device services 84 to access the data model including the vendor specific data (using data path name with the vendor's name inserted via the assignable permissions). In some embodiments, a first vendor specific information in the data model may be accessed by one or more other vendors if the first vendor authorizes the one or more other vendors.

In some embodiments, a client 1218 may be locked with the scopes that are provided by the developer when creating the client 1218. If new elements are added to the data model and included in different versions of certain scopes, a new client may be created and assigned the scopes including the new elements. In some embodiments, updatable client scopes may be used to version the client. If it is desirable to change the scope information for a client, a different version of the client including the desired scopes may be selected. For example, version 1 of the client may be assigned scope with ID "10" and version 2 of the client may be assigned scopes with IDs "10" and "20". A message may appear in an end user app that indicates a developer has updated their client and would like to have access to the following permissions. If the user 1216 approves, then the permissions for version 2 are copied into the permissions list for the authorization session and included in the string including the access token without having to go through a back and forth process between the device service 84 and/or API 90 and the client 1218. The process may include one click by the user to change an existing session for a client 1218 to modify the allowed scopes.

In some embodiments, various database tables may be used to manage vendors, developers, clients, access tokens, and the like. The tables may be designed in a relational manner. That is, some of the tables may share elements that are the same to match the elements and pull all of the information related to those particular elements. For example, a client table may include a client ID and a user table may include a user ID. An access token table may include an access token ID data element and the client ID and the user ID data elements. In doing so, the access token table shows which client ID's and user ID's are associated with which access token ID's. Similarly, an authorization code table may include an authorization code ID data element and both the user ID and the client ID. In doing so, the authorization code table shows which client ID's and user ID's are associated with which authorization code ID's. In addition, a scopes table may be used to maintain a scope ID and the permissions included in the scopes. When the user approves a scope for a client, the scope ID that is approved and the access token ID that correlates to the client may be stored in an access token and scopes table, and so forth.

In some embodiments, the authorization server 191 may include one or more servers that provide different functionality. For example, one server may not be exposed to the public and include low level functions for managing authorization codes, access tokens, client secrets, scopes and permissions, while a second server may be exposed to the public and include functions for higher level logic of the authorization code and access token granting process (query client information and list of scopes assigned, authenticate user and fetch user ID, validate user's consent to grant client's requested scopes, handle redirects, receive request for authorization code and access token in a GET REST web service call with query parameter format).

The internally-facing server (e.g., the server that is not publicly exposed) may include multiple API URLs that provide various functionalities. For example, the functionalities may include creating new authorization codes, creating new access tokens, validating access tokens, deleting access tokens, creating new client secrets, retrieving client ID, deleting client secrets, and the like. The requests and responses may be in the form of JSON.

In some embodiments, an API URL to retrieve an authorization code may be used. A request to the API URL may include the user ID, client ID, PIN request, permissions, and/or associated scope IDs. The response may return a status, the authorization code, expires at date/time, and/or the scope IDs. In some embodiments, an API URL to retrieve an access token may be used. A request to the API URL may include the client ID, client secret, and/or authorization code. The response may return a status, the access token, and/or expires at date/time.

In some embodiments, an API URL to validate an access token may be used. A request to the API URL may include the access token, which may be a long unique string. In some embodiments, the access token may include a leading letter, "c", a dot ".", and a long random string where the characters are all URL compatible (e.g., c.hpNS6bLYNOqYzhAy AIR200dzR6asdfswerASDFAFS324235). The response may return a status, the user ID, the client ID, the user token, permissions, and the scope IDs if the access token is valid.

In some embodiments, an API URL to delete an access token may be used. If the deletion is successful, a response may include the access token, expires at date/time, created at date/time, ID, and client ID. If the deletion fails, the response may include a status indicating the same. In some embodiments, an API URL to create a client secret and/or replace an existing client secret for a client ID may be used. A response may include the client ID and the client secret that is created.

In some embodiments, an API URL to get the client secret may be used. A response may include the client secret that is requested. In some embodiments, an API URL to get a client ID and a client secret may be used. A response may include the client ID and the client secret that is requested.

In some embodiments, an API URL to delete a client secret may be used. If a deletion request is successful, the response may include a status indicating that the deletion was successful. If the deletion request failed, then the response may include a status indicating that the deletion failed.

The publicly exposed server used by the authorization server 191 may also provide various functionality, such as validating an access token, getting an authorization code, revoking access to a user's data for a client, removing authorizations for all user's clients, getting all clients for a user, getting a specific client or a user with sessions, getting all clients, checking if a client exists, getting a client ID, updating a client, deleting a client, creating a client, setting the active state on a client, setting the users limit on a client, getting the status of a client's users limit, getting developer information, updating a developer, creating a new developer account, setting the active state on a developer, setting the clients limit on a developer, setting the support flags on a developer, updating a justification for a scope, getting all clients for a developer, getting client for a specific developer, getting all client categories, getting all scopes, getting all restrictions on a scope, adding a restriction to a scope, removing a restriction from a scope, obtaining an access token using an authorization code, populating target structure with a fake device (thermostat), and/or deleting a session. The functionalities may be included in various API URLs, as generally described below.

In some embodiments, an API URL that validates an access token may be used. A request to the API URL may include the access token. If the access token is not valid, only a valid field may be returned indicating that the access token is not valid. If the access token is valid, then the valid field, user ID, client ID, company name, client name, user token, permissions, session ID, and/or scope IDs may be returned. In some embodiments, an API URL to get an authorization code may be used. A request may include a client ID. If successful, the response may include a status and the authorization code, expires at date/time, and scope IDs.

In some embodiments, an API URL to revoke access to user's data for a client may be used. A request to the API URL may include an access token associated with a client and user. If revocation is successful, the response may include a status and a message indicating that the session has been deleted. If revocation is unsuccessful, an error response may be returned and include a reason for the error, such as the session was not found or was unable to be deleted.

In some embodiments, an API URL to remove authorizations for all user's clients may be used. A request to the API URL may include an access token. If removal is successful, the response may include a status and a message indicating that the session has been deleted. If removal is unsuccessful, an error response may be returned and include a message indicating that the session was unable to be deleted. In some embodiments, an API URL to get all clients for a user (including sessions) may be used. A request to the API URL may include an access token associated with the clients and the user. A response may include an ID, name, company name, description, redirect URI, scopes (ID, justification, name, version), targeted number users, intended usage, active, active, users limit, visibility IDs, category IDs, sessions, modified at date/time, created at date/time, and so forth.

In some embodiments, an API URL to get a specific client for a user with sessions may be used. A request may include an access token associated with the client and the user. A response may include information related to the client, such as an ID, name, company name, description, redirect URI, scopes (ID, justification, name, version), targeted number users, intended usage, active, active, users limit, visibility IDs, category IDs, sessions, modified at date/time, created at date/time, and so forth.

In some embodiments, an API URL to get all clients may be used. A response may include client information, such as ID, name, company name, description, redirect URI, support URL, scopes (ID, justification, name, version), targeted number users, intended usage, active, active, users limit, visibility IDs, category IDs, sessions, modified at date/time, created at date/time, and so forth. In some embodiments, an API URL to check if a client exists may be used. A request may include an access token and parameters including a name (e.g., URL encoded name to check). A response may include a status, name, in use field, and so forth.

In some embodiments, an API URL to update a client may be used. A request may include an access token and fields related to the client to update, such as name, description, redirect URI, support URL, targeted number users, and/or intended usage. It should be noted that all fields may be optional and only the fields included in the request may be updated. The response may include a status and all fields related to the client, such as ID, name, company name, description, redirect URI, support URL, scopes (ID, justification, name, version), targeted number users, intended usage, active, users limit, visibility IDs, category IDs, developer IDs, modified at date/time, created at date/time, and so forth.

In some embodiments, an API URL to delete a client may be used. A request may include an access token associated with the client to delete. A response may include a status indicative of whether the deletion request was successful. In some embodiments, a client may be deleted if it has fewer than a threshold number of users (e.g., 25, 30, 35) to which it is associated. For example, in some embodiments, the owner may delete clients that have less than 25 users.

In some embodiments, an API URL to create a client may be used. A request may include an access token and fields including developer ID, name, description, redirect URI, support URL, targeted number users, intended usage, scopes (ID, justification), and/or category IDs. In some embodiments, the name may be unique. A response may include a status and fields including ID, name, company name, description, redirect URI, support URL, scopes (ID, justification, name, version), targeted number users, intended usage, active, visibility IDs, category IDs, developer ID, secret, modified at time/date, and/or created at time/date. An error response may be returned in several instances, including when there is no developer account, the provisioning limit is exceeded, the user does not own the developer account, the developer is not active, there is a duplicate client name, the requestor is unauthorized, and/or the requestor is not a staff user.

In some embodiments, an API URL to set active state on a client may be used. A request may include an access token and an active state. A response may include a status and the active state. In some embodiments, an API URL to set the users limit on a client may be used. A request may include an access token and a soft and a hard number of users limit. A response may include a status and the soft and hard limits. In some embodiments, an API URL to get the status of a client's user limit may be used. A request may include an access token. A response may include a status, user limit, user count, and/or status OK (e.g., set to "true" if the users limit is not exceeded and set to "false" if over users limit).

In some embodiments, an API URL to get developer information may be used. A request may include an access token. A response may include a status and developer information, such as ID, user ID associated with the developer, active state, client limit, address information, name, phone, company name, company URL, industry, company size, support (commercial and paid), modified at time/date, and/or created at time/date.

In some embodiments, an API URL to update a developer may be used. A request may include an access token and developer information to update, such as phone, company name, address information, company URL, industry, and/or company size. It should be noted that, in some embodiments, all fields in the body of the request may be optional and only the submitted fields may be updated. A response may include a status and the developer's information, such as ID, user ID, active, client limit, address information, name, phone, company name, company URL, industry, company size, support (commercial and paid), modified at time/date, and/or created at time/date.

In some embodiments, an API URL to create a developer account may be used. A request may include an access token and developer information, such as user ID, name, phone, company name, address information (e.g., first street information, second street information, city, state, postal code, country), company URL, industry, and/or company size. A response may include a status and the developer's information, such as ID, user ID, active, client limit, address information (e.g., first street information, second street information, city, state, postal code, country), name, phone, company name, company URL, industry, company size, support (commercial and paid), modified at time/date, and/or created at time/date.

In some embodiments, an API URL to set the active state on a developer may be used. A request may include an access token and active state of a developer. A response may include a status and the active state of the developer. In some embodiments, an API URL to update a scope's justification may be used. A request may include an access token, scope ID, and updated justification. The response may include a status, scope ID, and updated justification. In some embodiments, an API URL to get all clients for a developer may be used. A request may include an access token. A response may include client information, such as client ID, name, company name, description, redirect URI, support URL, scopes (ID, justification, name, version), targeted number users, intended usage, active, users limit, visibility IDs, category IDs, secret, modified at date/time, and/or created at date/time.

In some embodiments, an API URL to get all client for a specific developer may be used. A request may include an access token. A response may include a status and client information, such as client ID, name, company name, description, redirect URI, support URL, scopes (ID, justification, name, version), targeted number users, intended usage, active, users limit, visibility IDs, category IDs, developer ID, secret, modified at date/time, and/or created at date/time.

In some embodiments, an API URL to get all client categories may be used. A response may include a status, client category ID, and name for the client category. In some embodiments, an API URL to get all scopes may be used. A response may include a status, scope ID, scope name, and version of the scopes. In some embodiments, an API URL to get all restrictions on a scope may be used. Restrictions may limit a scope to particular data elements, clients, users, and so forth. A response returned by this API URL may include a status and names of user groups restricting the scope.

In some embodiments, an API URL to add a restriction to a scope may be used. A request may include the restriction to be added to the scope and scope ID. A response may include a status and a message field indicating that the scope restriction has been added. In some embodiments, an API URL to delete a restriction to a scope may be used. A request may include the restriction to be deleted and scope ID. A response may include a status and a message field indicating that the scope restriction has been deleted.

request may include an URL parameters including the authorization code provided in the call to /oauth2/authorize, the client ID requesting access to a user's data, the client secret key provided by the authorization server 191 to the client, and the grant type. The response may include a status, content type, and a body including fields related to the access token, and the expires in number of seconds until the token expires. An error may occur in several scenarios including when a parameter is missing, an authorization code is not found, an authorization code expired, a client secret not found, a client is not active and a redirect URI parameter is present. If any of the above errors occurs, an error response may include a status including a different status ID for the error, content type, and a body including a message indicating which error occurred.

```
POST
/oauth2/access_token?code=STRING&client_id=STRING&client_secret=STRIN
G&grant_type=authorization_code
Request:
    • url parameters:
        o  code : the authorization_code provided in the call to /oauth2/authorize.
        o  client_id : id of the client (application) requesting access to a user's
           data.
        o  client_secret : secret key provided by Nest to client. This is also
           sometimes called a "application key".
        o  grant_type : may be authorization_code
Response:
    • status: 200
    • content type : application/json
    • body :
           {
           "access_token":"STRING",
           "expires_in":LONG // number of seconds until token expires
           }
Error Response:
    • Missing parameter:
        o  status: 400
        o  contenttype: application/json
        o  body: {"error":"missing_paramenter", "error_description":"missing
           required parameters: PARM_NAME"}
    • Authorization code not found:
        o  status: 400
        o  contenttype: application/json
        o  body: {"error":"oauth2_error", "error_description":"authorization code
           not found"}
    • Authorization code expired:
        o  status: 400
        o  contenttype: application/json
        o  body: {"error":"oauth2_error", "error_description":"authorization code
           expired"}
    • Client secret not found:
        o  status: 400
        o  contenttype: application/json
        o  body: {"error":"oauth2_error", "error_description":"client secret not
           found"}
    • Client is not active:
        o  status: 403
        o  contenttype: application/json
        o  body: {"error":"client_not_active", "error_description":"client is not
           active"}
    • redirect_uri parameter present:
        o  status: 400
        o  contenttype: application/json
        o  body: {"error":"input_error","error_description":"redirect_uri not
           allowed"}
```

Server to Server Call from Client to Authorization Server to Obtain an Access Token from an Authorization Code API URL The server to server call from a client to the authorization server 191 to obtain an access token from an authorization code API URL displayed above includes the contents of a sample JSON request and response. As displayed, the In some embodiments, an API URL to populate a target structure with a fake device (e.g., thermostat, smoke detector) to test a client's access and/or usage of the data model may be used. A response may include a status and an empty message body for the sub-elements of the fake device. In some embodiments, an API URL to delete a session (invalidate the access token) may be used. A request to delete the session, which invalidates the access token, may include the access token to be invalidated. A response may include a status.

Data Model

As discussed above, clients 182 communicate with the structures 10D and devices (e.g., 10A-10C and camera devices 10E) via a shared data model (e.g., a shared JSON document) stored and/or accessible by the device service 84. For example, application programming interface (API) clients or API client devices may send one or more requests to the API 90 or device service 84 to retrieve, access, view, subscribe, or modify data in the data model representative of one or more smart environments. Sending the requests may be implemented by the API client or API client device as computer instructions stored on one or more tangible, non-transitory computer-readable media and executed by a processor. Data in the data model may be organized hierarchically. At the top level of the hierarchy are metadata, devices, and structures. Specific device types are modeled under the devices object, such as thermostats, hazard detectors (e.g., smoke and CO alarms), and/or camera devices. In some embodiments, the metadata data object, the devices data object, and the structures data object may be peers relative to one another (e.g., at the same relative level to one another) in the hierarchy. In addition, the data model may be a single unified instance that is scalable for additional devices (e.g., thermostats, hazard detectors, third-party devices, and/or camera devices), companies, and/or structures. For example, below is an example of a hierarchically structured data model, in accordance with an embodiment.

```
{
    "metadata": {
        "access_token": "c.FmDPkzyzaQe..." ,
        "client_version": 1
    },
    "devices": {
        "thermostats": {
            "peyiJNo0IldT2YlIVtYaGQ": {
                "device_id": "peyiJNo0IldT2YlIVtYaGQ" ,
                "locale": "en-US" ,
                "software_version": "4.0" ,
                "structure_id": "VqFabWH21nwVyd4RWgJgNb292wa7hG_dUwo2i2SG7j3-BOLY0BA4sw",
                "name": "Hallway (upstairs)",
                "name_long": "Hallway Thermostat (upstairs)" ,
                "last_connection": "2015-10-31T23:59:59.000Z" ,
                "is_online": true ,
                "can_cool": true ,
                "can_heat": true ,
                "is_using_emergency_heat": true ,
                "has_fan": true ,
                "fan_timer_active": true ,
                "fan_timer_timeout": "2015-10-31T23:59:59.000Z" ,
                "has_leaf": true,
                "temperature_scale": "C" ,
                "target_temperature_f": 72 ,
                "target_temperature_c": 21.5 ,
                "target_temperature_high_f": 72 ,
                "target_temperature_high_c" : 21.5 ,
                "target_temperature_low_f": 64 ,
                "target_temperature_low_c": 17.5 ,
                "away_temperature_high_f": 72 ,
                "away_temperature_high_c": 21.5 ,
                "away_temperature_low_f": 64 ,
                "away_temperature_low_c": 17.5 ,
                "hvac_mode": "heat" ,
                "ambient_temperature_f": 72 ,
                "ambient_temperature_c": 21.5 ,
                "humdity": 40
            }
        },
        "smoke_co_alarms": {
            "RTMTKxsQTCxzVcsySOHPxKoF4OyCifrs": {
                "device_id": "RTMTKxsQTCxzVcsySOHPxKoF4OyCifrs" ,
                "locale": "en-US" ,
                "software_version": "1.01" ,
                "structure_id": "VqFabWH21nwVyd4RWgJgNb292wa7hG_dUwo2i2SG7j3-BOLY0BA4sw",
                "name": "Hallway (upstairs)",
                "name_long": "Hallway Protect (upstairs)" ,
                "last_connection": "2015-10-31T23:59:59.000Z" ,
                "is_online": true ,
                "battery_health": "ok" ,
                "co_alarm_state": "ok" ,
                "smoke_alarm_state": "ok" ,
                "is_manual_test_active": true ,
                "last_manual_test_time": "2015-10-31T23:59:59.000Z" ,
                "ui_color_state": "gray"
            }
        },
        "$company": {
```

-continued

```
        "$product_type": {
            "CPMEMSnC48JlSAHjQIp-aHI72IjLYHK_ul_c54UFb8CmPXNj4ixLbg":
{
                "identification": {
                    "device_id": "CPMEMSnC48JlSAHjQIp-
kHI72IjLYHK_ul_c54UFb8CmPXNj4ixLbg" ,
                    "serial_number": "1L090B50230"
                },
                "location": {
                    "structure_id":
"VqFabWH21nwVyd4RWgJgNb292wa7hG_dUwo2i2SG7j3-BOLY0BA4sw"
                },
                "software": {
                    "version": "1.0"
                },
                "resource_use": {
                    "electricity": {
                        "value": 42.789 ,
                        "measurement_reset_time": "2015-01-01T01:01:01.000Z" ,
                        "measurement_time": "2015-01-01T01:02:35.000Z"
                    },
                    "gas": {
                        "value": 0.345234545 ,
                        "measurement_reset_time": "2015-01-01T01:01:01.000Z" ,
                        "measurement_time":" 2015-01-01T01:02:35.000Z"
                    },
                    "water": {
                        "value": 10000.3 ,
                        "measurement_reset_time": "2015-01-01T01:01:01.000Z" ,
                        "measurement_time" : "2015-01-01T01:02:35.000Z"
                    }
                }
            }
        }
    },
    "structures": {
        "VqFabWH21nwVyd4RWgJgNb292wa7hG_dUwo2i2SG7j3-BOLY0BA4sw":
{
            "structure_id": "VqFabWH21nwVyd4RWgJgNb292wa7hG_dUwo2i2SG7j3-
BOLY0BA4sw" ,
            "thermostats": [ "peyiJNo0IldT2YlIVtYaGQ", ... ] ,
            "smoke_co_alarms": [ "RTMTKxsQTCxzVcsySOHPxKoF4OyCifrs", ... ] ,
            "devices": {
                "$company": {
                    "$product_type": [ "CPMEMSnC48JlSAHjQIp-
aHI72IjLYHK_ul_c54UFb8CmPXNj4ixLbg", ... ]
                }
            },
            "away": "home" ,
            "name": "Home" ,
            "country_code": "US" ,
            "postal_code": "94304" ,
            "peak_period_start_time": "2015-10-31T23:59:59.000Z" ,
            "peak_period_end_time": "2015-10-31T23:59:59.000Z" ,
            "time_zone": "America/Los_Angeles" ,
            "eta": {
                "trip_id": "myTripHome1024" ,
                "estimated_arrival_window_begin": "2015-10-31T22:42:59.000Z" ,
                "estimated_arrival_window_end": "2015-10-31T23:59:59.000Z"
            }
        }
    }
}
```

Data Model with Metadata, Devices, and Structures

As illustrated, metadata may be added to the data model. The metadata object includes additional information that is provided when making a call to the API (e.g., via REST and/or Firebase). The access_token element acts as an authorization element that is used to provide proof that a user has authorized the client 182 to make API calls on their behalf. The access_token element is also used to identify which user to which the data is associated with when receiving responses from a MUI call, as described above. The client version is an indication of the last user-authorized version of a client 182 and is associated with the access token.

Further, specific device types are modeled under the "devices" object. For example, in the current example, a thermostat 10A and detector 10B are modeled. It should be noted that other devices types may be modeled, such as cameras, security alarms, and the like. Additionally, a "company" object may be modeled under the "devices" object, as explained in detail below. Further, a structure is modeled. A structure represents a physical building. Structures 10D contain devices (e.g., 10A-10C and 10E) as well as information for the building as a whole. For example, in one embodiment, an estimated time of arrival to the structure 10D and/or an "away" mode indicating that no one is currently occupying the structure may be maintained at the data model. Each of the devices and/or structures has an associated unique identifier, which enables the API calls to be accurately routed to the proper device object.

In some embodiments, the data model may be hierarchically constructed in a manner where the structures are at a higher level and devices are at a sub-level of a corresponding structure that the devices are associated with. Users of the system 180 may each have their own structure and/or device objects in the data model, which may be identified by an associated user identifier. Below is an example of a data model structure, where structures and devices are associated with a user.

```
{
    "auth": {
        "505": {
            "myapp": "antoken" //antoken is a customized token
            payload
        }
    },
    "users": {
        "505": { //505 is a unique user identifier
            "structures": { //structures object
                "f3d0c560-03f2-11e1-98a4-1231381aa376": {
                    //structures unique identifier
                    "country_code": "US",
                    "name": "home",
                    "away": false,
                    "location": "Sunnyvale, CA",
                    "postal_code": "94087",
                    "away_setter": 1
                    "devices": { // device associated with the structure
                        "01AA01AB431100RF": { //device
                            unique identifier
                            "temperature_scale": "F",
                            "country_code": "US",
                            "current_temperature": 21.5,
                            "name": "Senior Zirconia",
                            "fan_mode": "auto",
                            "device_locale": "en_US",
                            "target_temperature_type": "heat",
                            "can_cool": false,
                            "postal_code": "94087",
                            "current_humidity": 52,
                            "can_heat": true,
                            "last_connection": 1355181256000,
                            "has_fan": false,
                            "target_temperature": 20,
                            "online": false
                        }
                    }
                }
            }
        }
    }
}
```

Example Data Model 1

As illustrated, in the above embodiment, structure f3d0c560-03f2-1e1-98a4-1231381aa376 is implemented as a sub-level of the user 505, indicating that the structure is associated with this user. Any number of structures may be implemented and/or associated with a particular user. Further, one structure may be associated with many users. Further, the device 01AA01AB431100RF is implemented as a sub-level of structure object f3d0c560-03f2-11e1-98a4-1231381aa376, indicating that this device is a device of that structure. Any number of devices may be implemented and/or associated with a particular structure.

In an alternative embodiment, a topology of associations between devices and structures may be provided in the data model, as illustrated in the following Example Data Model 2:

```
{
    "users": {
        "505": {
            "structures": {
                "s1": { },
                "s2": { }
            }
            "devices": {
                "d1": { }
                "d2": { }
            }
            "topology": {
                "structures": {
                    "s1": ["d1", "d2"],
                    "s2": ["d3"]
                },
                "properties": {
                },
                "wings": {
                },
                "floors": {
                }
            }
        }
    }
}
```

Example Data Model 2

In Example Data Model 2, two structures s1 and s2 are associated with user 505. Further, devices d1 and d2 are associated with the user 505. The topology section associates the devices d1 and d2 with the structure s1 and associates a third device d3 that is not associated with the user 505 to the structure s2.

Honing in on the device objects, the devices (e.g., 10A-10C and camera devices 10E) may share a common base set of information such as a user-supplied name, software version and online status. Additionally, the data model may include information specific to a particular device type. For example, smoke and/or CO detectors 10B may build upon the common base set of information, adding alarm states. Further, thermostats 10A may add upon the common base set of information to add data that may enable control of HVAC systems and data regarding an observed climate of thermostat 10A. Below is an example of thermostat 10A and detector 10B objects of the data model.

```
{
    "devices": {
        "thermostats": {
            "peyiJNo0IldT2YlIVtYaGQ": {
                "device_id": "peyiJNo0IldT2YlIVtYaGQ" ,
                "locale": "en-US" ,
                "software_version": "4.0" ,
                "structure_id":
```

-continued

```
"VqFabWH21nwVyd4RWgJgNb292wa7hG_dUwo2i2SG7j3-BOLY0BA4sw" ,
            "name": "Hallway (upstairs)" ,
            "name_long": "Hallway Thermostat (upstairs)" ,
            "last_connection": "2014-10-31T23:59:59.000Z" ,
            "is_online": true ,
            "can_cool": true ,
            "can_heat": true ,
            "is_using_emergency_heat": true ,
            "has_fan": true ,
            "fan_timer_active": true ,
            "fan_timer_timeout": "2014-10-31T23:59:59.000Z" ,
            "has_leaf": true ,
            "temperature_scale": "C" ,
            "target_temperature_f": 72 ,
            "target_temperature_c": 21.5 ,
            "target_temperature_high_f": 72 ,
            "target_temperature_high_c": 21.5 ,
            "target_temperature_low_f": 64 ,
            "target_temperature_low_c": 17.5 ,
            "away_temperature_high_f": 72 ,
            "away_temperature_high_c": 21.5 ,
            "away_temperature_low_f": 64 ,
            "away_temperature_low_c": 17.5 ,
            "hvac_mode": "heat" ,
            "ambient_temperature_f": 72 ,
            "ambient_temperature_c": 21.5 ,
            "humidity": 40
        }
    },
    "smoke_co_alarms": {
        "RTMTKxsQTCxzVcsySOHPxKoF4OyCifrs": {
            "device_id": "RTMTKxsQTCxzVcsySOHPxKoF4OyCifrs" ,
            "locale": "en-US" ,
            "software_version": "1.01" ,
            "structure_id":
"VqFabWH21nwVyd4RWgJgNb292wa7hG_dUwo2i2SG7j3-BOLY0BA4sw" ,
            "name": "Hallway (upstairs)" ,
            "name_long": "Hallway Protect (upstairs)" ,
            "last_connection" : "2014-10-31T23:59:59.000Z" ,
            "is_online": true ,
            "battery_health": "ok" ,
            "co_alarm_state": "ok" ,
            "smoke_alarm_state": "ok" ,
            "is_manual_test_active": true ,
            "last_manual_test_time": "2014-10-31T23:59:59.000Z" ,
            "ui_color_state": "gray"
        }
    }
            "$company": {
                "$product_type": {
                    "CPMEMSnC48JlSAHjQIp-aHI72IjLYHK_ul_c54UFb8CmPXNj4ixLbg":
{
                        "identification": {
                            "device_id": "CPMEMSnC48JlSAHjQIp-
kHI72IjLYHK_ul_c54UFb8CmPXNj4ixLbg" ,
                            "serial_number": "1L090B50230"
                        },
                        "location": {
                            "structure_id":
"VqFabWH21nwVyd4RWgJgNb292wa7hG_dUwo2i2SG7j3-BOLY0BA4sw"
                        },
                        "software": {
                            "version": "1.0"
                        },
                        "resource_use": {
                            "electricity": {
                                "value": 42.789,
                                "measurement_reset_time": "2015-01-01T01:01:01.000Z" ,
                                "measurement_time": "2015-01-01T01:02:35.000Z"
                            },
                            "gas": {
                                "value": 0.345234545 ,
                                "measurement_reset_time": "2015-01-01T01:01:01.000Z" ,
                                "measurement_time": "2015-01-01T01:02:35.000Z"
                            },
                            "water": {
                                "value": 10000.3 ,
                                "measurement_reset_time": "2015-01-01T01:01:01.000Z" ,
                                "measurement_time": "2015-01-01T01:02:35.000Z"
```

```
              }
            }
          }
        }
      }
    }
  }
}
```

Devices Data Model Objects

As illustrated, a device identifier (device_id:String) may be associated with the thermostat 10A, detector 10B, and/or camera device 10E. The device_id element holds the unique identifier of the particular device. Further, each device may include the following elements: a country and language preference (locale:String), a software version (software_version:String), an associated structure (structure_id:String), a name (name:String) (e.g., short name for use in user interface labels), a long name (name_long:String) (e.g., for a more descriptive name), a last connection timestamp (last_connection:String), and a device connection status (is_online: Boolean).

The thermostat may add additional elements. Some of the elements may allow for the use of varied temperature scales (e.g., Fahrenheit and/or Celsius). The thermostat-specific elements may include: an indication that the HVAC system has a cooling ability (can_cool:Boolean), an indication that the HVAC system has a heating ability (can_heat:Boolean), a heat pump system emergency heating status indicator (is_using_emergency_heat:Boolean), an indication of an ability to control the fan separately from heating or cooling (has_fan:Boolean), an indication if the fan timer is engaged, which may be used with a fan timer timeout to turn on the fan for a user-specified preset duration (fan_timer_active: Boolean), a timestamp showing when the fan timer reaches 0 (fan_timer_timeout:String), an indicator to display an energy-saving temperature indication (has_leaf:Boolean), a temperature scale to use (e.g., Celcius or Fahrenheit (temperature_scale:String), a desired target Fahrenheit temperature (target_temperature_f:int), a desired target Celsius temperature (target_temperature_c:float), a maximum target temperature in Fahrenheit (target_temperature_high_f:int), a maximum target temperature in Celsius (target_temperature_high_c:float), a minimum target temperature in Fahrenheit (target_temperature_low_f:int), a minimum target temperature in Celsius (target_temperature_low_c:float), a maximum away temperature in Fahrenheit (away_temperature_high_f:int), a maximum away temperature in Celsius (away_temperature_high_c:float), a minimum away temperature in Fahrenheit (away_temperature_low_f:int), a minimum away temperature in Celsius (away_temperature_low_c:float), an HVAC mode indicating heating, cooling, and/or heating-cooling modes (hvac_mode:String), an ambient temperature measured at the thermostat 10A in whole degrees Fahrenheit (ambient_temperature_f:float), an ambient temperature measured at the thermostat 10A in half degrees Celsius (away_temperature_low_c:float).

The detectors 10B may include additional elements as well. These additional elements may include: an indication of battery life/health and/or an estimate of time to end of life of the detector 10B (battery_health:enum string), a carbon monoxide detection alarm state (co_alarm_state:enum string), a smoke detection alarm state (smoke_alarm_state: enum string), an indication of whether or not the manual smoke and carbon monoxide alarm test is active (is_manual_test_active:Boolean), a timestamp indicating the time of the last successful manual test (last_manual_test_time: string), and/or an indicator of a color representative of device status (e.g., gray for offline, green for OK, yellow for warning, and/or red for emergency) (ui_color_state:enum string). The indicator of the color representative of device status may be derived from: is_online, battery_health, co_alarm_state, and/or smoke_alarm_state.

The company ($company:string) may represent a variable provided when a client is created and provided the "product data read/write" scope. The company variable may identify the company (e.g., client) as an entity that can share product data with the API 90 and/or device service 84. As illustrated, the company variable may include an element for a product type variable ($product_type:string) that is provided when a client is created with the product data read/write" scope. The product type variable may define the type of product, device, or appliance manufactured by the company.

The product type variable may be an object or an array, depending on the storage location. The product type variable may include a product unique identifier. For each product unique identifier, there may be several additional elements. For example, each product unique identifier may include an element for: identification, location, software, and resource use (resource_use). The identification (identification) element may contain product identifiers. For example, the identification element may contain: a device identifier (device_id:string), which is a unique device identifier for the product; and a serial number (serial_number:string), which is a serial number of the product or device. The location element may include a unique identifier for the structure (structure_id:string). The software element may include the software version identifier for the product (version:string). The resource use element may include elements for electricity, gas, and/or water. The electricity, gas, and/or water elements may include resource use data values and measurement timestamps. For example, the environment and gas elements may include a number of joules (value:number) consumed in a time period, a timestamp that identifies the start of the measurement time period (measurement_reset_time:string), a timestamp that identifies the measurement time (the time when the resource use data was measured) (measurement_time:string). The water element may include a number of liters consumed in the time period, a timestamp that identifies the start of the measurement time period (measurement_reset_time:string), a timestamp that identifies the measurement time (the time when the resource use data was measured) (measurement_time:string). It should be noted that, the devices object may be scalable to include one or more company objects and each of the one or more company objects may be scalable to include one or more product (e.g., device) type objects.

Additionally, as mentioned above, structures may be represented as an object of the data model. Below is an example of a shared structure object and its associated data that may be read and/or written to.

```
{
    "structures": {
        "VqFabWH21nwVyd4RWgJgNb292wa7hG_dUwo2i2SG7j3-BOLY0BA4sw":
{
            "structure_id":
"VqFabWH21nwVyd4RWgJgNb292wa7hG_dUwo2i2SG7j3-BOLY0BA4sw" ,
            "thermostats": [ "peyiJNo0IldT2YlIVtYaGQ", ... ] ,
            "smoke_co_alarms": [ "RTMTKxsQTCxzVcsySOHPxKoF4OyCifrs", ... ] ,
            "away": "home" ,
            "name": "Home" ,
            "country_code": "US" ,
            "postal_code": "94304" ,
            "peak_period_start_time": "2014-10-31T23:59:59.000Z" ,
            "peak_period_end_time": "2014-10-31T23:59:59.000Z" ,
            "time_zone": "America/Los_Angeles" ,
            "eta": {
                "trip_id": "myTripHome1024" ,
                "estimated_arrival_window_begin": "2014-10-31T22:42:59.000Z" ,
                "estimated_arrival_window_end": "2014-10-31T23:59:59.000Z"
            }
        }
    }
}
```

Structures Data Model Object

The structures object may include: a unique identifier: (structure_id:string), one or more lists of devices associated with the structure (e.g., an array of thermostats 10A (thermostats:array), an array of detectors 10B (smoke_co_alarms:array), and/or an array of cameras 10E that contain the unique identifiers of the thermostats 10A, the detectors 10B, and/or the camera devices 10E, respectively). Further, the structure may include one or more indications of characteristics and/or statuses of the structure. For example, the structure object may include: an indication of the structure state (e.g., "away" state when no occupants are in the structure) (away:string), a name associated with the structure (name:string), a country code associated with the structure (country_code:string), a postal code associated with the structure (postal_code:string), a start time for an energy event (e.g. Rush Hour Rewards by Nest*) (peak_period_start_time:string), an end time for an energy event (e.g., Rush Hour Rewards by Nest®) (peak_period_end_time:string), a time zone associated with the structure (time_zone:string), estimated time of arrival to the structure (eta object that includes: a unique identifier for the estimated time of arrival instance (trip_id:string), a beginning time for an estimated arrival window (estimated_arrival_window_begin:string), and/or an ending time for an estimated arrival window (estimated_arrival_window_end:string). In instances where there is a particular estimated time of arrival rather than a window of arrival time, the beginning and end times may be set equal to the particular estimated time of arrival.

In the API 90, the concept of "Home" or "Away" is a powerful aspect that may affect the behaviors of certain smart device (e.g., thermostat 10A, detector 10B, device 10C, and/or camera device 10E) features. For example, many energy savings and/or convenience features may be implemented using the "Home" or "Away" concept. For example, when integrated with other devices in the structure via the API 90, clients 182 can further manage user comfort and safety. For example, clients can: turn off the lights when the home goes into Away, send a notification if the house is Away and the garage door is open, play music when the house switches to Home, etc. The indication of structure state (e.g., "away" mode) may include an indication for "home" when someone is occupying the structure, "away" when a user has explicitly set the structure to away, and/or "auto-away" when it has algorithmically been determined that no one is in the structure.

Users have the ability to manually activate Home/Away via smart device controls, web applications, etc., while the API 90 offers an additional access point via the clients 182. The API 90 provides the ability to directly set Home and Away, as well as listen for changes to these states. Further, a variety of signals within the structure may be used to detect human presence in a Home, and can set a sub-state of Away, called Auto-Away. If the device service 84 and/or the smart devices detect no presence for an extended period of time, they may automatically set the home to Auto-Away. Upon detection of human presence, the state of the structure may return to the Home state.

As mentioned above, depending on their access rights, clients 182 can read and/or write to the sections of the data model. Accordingly, subscribing to changes to the data model enables clients 182 to react in real time to changes made to the system 180. Thus, using the API 90, clients 182 may access smart device services 84 to control and/or provide data to one or more smart devices. For example, when a structure and/or thermostat is set to "away" mode, this status may be provided through the API 90 to the clients 182, which may then turn off one or more devices (e.g., smart lighting systems, etc.).

In some embodiments, the device service 84 responds with a data object including data objects from the data model (e.g., a metadata data object, a devices data object, a structures data object) based on the request and scopes associated with the access token. Further, in some embodiments the clients 182 may perform a function in addition to displaying the returned data in a page, such as controlling a setting on the API client device based on the data, executing a control action on the API client device based on the data, and the like.

Third-Party Data Provisioning and Access

As previously discussed, vendors that do not have direct access to the device services 84 may wish to provide data to the device services 84 for many reasons. For example, vendor data may be useful for reporting by the device services 84 and/or may be used in conditional triggers to control one or more smart devices (e.g., thermostat 10A, detector 10B, device 10C, and/or camera device 10E) and/or structures 10D that are under the influence of the device service 84. Further, this data may be accessible by other vendors, who may base control of these or other smart devices based in part upon the provided vendor data.

Further, the device service 84 provider may desire to expand a sensor network within the structure 10D and/or improve device (e.g., 10A-10C) and/or structure 10D reporting and/or control algorithms. Thus, it may be beneficial to take in such data from third-parties (e.g., those who do not have direct access to the device services 84). Accordingly, the API 90 may include support for data provision from these third-parties.

Specifically, the APIs 90 may support the reception of data streams of "events" and/or "time variant data." In one embodiment, the event data may be provided as a named value with a name, timestamp and other data that may be extensible. Event data may be provided upon occurrence of a particular event. For example, event data representative of motion detection may occur when one or more third-party sensors detect motion in the structure 10D.

Time variant data provision may relate to providing an account of data over varying time periods. For example, this data may provide a historical account of particular data values of a third-party sensor. Further details and examples of time variant profiles are described in U.S. Ser. No. 62/061,593, filed Oct. 8, 2014, entitled "Fabric Network," which is incorporated by reference herein in its entirety for all purposes. In some embodiments this may be supplemented with the current data values. For example, re-using the motion detection example discussed above, the time variant data provision may provide a historical account of motion detected by the third party sensor (e.g., motion detected at 5:00, no motion detected at 6:00, etc.).

Figure 19:
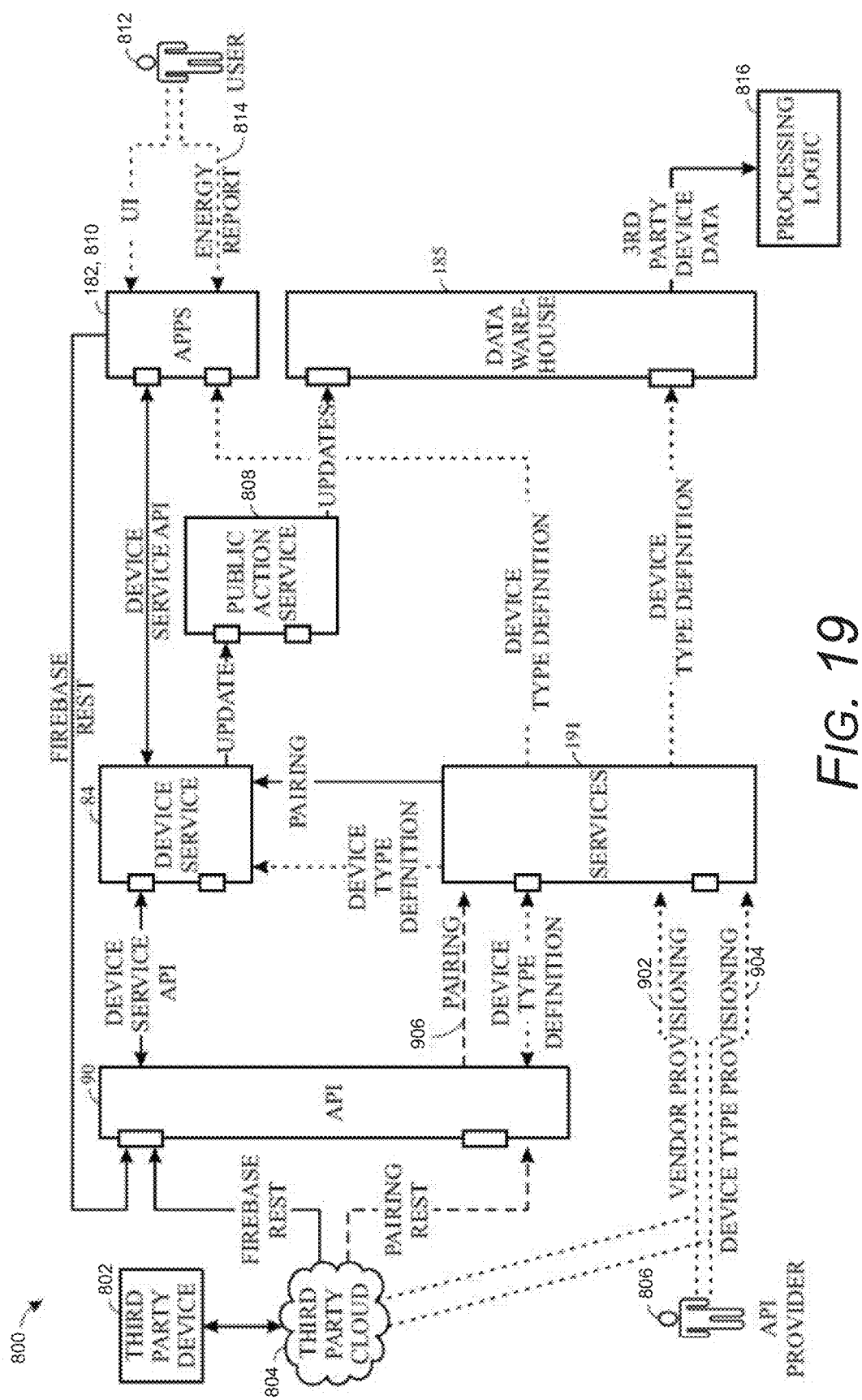
FIG. 19 is a schematic diagram, illustrating a system third-party vendor and device provisioning that enables consumption of third-party device data via the API, in accordance with embodiments.
Figure 20:
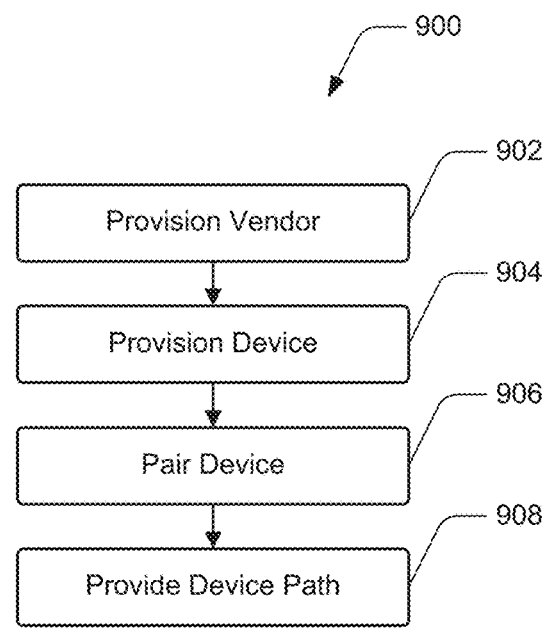
FIG. 20 is a flowchart illustrating a process for provisioning third-party vendors and third-party devices, such that third-party device data may be consumed via the API, in accordance with embodiments.
Figure 21:
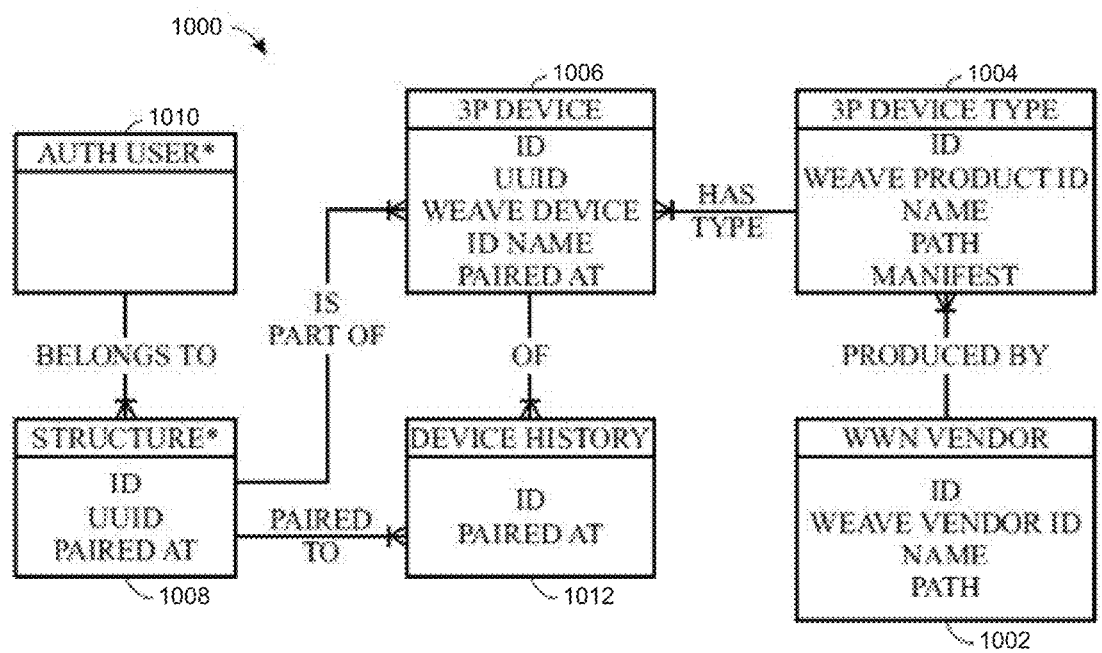
FIG. 21 is a relational diagram, illustrating a relationship of entities stored in the system when provisioning third-parties/third-party devices in the system, in accordance with embodiments.

FIG. 19 is a schematic diagram, illustrating a third-party vendor and device provisioning system 800 that enables consumption of third-party device data via the API 90, in accordance with an embodiment. FIG. 20 is a flowchart, illustrating a process 900 for provisioning third-party vendors and third-party devices, such that third-party device data may be consumed via the API 90. FIG. 21 is a relational diagram, illustrating a relationship of entities stored in the system 800 when provisioning third-parties/third-party devices 802 in the system 800. For clarity, these FIGS. 19-21 will be discussed together.

To consume data from a third-party and/or third-party device 802 (e.g., via data sent through a third-party cloud 804 to the API 90), the system 800 may be provided awareness information regarding the third-party (e.g., the "vendor") and/or the third-party devices. This information may be stored in the system 800, in a manner that enables the system 800 to identify and/or classify third-party data that is received. This awareness data (e.g., provisioning data) may be provided, for example, from the third-party and/or third-party device 904 and/or the API 90 provider 806. This provisioning data may be provided to the Services 191, which may include one or more provisioning modules (e.g., portions of machine-readable instructions, implemented on a processor) for provisioning a vendor (block 902) and/or for provisioning a device (block 904). In embodiments, the camera system API 330 that is shown and described with reference to FIG. 3 is an example implementation of the API 90 in the system 800 associated with the camera services 191 described with reference to figures above. Further, the third-party device 802 is representative of the client device 314 that executes the third-party application 320 as shown and described with reference to FIG. 3.

Vendor Provisioning

Vendors that wish to provide and/or retrieve data to and/or from the system 800 may be provisioned for such data provision and/or retrieval. By utilizing vendor provisioning, administrators of the system 800 may control particular vendors that may interact with the system 800. For example, a vendor may provide a request for interactivity rights with the system 800, which may be sent to the administrators of the system 800). Once the administrators verify that the vendor is legitimate and/or meets interactivity rights eligibility, the administrator may enable the vendor to provide vendor-specific information that may be used to facilitate interactivity with the system 800.

Vendor provisioning (block 902) may begin by submitting, via a provisioning process initiated by the third-party and/or third-party device 802 (e.g., via the third-party cloud 804) and/or by the API provider 806. In the provisioning process, the third-party and/or third-party device 802 and/or by the API provider 806 may provide (e.g., via a web service call) information to populate vendor-specific information (e.g., the vendor entity 1002 of FIG. 21, which will be discussed in more detail below) to the services 191. The services 191 may maintain this vendor-specific information, which may be used to tie particular devices with the newly provisioned vendor. Thus, if a request for device provisioning (block 904, which will be described in more detail below) for "Device A" is provided by "Company B," portions of the vendor-specific device information for "Company B" may be tied to device type-specific information for "Device A." For example, as illustrated in FIG. 21, the Device Type Entity 1004 has a "Produced By" relationship with the Vendor Entity 1002.

Device Provisioning

To consume data from third-parties and/or third-party devices 802. The system 800 may be provided particular information regarding the devices 802. Specifically, a device manifest (e.g., the device manifest section illustrated in the Device Type Entity 1004 of FIG. 21) is used to maintain compatibility information regarding the third-party devices 802. Information for the manifest may be provided via the third-party and/or third-party device 802, a third-party cloud 804, and/or the API provider 806 to the services 191. The services 191 may consume this information and create a device type definition for the device 802 being provisioned.

First, build-time profiles for expected third-party device types are defined. These build-time profiles provide a description of particular device capabilities and/or metadata regarding data provided by these devices. For example, profiles may provide data type information, data units, data constraints, etc. These profiles may closely resemble Weave profiles, which are described in more detail in U.S. patent application Ser. No. 13/926,335, filed Jun. 25, 2013, entitled "Efficient Communication for Devices of a Home Network", which is incorporated by reference in its entirety for all purposes. Weave is an application-layer protocol for communicating data. The profiles are defined as protobuf messages using field metadata annotations to describe manifest sections corresponding to a given profile and how the fragment of the data model JSON corresponding to a profile is validated.

Below is a code snippet example of the profile defining protobuf definitions, in accordance with an embodiment.

```
Device definition
// Device message is a union of all supported profiles.
// Device manifest is an instance of this type.
message Device {
    // Required profiles.
    optional IdentificationProfile identification = 1 [ (field_metadata) = {
        api_required: TRUE
        manifest_required: true
    }];
    optional LocationProfile location = 2 [ (field_metadata) = {
        api_required: TRUE
        manifest_required: true
    }];
    optional SoftwareProfile software = 3 [ (field_metadata) = {
        api_required: TRUE
        manifest_required: true
    }];
    // Optional profiles.
    optional ResourceUseProfile resource_use = 256 [ (field_metadata) = {
      api_required: MANIFEST
    }];
}
Primary profiles definition
message IdentificationProfile {
    // some metadata (not provided) may annotate fields generated by public API
    optional string device_id = 1 [ (field_metadata) = {
    }];
    optional uint64 node_identifier = 2 [ (field_metadata) = {
        weave_tag_kind: CORE
        weave_tag_number: 0x0001
        api_writable: TRUE
    }];
    optional string serial_number = 3 [ (field_metadata) = {
        weave_tag_kind: CORE
        weave_tag_number: 0x0007
        api_required: TRUE
    }];
    optional uint32 vendor_id = 4 [ (field_metadata) = {
        weave_tag_kind: CORE
        weave_tag_number: 0x0002
        manifest_required: true
    }];
    optional string vendor_description = 5 [ (field_metadata) = {
        weave_tag_kind: CORE
        weave_tag_number: 0x0003
        manifest_writable: true
    }];
    optional uint32 product_id = 6 [ (field_metadata) = {
        weave_tag_kind: CORE
        weave_tag_number: 0x0004
        manifest_required: true
    }];
    optional string product_description = 7 [ (field_metadata) = {
        weave_tag_kind: CORE
        weave_tag_number: 0x0005
        manifest_writable: true
    }];
        optional string revision = 8 [ (field_metadata) = {
        weave_tag_kind: CORE
        weave_tag_number: 0x0006
        manifest_writable: true
    }];
}
message LocationProfile {
    optional string structure_id = 1 [ (field_metadata) = {
        weave_tag_kind: CORE
        weave_tag_number: 0x000A
        api_required: TRUE
        validation: {
            orderly: {
                prefix: "string"
                suffix: "/[af09]{8}[af09]{4}[af09]{4}[af09]{4}[af09]{12}/"
            }
        }
    }];
}
message SoftwareProfile {
    optional string version = 1 [ (field_metadata) = {
```

```
            weave_tag_kind: CORE
            weave_tag_number: 0x000B
            api_required: TRUE
        }];
        optional int64 update_time = 2 [ (field_metadata) = {
            weave_tag_kind: CORE
            weave_tag_number: 0x000C
            api_writable: TRUE
        }];
        optional string description = 3 [ (field_metadata) = {
            weave_tag_kind: CORE
            weave_tag_number: 0x000D
            api_writable: TRUE
        }];
    }
    Resource use profile definition
    message ResourceUseProfile {
        message ResourceUse {
            enum MeasureType {
                // removed for brevity
            }
            message Units {
                message Unit {
                    enum BaseUnit {
                        // removed for brevity
                    }
                    optional BaseUnit base = 1 [ (field_metadata) = {
                        weave_type: UINT_1
                        weave_tag_number: 0x16
                    }];
                    // Exponent applied to the base unit.
                    // For example hertz would have an exponent value of -1.
                    optional int32 exponent = 2 [ (field_metadata) = {
                        weave_type: SINT_1
                        weave_tag_number: 0x17
                    }];
                }
                repeated Unit units = 1 [ (field_metadata) = {
                    weave_tag_number: 0x15
                }];
                // SI prefix indicated decadic multiple or fraction of the unit
                // For example millimeters would have an exponent value of 3.
                optional int32 prefix_exponent = 2 [ (field_metadata) = {
                    weave_type: SINT_1
                    weave_tag_number: 0x17
                }];
                optional string description = 3 [ (field_metadata) = {
                    weave_tag_number: 0x09
                }];
            }
            // Measure type
            required MeasureType measure_type = 1 [ (field_metadata) = {
                weave_type: UINT_2
                weave_tag_number: 0x06
            }];
            // Measure units
            optional Units units = 2 [ (field_metadata) = {
                weave_tag_number: 0x13
            }];
            // Resource description
            optional string description = 3 [ (field_metadata) = {
                weave_tag_number: 0x09
            }];
            // Data source, this field is intentionally left as a free form
            optional string source = 4;
            // Measured value
            optional double value = 5 [ (field_metadata) = {
                weave_tag_number: 0x1E
                api_required: true
            }];
            // When was the last reset of the measured value, seconds since UNIX Epoch
            optional uint64 measurement_reset_time = 6 [ (field_metadata) = {
                weave_tag_number: 0x1F
                api_required: true
            }];
            // Measurement time, seconds since UNIX epoch
            optional uint64 measurement_time = 7 [ (field_metadata) = {
                api_required: true
            }];
```

```
    };
    optional ResourceUse electricity = 1 [ (field_metadata) = {
        api_required: MANIFEST
    }];
    optional ResourceUse gas = 2 [ (field_metadata) = {
        api_required: MANIFEST
    }];
    optional ResourceUse water = 3 [ (field_metadata) = {
        api_required: MANIFEST
    }];
}
Metadata
// Field metadata
message FieldMetadata {
    // Weave types
    enum WeaveType {
        // (portions removed for brevity)
    }
    // Weave tags
    enum WeaveTagKind {
        ANONYMOUS = 0 [ (weave_tag_metadata) = {
            tag_control: 0x0
        }];
        CONTEXT = 1 [ (weave_tag_metadata) = {
            tag_control: 0x1
        }];
        CORE = 2 [ (weave_tag_metadata) = {
            tag_control: 0x2
            tag_control: 0x3
        }];
        FULLY_QUALIFIED = 4 [ (weave_tag_metadata) = {
            tag_control: 0x6
            tag_control: 0x7
        }];
    }
    enum ApiSemantics {
        // Field is not writable
        FALSE = 1;
        // Field is writable if present in manifest
        MANIFEST = 2;
        //Field is writable
        TRUE = 3;
    }
    // Weave type; defaults to a type derived from proto field type
    // double => FLOAT_8
    // float => FLOAT_4
    // int32, sint32, sfixed32 => SINT_ 4
    // int64, sint64, sfixed64 => SINT_8
    // uint32, fixed32 => UINT_4
    // uint64, fixed64 => UNIT_8
    // bool => BOOLEAN
    // string => STRING
    // bytes => BYTES
    // Enum type => may be accompanied by weave_type and/or explicit validation
    // Message type => STRUCTURE
    optional WeaveType weave_type = 1;
    // Weave tag kind
    optional WeaveTagKind weave_tag_kind = 2 [ default = CONTEXT ];
    // Weave Profile Id, used to annotate top level device fields as profiles
    // and with fully qualified tags
    optional uint64 weave_profile_id = 3;
    // Weave tag number
    optional uint32 weave_tag_number = 4;
    // Validation applied to the field both at manifest creation time and
    // update validation time
    optional Validation validation = 5;
    // Allow updating field in the payload, api required fields are api writable
    optional ApiSemantics api_writable = 6;
    // Require updating field in the payload
    optional ApiSemantics api_required = 7;
    // Allow setting field in the manifest
    optional bool manifest_writable = 8 [ default = true ];
    // Require setting field in the manifest
    optional bool manifest_required = 9;
}
Validation
// Describes how a field is validated, the only supported validation
message Validation {
    // Describes Orderly validation statement
```

```
// See http://orderlyjson.org/docs for Orderly details
message OrderlyValidation {
    // Anything that goes before the field name in Orderly, aka definition
    // prefix; includes type and range
    optional string prefix = 1;
    // Anything that goes after the field name in Orderly, aka definition
    // suffix; includes enum values
    optional string suffix = 2;
  }
  optional OrderlyValidation orderly = 1;
}
```

Once the profiles are defined, these profiles may be imported and used in subsequent device type manifests, which may be used to describe and/or translate received third-party device 802 data. In embodiments where a profile is compatible with Weave (or other application-layer protocol), an indicator of this compatibility may be provided in the profile (e.g., by providing the compatible Weave (or other application-layer protocol) profile identifier in the profile). Upon release of the profiles, new device type manifests may be created using the released profiles. The device type manifests are runtime artifacts represented by a serialized protocol message and provide device type definitions for the particular third-party device 802 being provisioned.

Below is an example of a third-party device manifest. In particular, the example third-party device manifest is for an Acme brand washer with revision 201410161.0b that provides energy and water resource usage in the supplied units. The device manifest enables the system 800 to understand data that is provided to it via this type of third-party device 802.

```
                identification: <
                    vendor_description: "Acme",
                    product_description: "WSHR1138",
                    revision: "201410161.0b",
                >,
                resource_use: <
                    electricty: <
                        measure_type: ENERGY
                        units: <
                        units: <
                            base: KILOGRAM
                        >
                        units: <
                            base: METER
                            exponent: 2
                        >
                        units: <
                            base: SECOND
                            exponent: 2
                        >
                    >
                    description: "Energy consumption in joules"
                    source: "power sensor"
                >
                water: <
                    measure_type: VOLUME
                    units: <
                        units: <
                            base: METER
                            exponent: 3
                        >
                        exponent: 3
                    >
                    description: "Water consumption in liters"
```

```
                    source: "Flowmeter"
                >
            >
```

These device type definitions may be provided to the device service 84, the applications 182 and/or 810, and/or the data warehouse 185, where they may be used to interpret and/or translate data received from the third-party devices 802, as will be discussed in more detail below.

Device Pairing

Once the device type is defined, a device 802 of that type may be paired (block 906). Pairing of third-party devices 802 is essentially registering the device 802 with the system 800, which may aid in the system 800's understanding of data provided by the device 802.

The pairing process includes two basic steps. In one step, the pairing process collects information about the device 802, such as a location (e.g., structure) of the device, a serial number (or other unique identifier) of the device 802, etc. This information may be provided by a user attempting to pair the device 802 (e.g., via a graphical user interface prompt requesting the device-specific information). For example, a pairing request (e.g., a REST message) may be provided to the API 90 from the third-party and/or third-party device 802 and/or the third-party cloud 804. This pairing request may include the device-specific information. The API 90 may transform payload data provided in the pairing request into a format interpretable by the services 191 and may provide the transformed data to the services 191. For example, the API 90 may receive the request in an ISO 8601 format and translate data from the request into an alternative format expected by the services 191.

In a second step, the pairing process determines the device type of the device 802 and ties the device type to the device-specific payload data of the third-party device 802. To do this, the services 191 may retrieve an associated provisioned device type and form a relationship between the device-specific payload data and the associated device type. For example, as illustrated in FIG. 18, during the pairing process, the Device Type entity 1004 may be tied to the Device entity 1006 (e.g., a "Has Type" relationship). Further, the Device entity 1006 may be tied to a particular structure (e.g., an "Is Part Of" relationship). Additionally, historical device pairing information may be stored (e.g., by the Device History entity 1012).

Upon registration with the system 800, paired devices are then provided for subsequent distribution by the publication service 808 (e.g., via an update message), which may lead to publication to the data warehouse 185 (e.g., via a second update message).

Providing Device Data

Once the vendor is provisioned (block 902), the device is provisioned (block 904), and the device is paired (block 906), the system 800 is able to receive and interpret third-party and/or third party device 802 data. The third-party and/or third party device 802 and/or the third-party cloud 804 may provide data via a data provision message (e.g., a Firebase and/or REST message) to the API 90.

Upon receiving third-party data, the API 90 may translate the payload into a format interpretable by the device service 84. Upon receiving the translated payload, the device service 84 may retrieve the device type definition for the particular device 802. For example, when the device service 84 starts, it may load all available device type definitions from the services 191. If the device 802 is of a known device type (e.g., has an associated device type definition loaded in the device service 84), the associated device type definition may be used to subsequently translate and/or describe incoming data from the device 802 and/or cloud 804. Occasionally, the device 802 may be of an unknown device type (e.g., has no associated device type definition loaded in the device service 84). For example, a device type may be provisioned after the device service loads all available device type definitions. When the device type is unknown (e.g., has no associated device type definition loaded in the device service 84), the device service 84 may provide a request to the services 191 for a new device type definition associated with the device 802. Upon receiving this new device type definition from the services 191, the new device type definition may be used to translate and/or describe incoming data from the device 802 and/or cloud 804. This device type definition acquisition may occur during pairing of the third-party device 802 and/or as data is received from the third-party device 802 and/or cloud 804.

For example, the associated device type definition may be used to describe incoming data from the third-party device 802 and/or third-party cloud 804. The device service 84 may propagate third-party payload data to the applications 182 and/or 810 and/or the publication service 808 (e.g., via a data update message), which may result in the payload data being stored in the data warehouse 185 (e.g., via a second update message). The device type definitions may be provided not only to the device service 84, but also the applications 182 and/or 810, and/or the data warehouse 185, which may enable the payload to be interpreted by each of these entities. For example, accumulated third-party payload data that is stored in the data warehouse 185 may be interpreted using the device type definition, such that an energy report 814 may be provided to the user 812. Further, any other processing logic 816 may use the device type definition to understand the third-party payload data.

Below is an example of a sample third-party device data that conforms to the device manifest example that is provided above. Specifically, the third-party device data represents washer data that provides energy and water usage. As illustrated below, the payload provides time-variant data related to a particular instance (or instances of use) for the washer with serial number 123456789.

```
{
    "identification": {
        "serial_number": "123456789"
    },
    "resource_use": {
        "energy": {
            "value": 50.2,
```

-continued

```
            "measurement_reset_time": 946684800,
            "measurement_time": 1414794859
        },
        "water": {
            "value": 123.7,
            "measurement_reset_time": 946684800,
            "measurement_time": 1414794859
        }
    }
}
```

Data Entities

Moving now to a more-detailed discussion of data entities useful for third-party data submission, FIG. 21 is a relationship diagram 1000, illustrating the relationship between third-party vendor and/or device entities stored in the system 800 to enable third-party data consumption and/or provision. Specifically, the vendor entity 1002 represents a third-party entity that sends third-party device data. In some embodiments, access scopes may be based upon a vendor identity. For example, a vendor scope may correspond to an ability to read and write data under a vendor path in the data model. Multiple clients 184 may be associated with one vendor (e.g., third-party 802). The clients 184 may be associated with a vendor entity 1002. Accordingly, exchanging an access token granted to a client 184 associated to a vender entity 1002 (e.g., either directly or via a developer) may return permissions corresponding to that vendor entity 1002. The vendor entity 1002 may include a vendor path attribute, which may be unique across all vendor entities 1002.

The 3P (third-party) Device type entity 1004 represents a class of devices belonging to a single vendor that have the same information payload. Device types are immutable. Accordingly, once the device type metadata is obtained, it can be cached indefinitely. Device types can be versioned. For example, differing data pathways may be provided for device types with different version. Thus, in one embodiment, versioning may be handled, for example, by appending a version to common prefix, for example washer_v1 may relate to a first version of a dishwasher device type and washer_v2 may relate to a second version the dishwasher device type.

Using the vendor entity 1002 and the 3P device type entity 1004, third party devices may be provisioned (block 904). The 3P device type entity 1004 includes a vendor identity attribute that identifies the vendor that the 3P device type entity 1004 belongs to. The 3P device type entity 1004 includes a path attribute that may be used to access devices of a particular device type. The path attribute may be unique across all device types for a particular vendor entity 1002. Accordingly, device types may be retrieved using a combination of the vendor 1002 path with the 3P device type 1004 path.

Further, the device type entity 1004 contains a serialized device manifest field that describes device metadata and payload for the particular device type represented by the 3P device type entity 1004. The 3P (third-party) device entities 1006 are created upon a first pairing of the device 802 (block 906) with the API 90 and/or device service 84. The device entity 1006 represents an identifiable entity (e.g., a device) that produces data conforming to a given device type. For example, the device entity 1006 might represent a particular dishwasher that conforms to the washer_v2 device type.

As discussed above, devices are associated with particular structure entities 1008. The device entity 1006 is paired with the structure entities 1008, which is associated with a user entity 1010. Further, a device history entity 1012 (e.g., a data table) stores a history of pairings between the device entity 1006 and the structure entity 1008. Pairing of the third-party) device 802 may be triggered by providing a POST request to the API 90 at the path /devices/<vendor_path>/<device_type_path> with a post body containing the third-party device payload. Below is an example of such a post body.

```
{
"identification": {
"serial_number": "abcdefgh",
...
},
"location": {
"structure_id":
"VqFabWH21nwVyd4RWgJgNb292wa7hG_dUwo2i2SG7j3BOLY0BA4sw",
...
},
... // other profiles
}
```

POST Request Body for Device Pairing

As illustrated, the payload provided in the post body may include device-identifying information, such as a serial number (e.g., identification/serial_number) and/or a structure identifier (e.g., location/structure_id) of the structure associated with the device. The device-identifying information may be used to uniquely identify a device of a particular type for a particular vendor, while the structure identifier may indicate which structure the device should be paired to. In some embodiments, these fields may be required in order to successfully pair with the API 90 and/or device service 84.

In the device services 84, each of the paired third-party devices 802 may be stored in a "Third-Party Device" portion of the data model (e.g., a specially designated portion of the data model for third-party devices 802). These devices 802 may be provisioned at runtime, thus enabling introduction of new third-party device pairings without requiring new service stack releases. When pairing completes successfully, the services 191 may provide a newly-assigned internal identifier for this third-party device 802. The device service 84 may then insert this internal identifier into the original payload (e.g., the POST request body) and return the result. Below is an example of the payload with added internal identifier.

Returned Payload after Pairing

Accordingly, the system 800 may now use and/or store device information from the third-party devices 802. Thus, device data may then be provided to the device services (block 908) from these devices 802. Further, upon proper validation of a third-party and/or third-party device 802, a third-party application 182 and/or an application 810 of the API provider 806 may be used to provide this data to a user 812.

When devices 802 are no longer in use (or data is no longer provided to the system 800), they may be unpaired from the system 800). To do this, a DELETE request to the API 90 at the path /devices/<vendor>/<device_type>/<device_id>. In some embodiments, the internal device identifier is obfuscated during the pairing process. In such embodiments, the path point <device_id> may refer to the obfuscated device identifier. Based upon this DELETE request, the API 90 may request the services 191 to delete the identified device 802. When the services 191 complete the unpairing successfully, the services 191 return a success indication to the API 90, which returns a similar indication.

The discussion now turns to a more detailed look at how the system 800 consumes and/or presents third-party data. As mentioned above, access permissions to read and/or write to the data model may be defined using a path leading to devices and/or structures. To enable definition of permissions for specific vendors, the path may include an intermediate reference to the particular vendor. For example, the devices attribute may include a sub-attribute named "vendor" or "vendor_path" followed by the third-party vendor devices. Accordingly, the path to the third-party vendor devices may include a vendor field, allowing particular permissions to be provided for a particular third-party vendor.

The API 90 may receive a request to read and/or write data to the data model of the device service 84 and may then request authentication rights (e.g. from the services 191). Upon verifying the authentication rights, the API 90 may provide the vendor, device type, and/or device identifier path elements to construct a corresponding device service 84 read and/or write request that it provides to the device service 84.

```
{
"identification": {
"device_id": "peyiJNo0IldT2YlIVtYaGQ",
"serial_number": "abcdefgh",
...
},
"location": {
"structure_id":
"VqFabWH21nwVyd4RWgJgNb292wa7hG_dUwo2i2SG7j3BOLY0BA4sw",
...
},
... // other profiles
}
```

The device service 84 may validate the received request. Upon validation, the request may be processed, resulting in the read and/or write to the data model.

Third-Party Insight Data Provision and Access

In some embodiments, a third-party vendor may desire to provide additional data to the system 800. For example, the vendor may wish to provide a stream of data relating to particular logs and/or metrics. To do this, the third-party may provide a stream descriptor, which describes the particular data that will be provided to the system 800. Then, the vendor may provide data in a format corresponding to the stream descriptor, noting the association with the stream descriptor.

Discussing first the stream descriptors, the stream descriptors provide a description of any stream data that a third-party wishes to post. Below is an example of stream descriptor for amp and watt measurements that may be provided via a subsequent data stream.

```
{
"metric_stream_descriptor": {
    "version": 1 // version number
    "description": "energy measurements", // a human readable
    description of the stream
    "fields": [ // a list of fields in a stream
        {
        "description": "current", // a human readable description of the
        field
        "relative": true, // whether measurements are absolute or relative
        to the preceding sample
        "exponent": 1, // scaling (in base 10) for the measurement
        "logical_minimum": 0, // expected minimum for any sample.
        Need details on diff between this and physical
        "logical_maximum": 100, // expected maximum for any sample.
        "physical_minimum": 0,
        "physical_maximum": 1000,
        "units": { // an object describing the units for samples in this
        field
            "system": "si", // this or english
            "description": "Amps", // human readable description
            "unit_composition": [
            {"quantity": "current", "exponent": 1
            }
            ]
        }
        },
        {
        "description": "Watts",
        "relative": true,
        "exponent": 1,
        "logical_minum": 0,
        "logical_maximum": 100,
        "physical_minimum": 0,
        "physical_maximum": 1000,
        "units": {
            "system": "si",
            "description": "watts",
            "unit_composition": [ // a more complicated example
            representing kg * m^2/s^3
                {"quantity": "mass",
                "exponent": 1
                },
                {"quantity": "length",
                "exponent": 2
                },
                {"quantity": "time",
                "exponent": -3
                }
            ]
        }
        }
    ]
}
}
```

Metric Stream Descriptor

Additionally, state information regarding a device may be described and provided by a third-party vendor. Below is a state-based stream descriptor.

```
{
"state_stream_descriptor": {
    "version": 1 // currently this should always be 1
    "description": "smoke detector states", // a human readable
    description of the stream
    "fields": [ // a list of fields in a stream
        {
        "description": "smoke", // a human readable
        description of the field
        "states": [
            {
            "name": "all clear",
            "description": "state when acceptable levels of
            smoke are detected"
            "value": 0
            },
            {
            "name": "heads up 1",
            "description": "first gentle alert on smoke"
            "value": 1
            },
            {
            "name": "heads up 2",
            "description": "more urgent alert"
            "value": 2
            },
            {
            "name": "heads up 3",
            "description": ""
            "value": 2
            }
        ]
        },
        {
        "description": "co", // a human readable
        description of the field
        "states": [
        {
        "name": "all clear",
        "description": "state when acceptable levels of coare
        detected"
        "value": 0
        },
        {
        "name": "heads up 1",
        "description": "first gentle alert on co"
        "value": 1
        },
        {
        "name": "heads up 2",
        "description": "more urgent alert"
        "value": 2
        },
        {
        "name": "heads up 3",
        "description": ""
        "value": 2
        }
        ]
        }
    ]
}
}
```

In creating the descriptors, the vendor may determine and indicate whether the descriptor is for public or private use. Public descriptors can be used by other developers, while private descriptors may only be used by the creating vendor. Accordingly, when the API 90 provider desires, it can create public descriptors for third-party vendors to use, especially when the API 90 provider has particular information it would like to collect from third-parties (e.g., energy usage, motion events, carbon-monoxide states, etc.).

Upon completion of the creation of the stream descriptors, the developers may provide the descriptor to the API 90, which may return a descriptor identifier. To post data, the third-party vendor may provide the data-stream in accordance with the format provided in the descriptor, along with the descriptor identity provided from the API 90. Below is an example of data posted via a described data stream.

```
{
    "stream": {
        "descriptor": {
            "developer": 1240985,
            "id": 1240958
        }
        "source": {
            "manufacturer": "Nest",
            "type": "D2A",
            "id": 1240958098,
            "qualifier": "the thermostat"
        }
        "data": [
            [12098650986098, 5.60986, 1.23498],
            [12098650986099, 5.60986, 1.23498],
            [12098650986100, 5.60986, 1.23498],
            [12098650986101, 5.60986, 1.23498],
            [12098650986102, 5.60986, 1.23498],
            [12098650986103, 5.60986, 1.23498],
            [12098650986104, 5.60986, 1.23498],
            [12098650986105, 5.60986, 1.23498]
        ]
    }
}
```

Third-Party Activity Monitoring

As more third-parties utilize the API 90 to communicate with and/or control the system 180, it may become increasingly beneficial to monitor third-party activities. Tracking API 90 activities may be desirable to determine a particular responsible party for data reads and/or writes of the device service 84 data model. The API 90 activity log may transparently capture both read and/or write operations that propagate from the API 90 on behalf of the clients 182 and/or the client 182 vendors.

Multiple levels of granularity may be used to track these data reads and/or writes. For example, activity logging logic (e.g., machine instructions implemented on a processor-based computer system) may track modifications and/or access to the data model at the devices level, the structure level, and/or an overall shared data level. Below is an example of a JSON structure for an activity log. In some embodiments, the activity log data is provided based upon a particular account (e.g., at an account and/or user level).

```
Top Level
{
    "sessions" : [<SessionDetails>]
}
SessionDetails:
{
    "client_id": <number>,
    "session_id": <string>,
    "events": [<EventSpecification>]
}
EventSpecification:
{
    "action": "put"/"subscribe",
    "action_targets": [<ActionTarget>],
    "timestamp": <number: timestamp in ms, when modification took place>,
}
ActionTarget
{
    "bucket_name": <full bucket name>,
    "type": "merge/overwrite" (put only),
```

-continued

```
    "value": <json values that were put>, (put only)
    "oldvalue": <full object response json, pre-put> (put, overwrite only)
    "structure_name": <name field out of containing structure bucket>,
    "structure_id": <structure identifier>,
    "where_id": string (device/shared only, both put/subscribe),
    "where_name": <name from where bucket matching where_id> (device/shared
only, both put/subscribe),
    "label": <string from shared bucket> (device/shared only, both put/subscribe)
}
```

Activity Log JSON Example

In certain embodiments, the "sessions" element at the top level is an array maintained in sorted order by timestamp. When data from the activity log is to be read, the number of returned events may be reduced, by returning only events that have occurred within a certain time period (e.g., the last 5, 7, 10, 15 days, etc.). In some embodiments, this time period may be configured using a parameter (e.g., in the read call, etc.).

The "events" are an array of events (e.g., "put" and/or data "subscribe" events) that may be a combination of actions (e.g., "action_targets") and the time in which the actions happened. As illustrated in the example above, much event metadata may be captured. For example, "bucket_name" may represent a particular location where the event occurred. "Type" may refer to a particular event type (e.g., merge and/or overwrite for "put" activities). "Value" may refer to a new value that has been written via a "put" activity and "oldvalue" may refer to the data that existed prior to the "put". Structure information corresponding to the activity may also be stored (e.g., the structure name and/or identifier. Further, "where" information that describes a more granular location within the structure may be provided (e.g., a "where" identifiers and/or name).

The "SessionDetails" may include a client 182 identifier, a session identifier, and the events performed during the session. Accordingly, the activity logging logic may be used to obtain a particular client (e.g., "client_id") responsible for performing a particular action (e.g., a put and/or subscribe event).

In one embodiment, activity logs may be used by the API 90 vendor to determine when API 90 activities have caused changes to smart devices (e.g., thermostats 10A, detectors 10B, and/or other smart devices 10C). For example, when unexpected target temperature changes occur at a thermostat 10A, the activity logs may be used to discern if a third-party is responsible for the change.

Further, in some embodiments, one or more third-party vendors may be provided access to the activity logs. The activity logs may help the third-party vendors to understand how their client applications are effecting the environment 30. In some embodiments, the third-party vendors may access activity log entries for actions and/or events caused by all vendors. In alternative embodiments, the third-party vendors may have access to only the actions and/or events caused by that particular third-party vendor.

Figure 22:
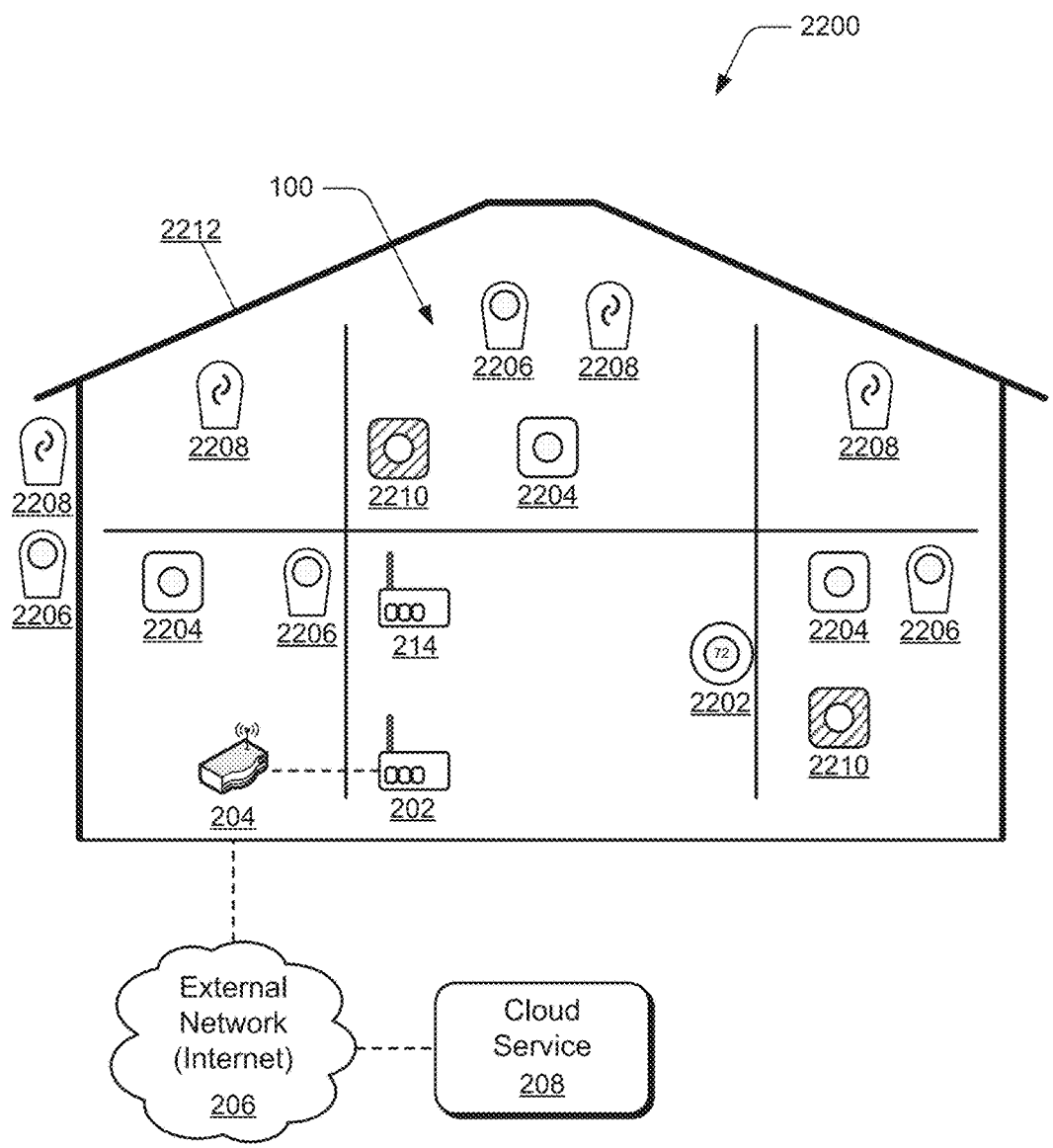
FIG. 22 illustrates an example environment in which a mesh network can be implemented in accordance with embodiments of the techniques described herein.

FIG. 22 illustrates an example environment 2200 in which the mesh network 100 (as described with reference to FIGS. 1 and 2), and embodiments of a camera system API for third-party integrations, as well as embodiments of camera data access based on subscription status, can be implemented. Generally, the environment 2200 includes the mesh network 100 implemented as part of a smart-home or other type of structure with any number and type of mesh network devices (e.g., smart devices) that are configured for communication in a mesh network. For example, the mesh network devices can include a thermostat 2202, hazard detectors 2204 (e.g., for smoke and/or carbon monoxide), cameras 2206 (e.g., indoor and outdoor), lighting units 2208 (e.g., indoor and outdoor), and any other types of mesh network devices 2210 that are implemented inside and/or outside of a structure 2212 (e.g., in a smart-home environment). In this example, the mesh network devices can also include any of the previously described devices, such as a border router 202, a router 102, a router-eligible end device 104, and/or an end device 106.

In the environment 2200, any number of the mesh network devices can be implemented for wireless interconnection to wirelessly communicate and interact with each other. The mesh network devices are modular, intelligent, multi-sensing, network-connected devices, which can integrate seamlessly with each other and/or with a central server or a cloud-computing system to provide any of a variety of useful smart-home objectives and implementations. An example of a mesh network device that can be implemented as any of the devices described herein is shown and described with reference to FIG. 17.

In implementations, the thermostat 2202 may include a Nest® Learning Thermostat that detects ambient climate characteristics (e.g., temperature and/or humidity) and controls a HVAC system in the smart-home environment. The learning thermostat 2202 and other smart devices "learn" by capturing occupant settings to the devices. For example, the thermostat learns preferred temperature set-points for mornings and evenings, and when the occupants of the structure are asleep or awake, as well as when the occupants are typically away or at home.

A hazard detector 2204 can be implemented to detect the presence of a hazardous substance or a substance indicative of a hazardous substance (e.g., smoke, fire, or carbon monoxide). In examples of wireless interconnection, a hazard detector 2204 may detect the presence of smoke, indicating a fire in the structure, in which case the hazard detector that first detects the smoke can broadcast a low-power wake-up signal to all of the connected mesh network devices. The other hazard detectors 2204 can then receive the broadcast wake-up signal and initiate a high-power state for hazard detection and to receive wireless communications of alert messages. Further, the lighting units 2208 can receive the broadcast wake-up signal and activate in the region of the detected hazard to illuminate and identify the problem area. In another example, the lighting units 2208 may activate in one illumination color to indicate a problem area or region in the structure, such as for a detected fire or break-in, and activate in a different illumination color to indicate safe regions and/or escape routes out of the structure. In another example, a doorbell or door monitoring system may include LEDs that flash yellow (or other color) when a presence is detected, or flash red if an alarm is activated.

In various configurations, the mesh network devices 2210 can include an entryway interface device that functions in coordination with a network-connected door lock system, and that detects and responds to a person's approach to or departure from a location, such as an outer door of the structure 2212. The entryway interface device can interact with the other mesh network devices based on whether someone has approached or entered the smart-home environment. An entryway interface device can control doorbell functionality, announce the approach or departure of a person via audio or visual means, and control settings on a security system, such as to activate or deactivate the security system when occupants come and go. The mesh network devices 2210 can also include other sensors and detectors, such as to detect ambient lighting conditions, detect room-occupancy states (e.g., with an occupancy sensor), and control a power and/or dim state of one or more lights. In some instances, the sensors and/or detectors may also control a power state or speed of a fan, such as a ceiling fan. Further, the sensors and/or detectors may detect occupancy in a room or enclosure, and control the supply of power to electrical outlets or devices, such as if a room or the structure is unoccupied.

The mesh network devices 2210 may also include connected appliances and/or controlled systems, such as refrigerators, stoves and ovens, washers, dryers, air conditioners, pool heaters, irrigation systems, security systems, and so forth, as well as other electronic and computing devices, such as televisions, entertainment systems, computers, intercom systems, garage-door openers, ceiling fans, control panels, and the like. When plugged in, an appliance, device, or system can announce itself to the mesh network as described above, and can be automatically integrated with the controls and devices of the mesh network, such as in the smart-home. It should be noted that the mesh network devices 2210 may include devices physically located outside of the structure, but within wireless communication range, such as a device controlling a swimming pool heater or an irrigation system.

As described above, the mesh network 100 includes a border router 202 that interfaces for communication with an external network, outside the mesh network 100. The border router 202 connects to an access point 204, which connects to the communication network 206, such as the Internet. A cloud service 208, which is connected via the communication network 206, provides services related to and/or using the devices within the mesh network 100. By way of example, the cloud service 208 can include applications for connecting end user devices, such as smart phones, tablets, and the like, to devices in the mesh network, processing and presenting data acquired in the mesh network 100 to end users, linking devices in one or more mesh networks 100 to user accounts of the cloud service 208, provisioning and updating devices in the mesh network 100, and so forth. For example, a user can control the thermostat 2202 and other mesh network devices in the smart-home environment using a network-connected computer or portable device, such as a mobile phone or tablet device. Further, the mesh network devices can communicate information to any central server or cloud-computing system via the border router 202 and the access point 204. The data communications can be carried out using any of a variety of custom or standard wireless protocols (e.g., Wi-Fi, ZigBee for low power, 6LoWPAN, etc.) and/or by using any of a variety of custom or standard wired protocols (CAT6 Ethernet, HomePlug, etc.).

Any of the mesh network devices in the mesh network 100 can serve as low-power and communication nodes to create the mesh network 100 in the smart-home environment. Individual low-power nodes of the network can regularly send out messages regarding what they are sensing, and the other low-powered nodes in the environment—in addition to sending out their own messages—can repeat the messages, thereby communicating the messages from node to node (i.e., from device to device) throughout the mesh network. The mesh network devices can be implemented to conserve power, particularly when battery-powered, utilizing low-powered communication protocols to receive the messages, translate the messages to other communication protocols, and send the translated messages to other nodes and/or to a central server or cloud-computing system. For example, an occupancy and/or ambient light sensor can detect an occupant in a room as well as measure the ambient light, and activate the light source when the ambient light sensor detects that the room is dark and when the occupancy sensor detects that someone is in the room. Further, the sensor can include a low-power wireless communication chip (e.g., a ZigBee chip) that regularly sends out messages regarding the occupancy of the room and the amount of light in the room, including instantaneous messages coincident with the occupancy sensor detecting the presence of a person in the room. As mentioned above, these messages may be sent wirelessly, using the mesh network, from node to node (i.e., smart device to smart device) within the smart-home environment as well as over the Internet to a central server or cloud-computing system.

In other configurations, various ones of the mesh network devices can function as "tripwires" for an alarm system in the smart-home environment. For example, in the event a perpetrator circumvents detection by alarm sensors located at windows, doors, and other entry points of the structure or environment, the alarm could still be triggered by receiving an occupancy, motion, heat, sound. etc. message from one or more of the low-powered mesh nodes in the mesh network. In other implementations, the mesh network can be used to automatically turn on and off the lighting units 2208 as a person transitions from room to room in the structure. For example, the mesh network devices can detect the person's movement through the structure and communicate corresponding messages via the nodes of the mesh network. Using the messages that indicate which rooms are occupied, other mesh network devices that receive the messages can activate and/or deactivate accordingly. As referred to above, the mesh network can also be utilized to provide exit lighting in the event of an emergency, such as by turning on the appropriate lighting units 2208 that lead to a safe exit. The light units 2208 may also be turned-on to indicate the direction along an exit route that a person should travel to safely exit the structure.

The various mesh network devices may also be implemented to integrate and communicate with wearable computing devices, such as may be used to identify and locate an occupant of the structure, and adjust the temperature, lighting, sound system, and the like accordingly. In other implementations, RFID sensing (e.g., a person having an RFID bracelet, necklace, or key fob), synthetic vision techniques (e.g., video cameras and face recognition processors), audio techniques (e.g., voice, sound pattern, vibration pattern recognition), ultrasound sensing/imaging techniques, and infrared or near-field communication (NFC) techniques (e.g., a person wearing an infrared or NFC-capable smartphone), along with rules-based inference engines or artificial intelligence techniques that draw useful conclusions from the sensed information as to the location of an occupant in the structure or environment.

In other implementations, personal comfort-area networks, personal health-area networks, personal safety-area networks, and/or other such human-facing functionalities of service robots can be enhanced by logical integration with other mesh network devices and sensors in the environment according to rules-based inferencing techniques or artificial intelligence techniques for achieving better performance of these functionalities. In an example relating to a personal health-area, the system can detect whether a household pet is moving toward the current location of an occupant (e.g., using any of the mesh network devices and sensors), along with rules-based inferencing and artificial intelligence techniques. Similarly, a hazard detector service robot can be notified that the temperature and humidity levels are rising in a kitchen, and temporarily raise a hazard detection threshold, such as a smoke detection threshold, under an inference that any small increases in ambient smoke levels will most likely be due to cooking activity and not due to a genuinely hazardous condition. Any service robot that is configured for any type of monitoring, detecting, and/or servicing can be implemented as a mesh node device on the mesh network, conforming to the wireless interconnection protocols for communicating on the mesh network.

The mesh network devices 2210 may also include a smart alarm clock for each of the individual occupants of the structure in the smart-home environment. For example, an occupant can customize and set an alarm device for a wake time, such as for the next day or week. Artificial intelligence can be used to consider occupant responses to the alarms when they go off and make inferences about preferred sleep patterns over time. An individual occupant can then be tracked in the mesh network based on a unique signature of the person, which is determined based on data obtained from sensors located in the mesh network devices, such as sensors that include ultrasonic sensors, passive IR sensors, and the like. The unique signature of an occupant can be based on a combination of patterns of movement, voice, height, size, etc., as well as using facial recognition techniques.

In an example of wireless interconnection, the wake time for an individual can be associated with the thermostat 2202 to control the HVAC system in an efficient manner so as to pre-heat or cool the structure to desired sleeping and awake temperature settings. The preferred settings can be learned over time, such as by capturing the temperatures set in the thermostat before the person goes to sleep and upon waking up. Collected data may also include biometric indications of a person, such as breathing patterns, heart rate, movement, etc., from which inferences are made based on this data in combination with data that indicates when the person actually wakes up. Other mesh network devices can use the data to provide other smart-home objectives, such as adjusting the thermostat 2202 so as to pre-heat or cool the environment to a desired setting, and turning-on or turning-off the lights 2208.

In implementations, the mesh network devices can also be utilized for sound, vibration, and/or motion sensing such as to detect running water and determine inferences about water usage in a smart-home environment based on algorithms and mapping of the water usage and consumption. This can be used to determine a signature or fingerprint of each water source in the home, and is also referred to as "audio fingerprinting water usage." Similarly, the mesh network devices can be utilized to detect the subtle sound, vibration, and/or motion of unwanted pests, such as mice and other rodents, as well as by termites, cockroaches, and other insects. The system can then notify an occupant of the suspected pests in the environment, such as with warning messages to help facilitate early detection and prevention.

In additional scenarios, the techniques described herein for a mesh network and the mesh network devices can be implemented for third-party products and devices that are configurable and/or addressable to join and operate in the mesh network, and in the example environment 2200. Various examples of third-party products and devices that can be implemented in the example environment for wireless interconnection to wirelessly communicate and interact with each other are described following. As noted above, the third-party products and devices can be designed and implemented to integrate seamlessly with each other and/or with a central server or a cloud-computing system to provide any of a variety of useful objectives and implementations.

Appliance devices, such as the major home appliances (e.g., washer, dryer, oven and range, dishwasher, refrigerator, and the like), can operate in a mesh network, such as to refresh the laundry when the house is placed in a HOME state, or an appliance can enter into an economy mode when the house is placed in an AWAY state (e.g., all persons have left the structure). In an emergency, such as a fire or natural disaster, or based on detected weather conditions that may lead to an emergency, an appliance that uses natural gas (e.g., a stove and water heater) may be disabled. In an AWAY state of the house, a notification may be communicated to a mobile device of a user that the oven is on, or to report the status of any other appliance, such as the washer status, the refrigerator has stopped running, the furnace is running more than expected, and the like. Further, a notice that the furnace is running more than expected may also be an indication that a door or window has been left open to a cold exterior environment, or has been broken open. If a user does not respond to an appliance notification, such as a notice that the oven is on, then the system may auto turn the oven off.

An appliance (e.g., washer and dryer) may enter into a quiet mode in a HOME state of the house. If the house is in an AWAY state and a faucet is turned on for hot water, then the system can initiate the house HOME state. Further appliance use can provide an indication of occupancy as well as the approximate number of occupants. If the occupants of a structure are away for a designated number of hours or days, the system can communicate a request to enter into an eco-mode, which a user may then approve remotely on the mobile device. Additionally, the system may initiate a warning if an appliance is activated during RHR (conserving energy during peak use times), reduce hot water flow during RHR, activate the central heating and cooling system to push or pull air during an emergency or if an alarm is activated, adjust the thermostat or set some other mesh network device set point based on the oven temperature or the oven being on, and communicate a report of water and/or electrical use to the mobile device of the user.

Doors and windows that have blinds, shades, or other types of coverings, or that may be electrochromic, can be automatically activated, such as to lower the shades during evening hours or in a house AWAY state. The shades may also be closed to lower the temperature rather than turning on the HVAC, or if direct sunlight is detected. Alternatively, the shades can open if an alarm goes off, or close if RHR. Similarly, electric fans can be turned on if RHR, or a fan can be reversed if heating the structure or environment. A fan state, speed, or other characteristic can be used as a basis to change another mesh network device set point. Further, energy usage data can be communicated to the mobile device of the user. If the HVAC unit is heating or cooling, a fan can be operated in a de-stratification (reverse) mode. If the house is set to an AWAY mode, a fan may be turned-on periodically and/or activated for the same limited duration as the HVAC fan. During an alarm, any externally vented fans can be activated. The HVAC may have multiple sensor inputs to determine the occupancy of a home environment for customized temperature control.

Electric vehicle charging can be DR-based, stopped if a hazard is detected, or a user given the option to delay charging during RHR. Additionally, energy use data for electric vehicle charging can be uploaded, and the system can learn a schedule, such as to precondition the vehicle for use based on when a user typically leaves and takes the vehicle.

Home lighting can be set to turn on or off based on the house HOME mode or AWAY mode, and motion sensing can be used to determine or set the house HOME mode. If the house is in the AWAY mode, the system can turn the lights on and off randomly. Less efficient lights can be used less often. Home "scenes" can be created with ambience and lighting, such as a dinner scene, movie-watching scene, romantic scene, and the like. As noted above, the lights may illuminate the color red to indicate a hazard or emergency, and then change to a bright white to illuminate an exit path out of the structure. The lights can also be turned off or dimmed for RHR, turned on or off based on the temperature, and/or have different start, during, and end colors.

Motion sensing, such as implemented by the camera devices 2206, can be integrated to switch on lights and activate the HOME mode. Light activation can be monitored to detect occupancy, and if there are no detected occupants, a message can be communicated requesting to deactivate the HVAC. With respect to camera integration and imaging, the light brightness may be increased for camera imaging if motion is detected. If a light breaks, a camera can zoom on the light. The lights can be adjusted based on detected users, user profiles, and/or to adjust the lighting or temperature. A lighting schedule can be learned for the house HOME mode and AWAY mode, and light actuations indicate or activate the HOME mode. If an alarm is activated, then all of the outdoor lights can be activated and/or illuminate different colors, such as the swimming pool lights, flood lights and other outdoor lights. The lights may also be turned on steady, flashing, random, or in some pattern that indicates a warning or alarm. If an alarm is activated, the lights can illuminate heads-up status colors, such as yellow as a caution or red as a warning. A subset of the lights can illuminate to indicate the location and presence of an intruder. The lights can also turn on to illuminate a safe exit path out of the structure, such as based on the home environment sensor determinations.

If a door lock is unlocked, the house HOME mode can be initiated, and similarly, if an occupant leaves and locks the door, the house AWAY mode can be set. The status of the locks can be polled by the system less frequently if an occupant is present and in the house HOME mode, and polled more often in the house AWAY mode. Further, if a low-battery condition is encountered and the house is in the AWAY mode, the feature can hibernate to conserve battery power of the lock-based mesh network device. A lock-based device can be designed to operate based on a pin code plus BLE authentication, and a lock or unlock state can be used for occupancy determinations, and/or combined with other sensor information for the occupancy determinations. An unexpected door unlock can initiate an alarm, such as if a user is on vacation, and unlock messages can be communicated to the mobile device of the user. Further, when the user arrives or leaves, notifications can be initiated for display on the screen of the mobile device.

Wireless sensor devices of all types can be implemented to operate in the mesh network and provide temperature and other readings to a user and any of the other mesh network devices. From a services standpoint, the house AWAY mode and HVAC settings may be initiated when a user checks-in somewhere else, which may also be based on a location services input and/or a calendar event. The system may also be implemented for reservation, alarm interactions, and/or voice control of the thermostat or any of the other mesh network devices. Guests of a home may be allowed to control some features and aspects of the system based on proximity. Sensors may also facilitate temporary camera access and temporary key access for guests. Further, a guest's own home may be controlled and an AWAY mode initiated based on occupancy detected in another structure that includes a mesh network environment. A room may also be automatically photographed before guest arrival and after the guest leaves, and too many guests can also be detected.

Solar power devices can communicate in the mesh network to control a thermostat, charge an electric vehicle, and/or activate appliances based on the weather forecast and stored charge. Switches and plugs can be implemented, along with occupancy sensors, for many of the features described herein, such as to activate an alarm device, deactivate devices during RHR (Rush Hour Rewards), communicate energy consumption notifications, for user detection, etc. A VOIP system can be integrated to forward calls for a user, such as in the house AWAY mode or to call 911 emergency if an alarm is activated. The VOIP system can also monitor for scheduled HOME mode times and initiate a call to the user if the house HOME state is not entered.

Audio and video features can be implemented to turn down televisions and audio equipment during emergency, hazard, and alarm situations, and turn on or off devices in the house HOME state and house AWAY state. An alarm can also be propagated (e.g., rebroadcast) over the mesh network devices as a message at a particular decibel level. The audio can also be switched based on the house state, and IR sensors and application usage can indicate the house HOME state. An audio system can be used to propagate an audio alarm over the speakers of the system and/or a sound can be played if a camera detects an intruder. The audio system, as well as any of the mesh network devices, can be turned on or off based on an ETA of a person arriving home.

An automobile can be integrated generally as a mesh network device in the example environment, and communicate the ETA of the person arriving home. The house HOME state and house AWAY state can be initiated based on the provided ETA, when reversing and leaving structure, or when the ETA is based on a threshold, including use of thermal transition time to warm or cool the structure. Features of geo-fence can also be incorporated for use in the mesh network. Similar to the mobile device of the user, the automobile can display in-vehicle status of any of the mesh network devices, and/or the mesh network overall, to include camera images and video feeds. The automobile (vehicle) can be preconditioned for use based on the thermostat setting in the house so that the user environment temperature is maintained as the user transitions from the house to the vehicle, or vice-versa. Micro-location control of the structure in the example environment can be used to actuate entry points, such as to open the garage door on arrival, but not unlock any other entry doors of the structure (or any other combination thereof). The opening and closing of the garage door can also be used to initiate either of the house HOME state or the house AWAY state. The garage door can also be opened or closed based on detecting that the temperature is too hot or cold. The garage door can be opened or closed based on alarms, such as for smoke or CO, and if forced open, the system can activate cameras.

Personal health and monitoring devices can be incorporated in the mesh network and example environment 2200. Further, wearable devices can also be integrated as any type of mesh network device that is operable to implement many of the various features described herein. For example, a bed cover or wearable device may detect a user sleeping and the thermostat state for the room is adjusted to accommodate the user preferences and/or profile. A wake-up temperature can also be based on bed cover motion or a wearable device, and the house HOME state initiated, to include lights, music, television, etc. A baby's status and/or temperature can be communicated to the mobile device of the user, a camera turned on based on the baby status, and a baby monitor vibrates and/or escalates an alarm activation in the system, such as if the baby monitor leaves a geofence, the alarm can be activated. Mesh network devices for baby needs may be more stringent, such as to accommodate less temperature drift for baby settings. A user's body temperature can be determined by a wearable device and the HVAC adjusted accordingly. A pet wearable device for pet detection can be used to reduce camera false triggers.

Alternatively or in addition to the many camera features listed above, one or more of the cameras can be used to initiate notifications if the house AWAY state is set. A camera can activate and deactivate based on either a manual or automatic switching between house HOME state and house AWAY state. If an alarm is activated, an image clip is sent as a notification, such as to the mobile device of the user, and a video history may also be included. When a doorbell or door knock is detected (e.g., by microphone, sensor contact, etc.) a camera is turned-on, an image or video is captured, and the image or video is communicated for viewing, either on a display device in the house or on the mobile device of the user. If the user leaves the structure, a wearable device can initiate turning on a camera and upon returning, initiate turning off the camera. Similarly, if a user falls asleep, the wearable device can detect the sleeping and initiate turning on a camera and upon waking, initiate turning off the camera. If motion is detected in a zone, and the structure is unoccupied (e.g., house AWAY state) the system can initiate to simulate as if someone is in the structure by turning on music, lights, etc. Similarly, if no motion is detected for an extended time, the system can initiate to simulate as if someone is home. Facial recognition can be implemented to support user preferences and/or profiles. Generally, a video clip, audio recording, or image can be captured and/or generated for any event that is detected in the example environment of the mesh network. Further, third-party access points into the mesh network provide notification and subsequent links to relevant cameras.

The shower and faucets can be controlled as mesh network devices in the example environment. For example, during an alarm, the shower or a faucet that is in use can be changed to run cold water, or an LED ring around the shower head can be activated to indicate an alarm. Similarly, for a person at the door, the shower may turn cold and/or LED lights activated to notify the user. Generally for home automation, the mesh network devices can be controlled based on the thermostat, alarms, motions, detected audio, hazards, and other properties and features. For RHR, a fan can be turned on, the window shades closed, and the lights turned-off. A scene can be set, to include setting the temperature, window shades, music, etc. An alarm clock can announce or alarm detected camera motion events, and open an audio feed. The alarm clock can be used to facilitate many of the features, such as to announce alarms, programming sleep and awake temperatures, lighting, and alarms, and to announce RHR.

Remote control devices can also be implemented as mesh network devices to control and activate any of the mesh network devices and features described herein, such as to turn down audio and video when a hazard condition is detected or an alarm is activated. Remote control devices may also be used for audio recordings, to answer system questions, and announce RHR. Features and aspects of insurance protection may also be incorporated, such as to automatically mail batteries for the mesh network devices when a low-battery condition is detected, particularly in the smoke and CO detectors. An insurance carrier may also be notified when an alarm condition is activated, so that support can be provided, such as after a fire or break-in.

Other third-party products and devices that can be designed to operate in a mesh network and/or in the example environment 2200 can include baby and pet monitoring devices, other Internet-of-things (IoT) devices, software stack providers, RF modules and development kits, access points and hub devices, load control switches, security-based devices, RFID tags and beacon devices, drones and bot devices, energy storage equipment and devices, hobby devices, metering units and devices, PERS, weather station devices, utilities, and/or for any other type of products and mesh network devices. For example, swimming pool heaters and pumps can be turned-off as non-essential pool elements when the house is in the AWAY mode or during RHR to conserve energy. For cloud-based features that are associated with the mesh network, ISP/MSO features can be implemented, such as to provide that a user can view the thermostat state (or state of any mesh network devices) at a glance. The sprinkler system may be activated and turned-on if an intruder alarm or fire alarm is activated. A water usage message can also be communicated to the mobile device of the user. A vacuum system can be set to clean when the house AWAY state is initiated.

Figure 23:
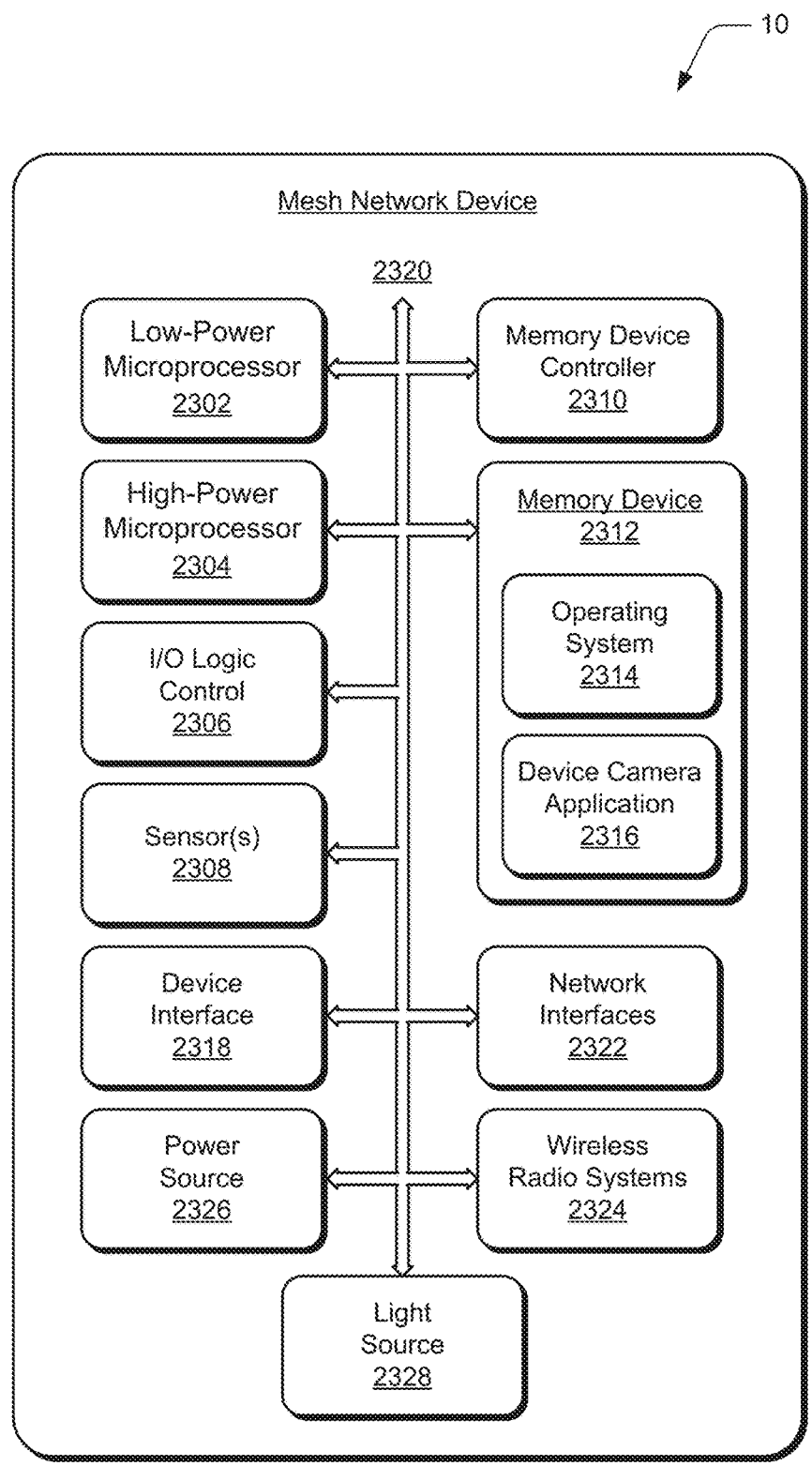
FIG. 23 illustrates an example mesh network device that can be implemented in a mesh network environment in accordance with one or more embodiments of the techniques described herein.

FIG. 23 illustrates an example mesh network device 10 that can be implemented as any of the mesh network devices in a mesh network in accordance with one or more embodiments of a camera system API for third-party integrations as described herein. The device 10 can be integrated with electronic circuitry, microprocessors, memory, input output (I/O) logic control, communication interfaces and components, as well as other hardware, firmware, and/or software to implement the device in a mesh network. Further, the mesh network device 10 can be implemented with various components, such as with any number and combination of different components as further described with reference to the example device shown in FIG. 18.

In this example, the mesh network device 10 includes a low-power microprocessor 2302 and a high-power microprocessor 2304 (e.g., microcontrollers or digital signal processors) that process executable instructions. The device also includes an input-output (I/O) logic control 2306 (e.g., to include electronic circuitry). The microprocessors can include components of an integrated circuit, programmable logic device, a logic device formed using one or more semiconductors, and other implementations in silicon and/or hardware, such as a processor and memory system implemented as a system-on-chip (SoC). Alternatively or in addition, the device can be implemented with any one or combination of software, hardware, firmware, or fixed logic circuitry that may be implemented with processing and control circuits. The low-power microprocessor 2302 and the high-power microprocessor 2304 can also support one or more different device functionalities of the device. For example, the high-power microprocessor 2304 may execute computationally intensive operations, whereas the low-power microprocessor 2302 may manage less complex processes such as detecting a hazard or temperature from one or more sensors 2308. The low-power processor 2302 may also wake or initialize the high-power processor 2304 for computationally intensive processes.

The one or more sensors 2308 can be implemented to detect various properties such as acceleration, temperature, humidity, water, supplied power, proximity, external motion, device motion, sound signals, ultrasound signals, light signals, fire, smoke, carbon monoxide, global-positioning-satellite (GPS) signals, radio-frequency (RF), other electromagnetic signals or fields, or the like. As such, the sensors 2308 may include any one or a combination of temperature sensors, humidity sensors, hazard-related sensors, other environmental sensors, accelerometers, microphones, optical sensors up to and including cameras (e.g., charged coupled-device or video cameras), active or passive radiation sensors, GPS receivers, and radio frequency identification detectors. In implementations, the mesh network device 10 may include one or more primary sensors, as well as one or more secondary sensors, such as primary sensors that sense data central to the core operation of the device (e.g., sensing a temperature in a thermostat or sensing smoke in a smoke detector), while the secondary sensors may sense other types of data (e.g., motion, light or sound), which can be used for energy-efficiency objectives or smart-operation objectives.

The mesh network device 10 includes a memory device controller 2310 and a memory device 2312, such as any type of a nonvolatile memory and/or other suitable electronic data storage device. The mesh network device 10 can also include various firmware and/or software, such as an operating system 2314 that is maintained as computer executable instructions by the memory and executed by a microprocessor. The device software may also include a device camera application 2316 that implements embodiments of a camera system API for third-party integrations. The mesh network device 10 also includes a device interface 2318 to interface with another device or peripheral component, and includes an integrated data bus 2320 that couples the various components of the mesh network device for data communication between the components. The data bus in the mesh network device may also be implemented as any one or a combination of different bus structures and/or bus architectures.

The device interface 2318 may receive input from a user and/or provide information to the user (e.g., as a user interface), and a received input can be used to determine a setting. The device interface 2318 may also include mechanical or virtual components that respond to a user input. For example, the user can mechanically move a sliding or rotatable component, or the motion along a touchpad may be detected, and such motions may correspond to a setting adjustment of the device. Physical and virtual movable user-interface components can allow the user to set a setting along a portion of an apparent continuum. The device interface 2318 may also receive inputs from any number of peripherals, such as buttons, a keypad, a switch, a microphone, and an imager (e.g., a camera device).

The mesh network device 10 can include network interfaces 2322, such as a mesh network interface for communication with other mesh network devices in a mesh network, and an external network interface for network communication, such as via the Internet. The mesh network device 10 also includes wireless radio systems 2324 for wireless communication with other mesh network devices via the mesh network interface and for multiple, different wireless communications systems. The wireless radio systems 2324 may include Wi-Fi, Bluetooth™, Mobile Broadband, and/or point-to-point IEEE 802.15.4. Each of the different radio systems can include a radio device, antenna, and chipset that is implemented for a particular wireless communications technology. The mesh network device 10 also includes a power source 2326, such as a battery and/or to connect the device to line voltage. An AC power source may also be used to charge the battery of the device.

As noted above, the high-power microprocessor 2304 of the mesh network device 10 can also support one or more different device functionalities of the device. In some instances, the high-power processor 2304 may predict desirable settings and/or implement those settings. For example, based on the presence detection, the high-power processor 2304 may adjust device settings to conserve power when no one is home or in a particular room, or to accord with user preferences (e.g., general at-home preferences or user-specific preferences). As another example, based on the detection of a particular person, animal, or entity (e.g., a child, pet, or object), the high-power processor 2304 may initiate an audio or visual indicator of where the person, animal, or entity is or may initiate an alarm or security feature if an unrecognized person is detected under certain conditions (e.g., at night or when lights are off).

In some instances, mesh network devices may interact with each other such that events detected by a first device influence actions of a second device. For example, a first device can detect that a user has entered into a garage (e.g., by detecting motion in the garage, detecting a change in light in the garage, or by detecting opening of the garage door). The first device can transmit this information to a second device via the network interface 2322, such that the second device can then adjust a home temperature setting, a light setting, a music setting, and/or a security-alarm setting. As another example, a first device can detect a user approaching a front door, such as by detecting motion or sudden light pattern changes. The first device may then cause a general audio or visual signal to be presented, such as by sounding a doorbell, or cause a location-specific audio or visual signal to be presented (e.g., to announce a visitor's presence within a room that a user is occupying).

In addition to detecting various types of events, the mesh network device 10 may include a light source 2328 that may illuminate when a person, pet, or other moving entity is detected as approaching. The light source 2328 may include any type of light source such as one or more light-emitting diodes or the like. The light source 2328 can be communicatively coupled to the high-power processor 2304 and to the low-power processor 2302, which can provide a signal to cause the light source 2328 to illuminate.

Figure 24:
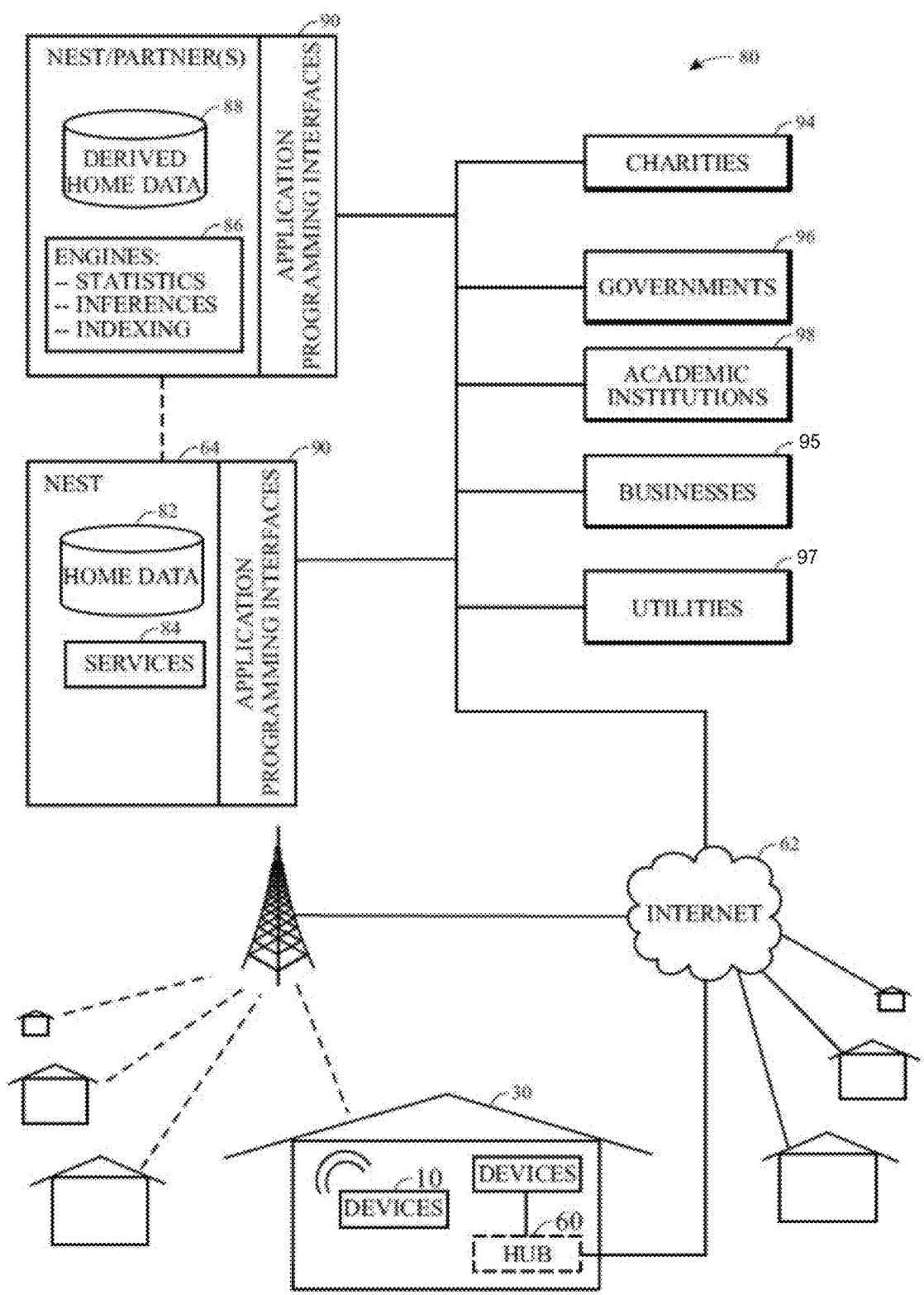
FIG. 24 is a block diagram illustrating a manner of controlling and/or accessing the smart home environment using services over the Internet, in accordance with embodiments.

FIG. 24 illustrates an embodiment of an extensible devices and services platform 80 that can be concentrated at a single server or distributed among several different computing entities without limitation with respect to the smart-home environment 30. The extensible devices and services platform 80 may include a processing engine 86, which may include engines that receive data from devices of smart-home environments (e.g., via the Internet or a hubbed network), to index the data, to analyze the data and/or to generate statistics based on the analysis or as part of the analysis. The analyzed data can be stored as derived home data 88.

Results of the analysis or statistics can thereafter be transmitted back to the device that provided home data used to derive the results, to other devices, to a server providing a web page to a user of the device, or to other non-device entities. For example, use statistics, use statistics relative to use of other devices, use patterns, and/or statistics summarizing sensor readings can be generated by the processing engine 86 and transmitted. The results or statistics can be provided via the Internet 62. In this manner, the processing engine 86 can be configured and programmed to derive a variety of useful information from the home data 82. A single server can include one or more engines.

The derived data can be highly beneficial at a variety of different granularities for a variety of useful purposes, ranging from explicit programmed control of the devices on a per-home, per-neighborhood, or per-region basis (for example, demand-response programs for electrical utilities), to the generation of inferential abstractions that can assist on a per-home basis (for example, an inference can be drawn that the homeowner has left for vacation and so security detection equipment can be put on heightened sensitivity), to the generation of statistics and associated inferential abstractions that can be used for government or charitable purposes. For example, processing engine 86 can generate statistics about device usage across a population of devices and send the statistics to device users, service providers or other entities (e.g., that have requested or may have provided monetary compensation for the statistics).

According to some embodiments, the home data 82, the derived home data 88, and/or another data can be used to create "automated neighborhood safety networks." For example, in the event the central server or cloud-computing architecture 64 receives data indicating that a particular home has been broken into, is experiencing a fire, or some other type of emergency event, an alarm is sent to other smart homes in the "neighborhood." In some instances, the central server or cloud-computing architecture 64 automatically identifies smart homes within a radius of the home experiencing the emergency and sends an alarm to the identified homes. In such instances, the other homes in the "neighborhood" do not have to sign up for or register to be a part of a safety network, but instead are notified of an emergency based on their proximity to the location of the emergency. This creates robust and evolving neighborhood security watch networks, such that if one person's home is getting broken into, an alarm can be sent to nearby homes, such as by audio announcements via the smart devices located in those homes. It should be appreciated that this can be an opt-in service and that, in addition to or instead of the central server or cloud-computing architecture 64 selecting which homes to send alerts to, individuals can subscribe to participate in such networks and individuals can specify which homes they want to receive alerts from. This can include, for example, the homes of family members who live in different cities, such that individuals can receive alerts when their loved ones in other locations are experiencing an emergency.

According to some embodiments, sound, vibration, and/or motion sensing components of the smart devices are used to detect sound, vibration, and/or motion created by running water. Based on the detected sound, vibration, and/or motion, the central server or cloud-computing architecture 64 makes inferences about water usage in the home and provides related services. For example, the central server or cloud-computing architecture 64 can run programs/algorithms that recognize what water sounds like and when it is running in the home. According to one embodiment, to map the various water sources of the home, upon detecting running water, the central server or cloud-computing architecture 64 sends a message an occupant's mobile device asking if water is currently running or if water has been recently run in the home and, if so, which room and which water-consumption appliance (e.g., sink, shower, toilet, etc.) was the source of the water. This enables the central server or cloud-computing architecture 64 to determine the "signature" or "fingerprint" of each water source in the home. This is sometimes referred to herein as "audio fingerprinting water usage."

In one illustrative example, the central server or cloud-computing architecture 64 creates a signature for the toilet in the master bathroom, and whenever that toilet is flushed, the central server or cloud-computing architecture 64 will know that the water usage at that time is associated with that toilet. Thus, the central server or cloud-computing architecture 64 can track the water usage of that toilet as well as each water-consumption application in the home. This information can be correlated to water bills or smart water meters so as to provide users with a breakdown of their water usage.

According to some embodiments, sound, vibration, and/or motion sensing components of the smart devices are used to detect sound, vibration, and/or motion created by mice and other rodents as well as by termites, cockroaches, and other insects (collectively referred to as "pests"). Based on the detected sound, vibration, and/or motion, the central server or cloud-computing architecture 64 makes inferences about pest-detection in the home and provides related services. For example, the central server or cloud-computing architecture 64 can run programs/algorithms that recognize what certain pests sound like, how they move, and/or the vibration they create, individually and/or collectively. According to one embodiment, the central server or cloud-computing architecture 64 can determine the "signatures" of particular types of pests.

For example, in the event the central server or cloud-computing architecture 64 detects sounds that may be associated with pests, it notifies the occupants of such sounds and suggests hiring a pest control company. If it is confirmed that pests are indeed present, the occupants input to the central server or cloud-computing architecture 64 confirms that its detection was correct, along with details regarding the identified pests, such as name, type, description, location, quantity, etc. This enables the central server or cloud-computing architecture 64 to "tune" itself for better detection and create "signatures" or "fingerprints" for specific types of pests. For example, the central server or cloud-computing architecture 64 can use the tuning as well as the signatures and fingerprints to detect pests in other homes, such as nearby homes that may be experiencing problems with the same pests. Further, for example, in the event that two or more homes in a "neighborhood" are experiencing problems with the same or similar types of pests, the central server or cloud-computing architecture 64 can make inferences that nearby homes may also have such problems or may be susceptible to having such problems, and it can send warning messages to those homes to help facilitate early detection and prevention.

In some embodiments, to encourage innovation and research and to increase products and services available to users, the devices and services platform 80 expose a range of application programming interfaces (APIs) 90 to third parties, such as charities 94, governmental entities 96 (e.g., the Food and Drug Administration or the Environmental Protection Agency), academic institutions 98 (e.g., university researchers), businesses 95 (e.g., providing device warranties or service to related equipment, targeting advertisements based on home data), utility companies 97, and other third parties. The APIs 90 are coupled to and permit third party systems to communicate with the central server or the cloud-computing system 64, including the services 84, the processing engine 86, the home data 82, and the derived home data 88. For example, the APIs 90 allow applications executed by the third parties to initiate specific data processing tasks that are executed by the central server or the cloud-computing system 64, as well as to receive dynamic updates to the home data 82 and the derived home data 88.

For example, third parties can develop programs and/or applications, such as web or mobile apps that integrate with the central server or the cloud-computing system 64 to provide services and information to users. Such programs and application may be, for example, designed to help users reduce energy consumption, to preemptively service faulty equipment, to prepare for high service demands, to track past service performance, etc., or to perform any of a variety of beneficial functions or tasks now known or hereinafter developed.

According to some embodiments, third party applications make inferences from the home data 82 and the derived home data 88, such inferences may include when are occupants home, when are they sleeping, when are they cooking, when are they in the den watching television, and when do they shower. The answers to these questions may help third-parties benefit consumers by providing them with interesting information, products and services as well as with providing them with targeted advertisements.

In one example, a shipping company creates an application that makes inferences regarding when people are at home. The application uses the inferences to schedule deliveries for times when people will most likely be at home. The application can also build delivery routes around these scheduled times. This reduces the number of instances where the shipping company has to make multiple attempts to deliver packages, and it reduces the number of times consumers have to pick up their packages from the shipping company.

Figure 25:
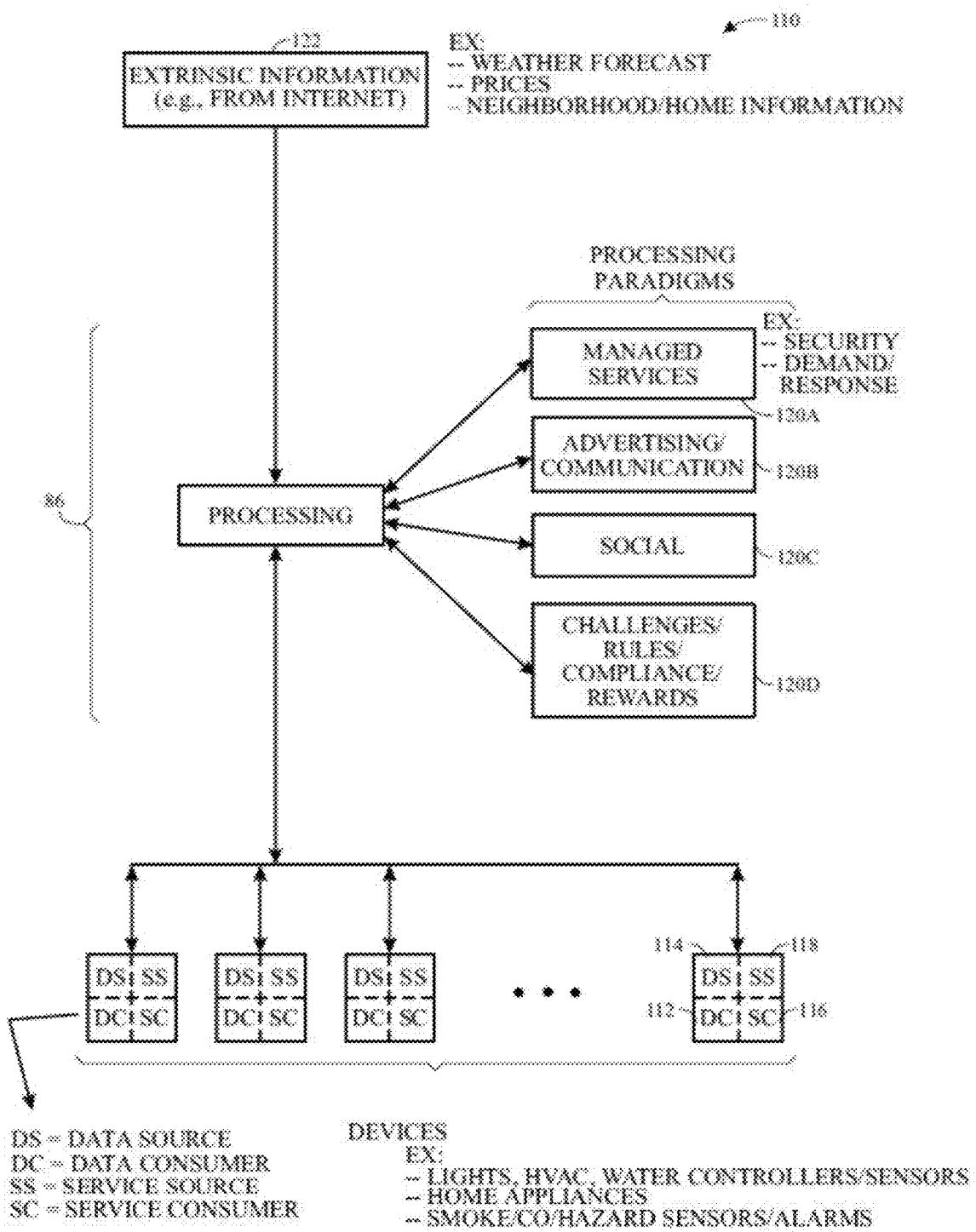
FIG. 25 is a block diagram of processing paradigms that may be used to control devices of the smart home environment, in accordance with an embodiments.

FIG. 25 illustrates and describes an abstracted functional view 110 of the extensible devices and services platform 80 of FIG. 24, with particular reference to the processing engine 86 as well as devices, such as those of the smart-home environment of FIG. 22. Even though devices situated in smart-home environments will have an endless variety of different individual capabilities and limitations, they can all be thought of as sharing common characteristics in that each of them is a data consumer 112 (DC), a data source 114 (DS), a services consumer 116 (SC), and a services source 118 (SS). Advantageously, in addition to providing the essential control information needed for the devices to achieve their local and immediate objectives, the extensible devices and services platform 80 can also be configured to harness the large amount of data that is flowing out of these devices. In addition to enhancing or optimizing the actual operation of the devices themselves with respect to their immediate functions, the extensible devices and services platform 80 can be directed to "repurposing" that data in a variety of automated, extensible, flexible, and/or scalable ways to achieve a variety of useful objectives. These objectives may be predefined or adaptively identified based on, e.g., usage patterns, device efficiency, and/or user input (e.g., requesting specific functionality).

For example, FIG. 25 shows processing engine 86 as including a number of paradigms 120. Processing engine 86 can include a managed services paradigm 120*a* that monitors and manages primary or secondary device functions. The device functions can include ensuring proper operation of a device given user inputs, estimating that (e.g., and responding to an instance in which) an intruder is or is attempting to be in a dwelling, detecting a failure of equipment coupled to the device (e.g., a light bulb having burned out), implementing or otherwise responding to energy demand response events, or alerting a user of a current or predicted future event or characteristic. Processing engine 86 can further include an advertising/communication paradigm 120b that estimates characteristics (e.g., demographic information), desires and/or products of interest of a user based on device usage. Services, promotions, products or upgrades can then be offered or automatically provided to the user. Processing engine 86 can further include a social paradigm 120c that uses information from a social network, provides information to a social network (for example, based on device usage), and/or processes data associated with user and/or device interactions with the social network platform. For example, a user's status as reported to their trusted contacts on the social network could be updated to indicate when they are home based on light detection, security system inactivation or device usage detectors. As another example, a user may be able to share device-usage statistics with other users. In yet another example, a user may share HVAC settings that result in low power bills and other users may download the HVAC settings to their smart thermostat 46 to reduce their power bills.

The processing engine 86 can include a challenges/rules, compliance rewards paradigm 120d that informs a user of challenges, competitions, rules, compliance regulations and/or rewards and/or that uses operation data to determine whether a challenge has been met, a rule or regulation has been complied with and/or a reward has been earned. The challenges, rules or regulations can relate to efforts to conserve energy, to live safely (e.g., reducing exposure to toxins or carcinogens), to conserve money and/or equipment life, to improve health, etc. For example, one challenge may involve participants turning down their thermostat by one degree for one week. Those that successfully complete the challenge are rewarded, such as by coupons, virtual currency, status, etc. Regarding compliance, an example involves a rental-property owner making a rule that no renters are permitted to access certain owner's rooms. The devices in the room having occupancy sensors could send updates to the owner when the room is accessed.

The processing engine 86 can integrate or otherwise utilize extrinsic information 122 from extrinsic sources to improve the functioning of one or more processing paradigms. Extrinsic information 122 can be used to interpret data received from a device, to determine a characteristic of the environment near the device (e.g., outside a structure that the device is enclosed in), to determine services or products available to the user, to identify a social network or social-network information, to determine contact information of entities (e.g., public-service entities such as an emergency-response team, the police or a hospital) near the device, etc., to identify statistical or environmental conditions, trends or other information associated with a home or neighborhood, and so forth.

An extraordinary range and variety of benefits can be brought about by, and fit within the scope of, the described extensible devices and services platform 80, ranging from the ordinary to the profound. Thus, in one "ordinary" example, each bedroom of the smart-home environment 30 can be provided with a smart wall switch 54, a smart wall plug 56, and/or smart hazard detectors 50, all or some of which include an occupancy sensor, wherein the occupancy sensor is also capable of inferring (e.g., by virtue of motion detection, facial recognition, audible sound patterns, etc.) whether the occupant is asleep or awake. If a serious fire event is sensed, the remote security/monitoring service or fire department is advised of how many occupants there are in each bedroom, and whether those occupants are still asleep (or immobile) or whether they have properly evacuated the bedroom. While this is, of course, a very advantageous capability accommodated by the described extensible devices and services platform 80, there can be substantially more "profound" examples that can truly illustrate the potential of a larger "intelligence" that can be made available. By way of perhaps a more "profound" example, the same bedroom occupancy data that is being used for fire safety can also be "repurposed" by the processing engine 86 in the context of a social paradigm of neighborhood child development and education. Thus, for example, the same bedroom occupancy and motion data discussed in the "ordinary" example can be collected and made available (properly anonymized) for processing in which the sleep patterns of schoolchildren in a particular ZIP code can be identified and tracked. Localized variations in the sleeping patterns of the schoolchildren may be identified and correlated, for example, to different nutrition programs in local schools.

As previously discussed, the described extensible devices and services platform 80 may enable communicating emergency information between smart-home environments 30 that are linked and/or to the proper authorities. For example, when a burglar breaks into a smart-home environment 30, a home security system may trip and sound an alarm and/or send emergency notifications to the neighbors, the police, the security company, and the like. However, in instances where the break in is preceded by a jamming attack on the wireless network, the notifications may not be sent out if their transmission is dependent upon the wireless network. Thus, another means to communicate with external parties may be desired. As such, the techniques disclosed herein solve this problem by detecting the jamming attack and sending emergency notifications via side channels that are not dependent upon the wireless network.

Figure 26:
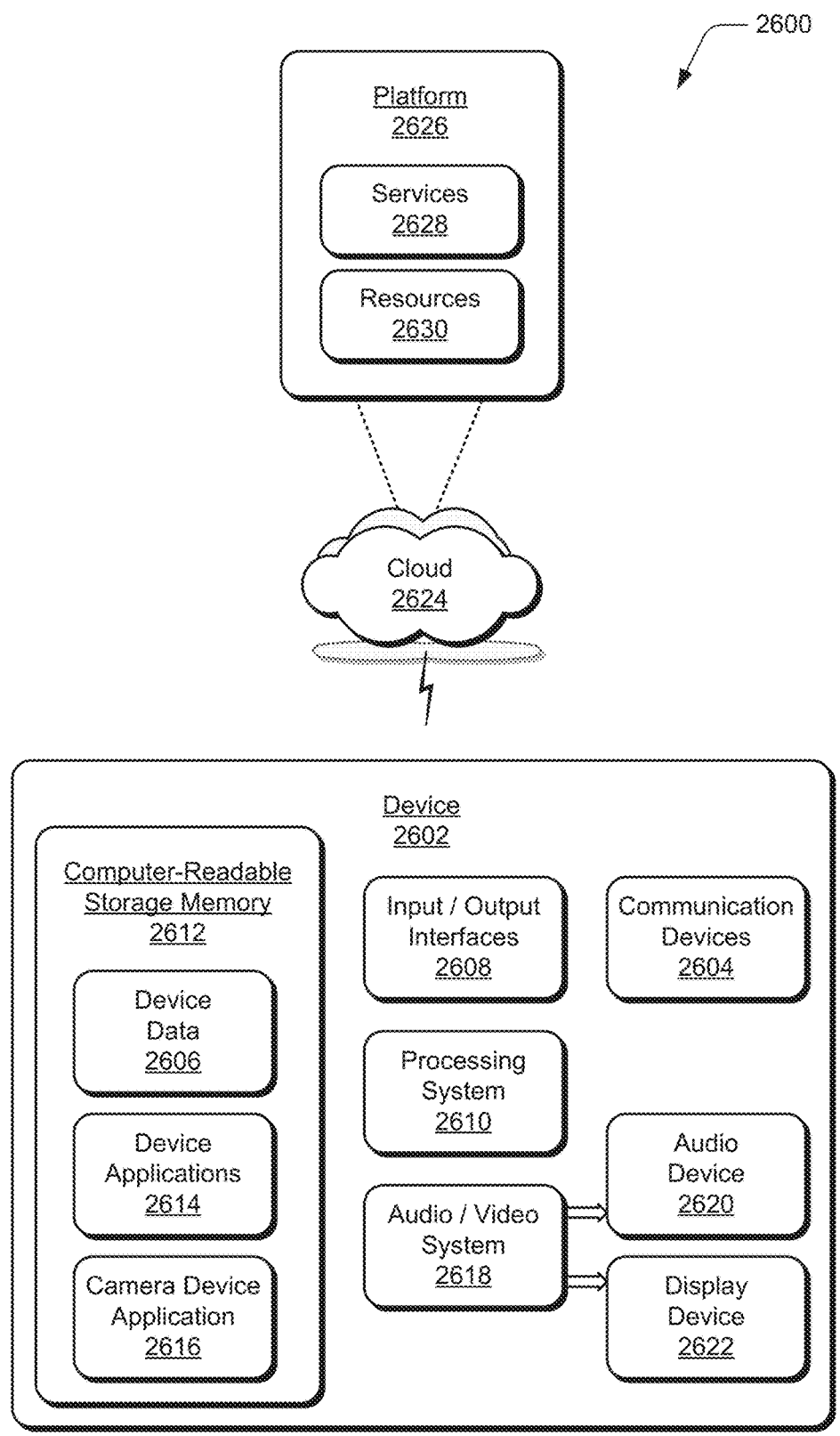
FIG. 26 illustrates an example system with an example device that can implement embodiments of a camera system API for third-party integrations, and can implement embodiments of camera data access based on subscription status.

FIG. 26 illustrates an example system 2600 that includes an example device 2602, which can be implemented as any of the mesh network devices that implement embodiments of a camera system API for third-party integrations as described with reference to the previous FIGS. 1-25. The example device 2602 may be any type of computing device, client device, mobile phone, tablet, communication, entertainment, gaming, media playback, and/or other type of device. Further, the example device 2602 may be implemented as any other type of mesh network device that is configured for communication on a mesh network, such as a thermostat, hazard detector, camera device, light unit, router, border router, joiner router, joining device, end device, leader, access point, and/or other mesh network devices.

The device 2602 includes communication devices 2604 that enable wired and/or wireless communication of device data 2606, such as data that is communicated between the devices in a mesh network, data that is being received, data scheduled for broadcast, data packets of the data, data that is synched between the devices, etc. The device data can include any type of communication data, as well as audio, video, and/or image data that is generated by applications executing on the device. The communication devices 2604 can also include transceivers for cellular phone communication and/or for network data communication.

The device 2602 also includes input/output (I/O) interfaces 2608, such as data network interfaces that provide connection and/or communication links between the device, data networks (e.g., a mesh network, external network, etc.), and other devices. The I/O interfaces can be used to couple the device to any type of components, peripherals, and/or accessory devices. The I/O interfaces also include data input ports via which any type of data, media content, and/or inputs can be received, such as user inputs to the device, as well as any type of communication data, as well as audio, video, and/or image data received from any content and/or data source.

The device 2602 includes a processing system 2610 that may be implemented at least partially in hardware, such as with any type of microprocessors, controllers, and the like that process executable instructions. The processing system can include components of an integrated circuit, programmable logic device, a logic device formed using one or more semiconductors, and other implementations in silicon and/or hardware, such as a processor and memory system implemented as a system-on-chip (SoC). Alternatively or in addition, the device can be implemented with any one or combination of software, hardware, firmware, or fixed logic circuitry that may be implemented with processing and control circuits. The device 2602 may further include any type of a system bus or other data and command transfer system that couples the various components within the device. A system bus can include any one or combination of different bus structures and architectures, as well as control and data lines.

The device 2602 also includes computer-readable storage memory 2612, such as data storage devices that can be accessed by a computing device, and that provide persistent storage of data and executable instructions (e.g., software applications, modules, programs, functions, and the like). The computer-readable storage memory described herein excludes propagating signals. Examples of computer-readable storage memory include volatile memory and non-volatile memory, fixed and removable media devices, and any suitable memory device or electronic data storage that maintains data for computing device access. The computer-readable storage memory can include various implementations of random access memory (RAM), read-only memory (ROM), flash memory, and other types of storage memory in various memory device configurations.

The computer-readable storage memory 2612 provides storage of the device data 2606 and various device applications 2614, such as an operating system that is maintained as a software application with the computer-readable storage memory and executed by the processing system 2610. The device applications may also include a device manager, such as any form of a control application, software application, signal processing and control module, code that is native to a particular device, a hardware abstraction layer for a particular device, and so on. In this example, the device applications also include a camera device application 2616 that implements embodiments of a camera system API for third-party integrations, such as when the example device 2602 is implemented as a camera device described herein.

The device 2602 also includes an audio and/or video system 2618 that generates audio data for an audio device 2620 and/or generates display data for a display device 2622. The audio device and/or the display device include any devices that process, display, and/or otherwise render audio, video, display, and/or image data, such as the image content of a digital photo. In implementations, the audio device and/or the display device are integrated components of the example device 2602. Alternatively, the audio device and/or the display device are external, peripheral components to the example device. In embodiments, at least part of the techniques described for a camera system API for third-party integrations may be implemented in a distributed system, such as over a "cloud" 2624 in a platform 2626. The cloud 2624 includes and/or is representative of the platform 2626 for services 2628 and/or resources 2630.

The platform 2626 abstracts underlying functionality of hardware, such as server devices (e.g., included in the services 2628) and/or software resources (e.g., included as the resources 2630), and connects the example device 2602 with other devices, servers, etc. The resources 2630 may also include applications and/or data that can be utilized while computer processing is executed on servers that are remote from the example device 2602. Additionally, the services 2628 and/or the resources 2630 may facilitate subscriber network services, such as over the Internet, a cellular network, or Wi-Fi network. The platform 2626 may also serve to abstract and scale resources to service a demand for the resources 2630 that are implemented via the platform, such as in an interconnected device embodiment with functionality distributed throughout the system 2600. For example, the functionality may be implemented in part at the example device 2602 as well as via the platform 2626 that abstracts the functionality of the cloud 2624.

Although embodiments of a camera system API for third-party integrations have been described in language specific to features and/or methods, the subject of the appended claims is not necessarily limited to the specific features or methods described. Rather, the specific features and methods are disclosed as example implementations of a camera system API for third-party integrations, and other equivalent features and methods are intended to be within the scope of the appended claims. Further, various different embodiments are described and it is to be appreciated that each described embodiment can be implemented independently or in connection with one or more other described embodiments.

The invention claimed is:
1. A cloud-based service, comprising:
a server computing device configured for executing a service application configured to process video data received as a video stream from a camera device of a user, the camera device captures images and communicates the video stream to the cloud-based service; and
an application program interface (API), hosted on the server computing device, that can be invoked by a third-party application, running on a client device of the user or hosted on a remote service associated with the client device, to request the video data and camera data associated with the camera device, and to access settings of the camera device, the API permitting access by the third-party application on behalf of the user to the video data and the camera data from the cloud-based service.
2. The cloud-based service as recited in claim 1, wherein:
the API is exposed for the third-party application to communicate with the cloud based service via a network connection to request the video data and the camera data; and
the camera device communicates with the cloud-based service via a secure connection to provide the requested camera data and communicate the video stream to the cloud-based service.
3. The cloud-based service as recited in claim 1, wherein:
the camera data includes at least an operational status of the camera device; and
the third-party application is configured to receive the operational status of the camera device from the cloud-based service via the API when the cloud based service receives the operational status from the camera device.

4. The cloud-based service as recited in claim 1, wherein:
the video data that is generated by the service application from the video stream received from the camera device is accessible at the cloud-based service; and
the API is exposed for the third-party application to receive the video data from the cloud based service.

5. The cloud-based service as recited in claim 1, wherein the video data that is generated by the service application from the video stream includes at least one of:
the images of a motion event associated with a motion detected by the camera device; and
the previous images that correspond to a noise event associated with a sound detected by the camera device.

6. The cloud-based service as recited in claim 5, wherein:
the motion event and the noise event are reported by the service application as cue point events to the third-party application via the API as the video stream is received from the camera device and processed by the service application.

7. The cloud-based service as recited in claim 1, wherein:
the API is exposed to the third-party application to grant permissions to request different forms of the camera data that is associated with the camera device and to access the settings of the camera device; and
one or more of the permissions are defined in a camera data scope that identifies the camera data the third-party application is permitted to access.

8. The cloud-based service as recited in claim 7, wherein the camera data scope is configured to be updated to include additional permissions or fewer permissions to permit access to the different forms of the camera data that is associated with the camera device via the API.

9. The cloud-based service as recited in claim 7, wherein the camera data scope is one of:
a camera read scope that includes the one or more permissions allowing the third-party application to access the settings of the camera device, motion events associated with detected motions, and noise events associated with detected sounds; or
a camera write scope that includes the one or more permissions of the camera read scope as well as an additional permission allowing the third-party application to initiate turning the camera device on and off via the API.

10. The cloud-based service as recited in claim 7, wherein the camera data scope is one of:
a camera images read scope that includes the one or more permissions allowing the third-party application to access settings of the camera device, the images of motion events associated with detected motions, and the images that correspond to noise events associated with detected sounds; or
a camera images write scope that includes the one or more permissions of the camera images read scope as well as an additional permission allowing the third-party application to initiate turning the camera device on and off via the API.

11. The cloud-based service as recited in claim 1, wherein:
the camera data is structured as a data model of data fields, one or more of the data fields being accessible by the third-party application via the API;
the data fields including a Web URL to identify an addressable location of the camera device;
the data fields further including an application URL to an interface application of the camera device; and
the Web URL and the application URL effective to allow the third-party application running on the client device to link to the interface application of the camera device.

12. The cloud-based service as recited in claim 1, wherein:
the camera data is structured as a data model of data fields, one or more of the data fields being accessible via the API; and
the data model is implemented as a JavaScript Object Notation (JSON) document that describes the camera device, the camera data that is associated with the camera device, and an environment structure of the camera device.

13. A system, comprising:
a service application executable by a server computing device implemented at a cloud-based service, the service application configured to process video data received as a video stream; and
an application program interface (API) implemented at the cloud-based service, the API invokable by a third-party application, running on a client device or hosted on a remote service associated with the client device, to request the video data and camera data associated with a camera device, and to access settings of the camera device, the API permitting remote access by the third-party application to the video data and the camera data from the cloud-based service.

14. The system as recited in claim 13, further comprising:
an API server configured to host the API that is exposed for the third-party application to communicate with the cloud based service via a network connection to request the video data and the camera data; and
the camera device configured to communicate with the cloud-based service via a secure connection to provide the requested camera data and communicate the video stream to the cloud-based service.

15. The system as recited in claim 14, wherein:
the camera data includes at least an operational status of the camera device; and
the third-party application is configured to receive the operational status of the camera device from the cloud-based service via the API when the cloud based service receives the operational status from the camera device.

16. The system as recited in claim 14, wherein:
the video data processed by the service application from the video stream received from the camera device is accessible at the cloud-based service; and
the API is exposed for the third-party application to receive the video data from the cloud based service.

17. The system as recited in claim 14, wherein the video data processed by the service application from the video stream includes at least one of:
images of a motion event associated with a motion detected by the camera device; and
the images that correspond to a noise event associated with a sound detected by the camera device; and
the motion event and the noise event are reported by the service application as cue point events to the third-party application via the API as the video stream is received from the camera device and processed by the service application.

18. The system as recited in claim 14, wherein:
the third-party application is associated with a garage door company;
the camera device is configured to capture images of at least one of a motion event and a sound event when a garage door opens; and the images that correspond to at least one of the motion event and the sound event of the garage door opening are communicated to the third-party application via the API for display on the client device.

19. The system as recited in claim 14, wherein:
the client device is a television device configured to communicate with the cloud-based service via the API;
the camera device is configured to capture images of at least one of a motion event and a sound event of a detected motion; and
the images that correspond to at least one of the motion event and the sound event are communicated to the television device via the API for display.

20. The system as recited in claim 14, wherein:
the third-party application is associated with a door lock company;
the camera device is configured to capture images of at least one of a motion event and a sound event when a door lock unlocks; and
the images that correspond to at least one of the motion event and the sound event of the door lock unlocking are communicated to the third-party application via the API for display on the client device.

21. The system as recited in claim 14, wherein:
the third-party application is associated with a doorbell company;
the camera device is configured to capture images of at least one of a motion event and a sound event when one of a doorbell rings or motion is detected; and
the images that correspond to at least one of the motion event and the sound event of the doorbell ring are communicated to the third-party application for display on the client device.

22. The system as recited in claim 14, wherein:
the third-party application is associated with baby monitoring;
the camera device is utilized for the baby monitoring and configured to capture images of at least one of a motion event and a sound event of a detected motion; and
the images that correspond to at least one of the motion event and the sound event of the detected motion are communicated to the third-party application via the API for display on the client device.

23. The system as recited in claim 14, wherein:
the third-party application is associated with animal activity monitoring:
the camera device is utilized for the animal activity monitoring and configured to capture images of at least one of a motion event and a sound event of a detected motion; and
the images that correspond to at least one of the motion event and the sound event of the detected motion are communicated to the third-party application via the API for display on the client device.

24. The system as recited in claim 14, wherein:
the client device is a lighting fixture configured to communicate with the cloud-based service via the API;
the camera device is configured to detect motion and capture images of at least one of a motion event and a sound event of the detected motion; and
the service application is configured to initiate turning on a light of the lighting fixture responsive to the motion being detected.

25. The system as recited in claim 14, wherein:
the client device is a wearable device configured to communicate with the cloud-based service via the API;
the camera device is configured to detect motion and capture images of at least one of a motion event and a sound event of the detected motion; and
the service application is configured to initiate a notification of the detected motion to the wearable device.

26. A method to permit access to video data and camera data associated with a camera device via an application program interface (API) at a cloud-based service, the method comprising:
processing a video stream to generate the video data, the video stream being received from a camera device of a user, the camera device captures images and communicates the video stream to the cloud-based service; and
exposing the API that is invoked by a third-party application, running on a client device of the user or hosted on a remote service associated with the client device, to request the video data and the camera data associated with the camera device, and to access settings of the camera device, the API permitting access by the third-party application on behalf of the user to the video data and the camera data from the cloud-based service.

27. The method as recited in claim 26, wherein:
said exposing the API for the third-party application to communicate with the cloud based service via a network connection to request the video data and the camera data; and the method further comprising:
communicating with the camera device via a secure connection to receive the requested camera data and the video stream from the camera device.

28. The method as recited in claim 26, wherein:
the camera data includes at least an operational status of the camera device; and the method further comprising:
forwarding the request for the operational status to the camera device;
communicating the operational status of the camera device to the third-party application via the API when the cloud based service receives the operational status from the camera device.

29. The method as recited in claim 26, wherein the video data that is generated from the video stream includes at least one of:
the images of a motion event associated with a motion detected by the camera device; and
the images that correspond to a noise event associated with a sound detected by the camera device;
the method further comprising:
reporting the motion event and the noise event as cue point events to the third party application via the API as the video stream is received from the camera device and processed at the cloud-based service.

30. The method as recited in claim 26, wherein the camera data is structured as a data model of data fields, one or more of the data fields being accessible via the API.

* * * * *